(12) United States Patent
Magee

(10) Patent No.: US 11,618,512 B2
(45) Date of Patent: Apr. 4, 2023

(54) LATERALLY INSET TRAILER SKIRT REDUCING VEHICLE DRAG

(71) Applicant: Garth L. Magee, Hawthorne, CA (US)

(72) Inventor: Garth L. Magee, Hawthorne, CA (US)

( * ) Notice: Subject to any disclaimer, the term of this patent is extended or adjusted under 35 U.S.C. 154(b) by 270 days.

(21) Appl. No.: 17/105,885

(22) Filed: Nov. 27, 2020

(65) Prior Publication Data

US 2021/0171130 A1 Jun. 10, 2021

Related U.S. Application Data

(63) Continuation of application No. 16/706,480, filed on Dec. 6, 2019, now Pat. No. 10,850,779.

(51) Int. Cl.
*B62D 35/02* (2006.01)
*B62D 21/09* (2006.01)
*B62D 35/00* (2006.01)

(52) U.S. Cl.
CPC .......... *B62D 35/001* (2013.01); *B62D 21/09* (2013.01); *B62D 35/008* (2013.01)

(58) Field of Classification Search
CPC .............................. B62D 35/001; B62D 35/02
USPC ........................................... 296/180.1–180.5
See application file for complete search history.

(56) References Cited

U.S. PATENT DOCUMENTS

| | | | | |
|---|---|---|---|---|
| 8,303,025 B2 * | 11/2012 | Senatro | ................ | B62D 35/001 296/180.1 |
| 8,342,595 B2 * | 1/2013 | Henderon | .............. | B62D 35/00 296/180.4 |
| 8,727,425 B1 * | 5/2014 | Senatro | ................ | B62D 35/001 296/180.1 |
| 10,850,779 B1 * | 12/2020 | Magee | .................. | B62D 21/09 |
| 2011/0062749 A1 * | 3/2011 | Graham | ............... | B62D 35/001 296/180.4 |
| 2012/0032475 A1 * | 2/2012 | Grandominico | ....... | B62D 35/02 296/180.4 |
| 2013/0076066 A1 * | 3/2013 | Wong | .................. | B62D 35/001 296/180.4 |
| 2013/0181477 A1 * | 7/2013 | Reiman | .................. | B62D 35/02 296/180.4 |
| 2013/0285411 A1 * | 10/2013 | Layfield | ............... | B62D 35/001 296/180.4 |
| 2014/0035316 A1 * | 2/2014 | Reiman | .................. | B62D 35/02 296/180.4 |
| 2014/0252799 A1 * | 9/2014 | Smith | .................. | B62D 35/001 296/180.4 |
| 2015/0197291 A1 * | 7/2015 | Roush | .................. | B62D 35/001 296/180.4 |
| 2016/0052566 A1 * | 2/2016 | Bacon | .................. | B62D 35/001 296/180.4 |

(Continued)

*Primary Examiner* — Joshua T Kennedy

(57) ABSTRACT

An inwardly disposed vehicle skirt panel assembly disposed laterally inset toward the longitudinal centerline of the vehicle. The vehicle skirt panel assembly is suspended underneath a rearward body component of a truck or semi-trailer, extending forwards in front of a rearward wheel assembly. The vehicle skirt panel assembly stabilizes otherwise laterally displaced air passing under the central portion of the moving vehicle, further increasing the effective air pressure developed immediately behind the vehicle. Maintaining air generally static while passing under the vehicle increases the effective pressure developed immediately behind the vehicle to reduce drag thereon.

24 Claims, 48 Drawing Sheets

(56) References Cited

U.S. PATENT DOCUMENTS

2016/0121940 A1\* 5/2016 Courtney ............. B62D 35/001
                                                    296/180.4
2020/0406988 A1\* 12/2020 Bradley ............... B62D 25/188

\* cited by examiner

-Reference Art-

LATERALLY INSET TRAILER SKIRT REDUCING VEHICLE DRAG

CROSS-REFERENCE TO RELATED APPLICATION

This application is a continuation of patent application Ser. No. 16/706,480, filed Dec. 6, 2019 by the present inventor.

BACKGROUND OF THE INVENTION

Field of the Invention

The present embodiment relates to an apparatus for the reduction of aerodynamic drag on vehicles generally having wind-exposed wheels mounted underneath the vehicle body, such as on large commercial trucks.

Description of Related Art

Inherently characteristic of rotating vehicle wheels, and particularly of spoked wheels, aerodynamic resistance, or parasitic drag, is an unwanted source of energy loss in propelling a vehicle. Parasitic drag on a wheel includes viscous drag components of form (or pressure) drag and frictional drag. Form drag on a wheel generally arises from the circular profile of a wheel moving though air at the velocity of the vehicle. The displacement of air around a moving object creates a difference in pressure between the forward and trailing surfaces, resulting in a drag force that is highly dependent on the relative wind speed acting thereon. Streamlining the wheel surfaces can reduce the pressure differential, reducing form drag.

Frictional drag forces also depend on the speed of wind impinging exposed surfaces, and arise from the contact of air moving over surfaces. Both of these types of drag forces arise generally in proportion to the square of the relative wind speed, per the drag equation. Streamlined design profiles are generally employed to reduce both of these components of drag force.

The unique geometry of a wheel used on a vehicle includes motion both in translation and in rotation; the entire circular outline of the wheel translates at the vehicle speed, and the wheel rotates about the axle at a rate consistent with the vehicle speed. Form drag forces arising from the moving outline are apparent, as the translational motion of the wheel rim must displace air immediately in front of the wheel (and replace air immediately behind it). These form drag forces arising across the entire vertical profile of the wheel are therefore generally related to the velocity of the vehicle.

As the forward profile of a wheel facing the direction of vehicle motion is generally symmetric in shape, and as the circular outline of a wheel rim moves forward at the speed of the vehicle, these form drag forces are often considered uniformly distributed across the entire forward facing profile of a moving wheel (although streamlined cycle rims can affect this distribution somewhat). This uniform distribution of pressure force is generally considered centered on the forward vertical wheel profile, and thereby in direct opposition to the propulsive force applied at the axle, as illustrated in FIG. 17.

However, as will be shown, frictional drag forces are not uniformly distributed with elevation on the wheel, as they are not uniformly related to the speed of the moving outline of the wheel rim. Instead, frictional drag forces on the wheel surfaces are highly variable and depend on their elevation above the ground. Frictional drag must be considered separate from form drag forces, and can be more significant sources of overall drag on the wheel and, as will be shown, thereby on the vehicle.

Vehicles having wind-exposed wheels are particularly sensitive to external headwinds reducing propulsive efficiency. Drag force on exposed wheels increases more rapidly on upper wheel surfaces than on vehicle frame surfaces, causing a non-linear relation from rising wind speeds between net drag forces on vehicle frame surfaces versus net drag forces on vehicle wheel surfaces.

Since upper wheel surfaces are moving against the wind at more than the vehicle speed, the upper wheel drag forces contribute more and more of the total vehicle drag as external headwinds rise. Thus, as external headwinds rise, a greater fraction of the net vehicle drag is shifted from vehicle frame surfaces to upper wheel surfaces.

Moreover, upper wheel drag forces must be overcome by a propulsive counterforce applied at the axle. Such propulsive counterforces suffer a mechanical disadvantage against the upper wheel drag forces, since each net force is applied about the same pivot point located at the bottom where the wheel is in stationary contact with the ground. This mechanical advantage that upper wheel drag forces have over propulsive counterforces further augments the effective vehicle drag that exposed upper wheels contribute under rising headwinds. As a result of these magnified effects of upper wheel drag on resisting vehicle propulsion, vehicle drag is more effectively reduced by reducing the aerodynamic pressure on the upper wheel surfaces while leaving the lower wheel surfaces exposed to impinging headwinds.

Furthermore, shielding the lower wheel surfaces can cause a net increase in vehicle drag, and a loss in propulsive efficiency. Not only does the propulsive counterforce applied at the axle have a mechanical advantage over the lower wheel drag forces, but shielding the lower wheel surfaces using a deflector attached to the vehicle body shifts the drag force from being applied at the lower wheel to an effective higher elevation at the axle, thereby negating any mechanical advantage of a propulsive counterforce applied at the axle has over the lower wheel drag force. As a result, aerodynamic trailer skirts in widespread use today are unnecessarily inefficient, since they generally extend below the level of the axle.

Nevertheless, extended height trailer skirts have been shown to improve propulsive efficiency, since they reduce the aerodynamic pressure on the upper wheel surfaces, which cause the vast majority of wheel drag and virtually all of the loss in vehicle propulsive efficiency due to wheel drag. However, the extended skirts shown in the art also impact the aerodynamic pressure on the lower wheel surfaces, where propulsive counterforces delivered at the axle have a mechanical advantage over lower wheel drag forces.

As mentioned, diverting wind from impinging on the lower wheel surfaces actually increases overall vehicle drag, reducing propulsive efficiency. Deflecting wind from impinging on these lower wheel surfaces transfers the aerodynamic pressure from these slower moving surfaces also suffering a mechanical disadvantage, to faster moving vehicle body surfaces having no mechanical advantage over propulsive counterforces, thereby increasing vehicle drag.

Nevertheless, numerous examples in the art demonstrate the current preference for aerodynamic skirts extending to below the level of the axle. For example, in U.S. Pat. No. 7,942,471 B2, US 2006/0152038 A1, U.S. Pat. No. 6,974,178 B2, U.S. Pat. No. 8,303,025 B2, U.S. Pat. No. 7,497,502 B2, U.S. Pat. No. 8,322,778 B1, U.S. Pat. No. 7,806,464 B2, US 2010/0066123 A1, U.S. Pat. No. 8,342,595 B2, U.S. Pat. No. 8,251,436 B2, U.S. Pat. No. 6,644,720 B2, U.S. Pat. Nos. 5,280,990, 5,921,617, 4,262,953, 7,806,464 B2, US 2006/0252361 A1, U.S. Pat. No. 4,640,541 all make no mention of the differing relationships between upper wheel drag forces and lower wheel drag forces affecting vehicle propulsive efficiency. Most of these patents depict FIGS. showing skirts extending well below the level of the axle. And an examination of leading trailer skirt manufacturers shows the prevalence for extended height skirts currently for sale and needed to meet California carbon emission requirements.

Furthermore, a recent in-depth wind tunnel study sponsored the US Department of Energy and conducted at a pre-eminent research institution of the United States government, Lawrence Livermore Laboratory was published Mar. 19, 2013, "Aerodynamic drag reduction of class 8 heavy vehicles: a full-scale wind tunnel study", Ortega, et. al, and concluded that trailer skirts are one of the most effective means to reduce drag on large tractor-trailer trucks. A large number of trailer skirt configurations were tested in this study, which employed traditional techniques for measuring total drag on the vehicle. Due to the nonlinear effects of upper wheel drag in rising headwinds, such techniques can produce inaccurate measurements of gains in propulsive efficiency for vehicles having wheels exposed to headwinds. Thus, as yet this important relationship of upper wheel drag more predominately affecting overall vehicle drag—and especially over lower wheel drag which is often comparatively negligible and suffers a mechanical disadvantage against propulsive counterforces applied at the axle—has gone unrecognized.

And in the patent art cited above, several patents such as U.S. Pat. Nos. 4,262,953, 4,640,541, US 2006/0252361 A1, U.S. Pat. No. 7,806,464 B2, U.S. Pat. No. 8,322,778 and others depict wind-deflecting panels generally spanning the lateral width of the trailer, thereby inducing unnecessary drag by blocking air otherwise funneled between the wheels. Funneled air into the rear of the vehicle can reduce pressure drag on the vehicle. In the art, there are numerous other examples of devices attempting to enhance this vehicle drag reducing effect.

Also in the cited art above, several patents such as US 2010/0066123 A1, U.S. Pat. No. 8,342,595 B2 and U.S. Pat. No. 8,251,436 B2 depict wind deflecting panels where aligned in front of the wheels of the trailer extending to well below the level of the axle, thereby inducing unnecessary vehicle drag by transferring drag from the slower moving lower wheel surfaces having a mechanical disadvantage, to the faster moving vehicle body and frame surfaces. And in the art, there are numerous other examples of devices attempting to enhance this wheel drag reducing effect.

And in the art, several attempts have been made to reduce the pressure drag induced on the body of the vehicle. For example, the oscillating system in U.S. Pat. No. 9,487,250—intended to reduce pressure drag on the vehicle itself—introduces considerable complexity over more common fixed drag-reduction means, since it generally includes a moving diaphragm that must be tuned for the specific operating configuration of the vehicle. And the oscillating mechanism is generally attached at the rear of the trailer, behind the rear wheels.

And the adjustable skirts in U.S. Pat. No. 9,440,689, as well as the skirts in U.S. Pat. No. 8,783,758, both being located rearward of the trailer wheel assembly, do not induce air to flow in-between the trailer wheels to yield a reduction in pressure drag on the vehicle. Instead, the aforementioned skirts prevent air flow from flowing laterally under the body of the vehicle. For example, as disposed the combination of the dual adjustable skirts of U.S. Pat. No. 9,440,689 directs air away from the 'pocket' of air formed immediately behind the trailer. And the skirts of U.S. Pat. No. 8,783,758 prevent air from flowing laterally inward under the rearmost portion of the trailer body.

And many trailer skirts in the art are generally disposed largely along the lateral sides of the trailer, and therefore do not substantially induce air to flow generally in-between the wheel sets to thereby reduce pressure drag on the trailer body. Indeed, early configurations of trailer skirts were often disposed wholly along the outer lateral sides of the trailer body. However, more recent configurations include the forwardmost ends thereof being disposed slightly inset toward the longitudinal centerline of the vehicle body, since it has been found through testing that this outwardly slanted configuration further decreases overall vehicle drag.

As taught by prior inventions by the present applicant, one reason for this somewhat better performance is due to this outwardly slanted configuration providing improved shielding of the trailing wheels from impinging headwinds. And as discussed herein, in order to minimize vehicle drag, it is critically important to shield the uppermost portion of otherwise exposed wheels from headwinds, while leaving lowermost wheel surfaces exposed to headwinds. The slanted skirts—extending laterally outwards toward the rear—generally partially shield the upper wheels, but also shield much of the lower wheels, thereby not optimally minimizing drag on the vehicle. And these outwardly slanted skirts also present a serious liability issue for trucks, since the outwardly directed skirts divert substantial amounts of air outward that can destabilize adjacent cyclists—especially bicycle riders—from passing trucks.

With the numerous embodiments for shielding open wheels of the vehicle—which include prior inventions by the present applicant in U.S. Pat. No. 9,567,016 as well as in U.S. Pat. No. 9,796,430—teaching the critical importance of specifically shielding the critical drag-inducing upper wheel using a minimal drag-inducing wheel fairing, only further reinforces in the art the preference by skilled artisans for even further deepening the outwardly slanting arrangement of conventional trailer skirts to provide even more effective shielding of the trailing wheels from headwinds. As such, skilled artisans have had no motivation to consider a contrary arrangement further exposing the rearward wheels to headwinds, since such a contrary arrangement would be known to substantially increase drag on the vehicle.

For example, in U.S. Pat. No. 9,809,260 air deflectors are used in some embodiments to direct air outwards away from the undercarriage components—and thereby away from generally flowing in-between the wheel sets—in order to reduce drag on these components. As such, it has remained generally unappreciated in the art that any increased drag induced on these undercarriage components is often insufficient to offset the overall drag reduction gains achievable by instead simply redirecting substantial air to flow in-between the trailer wheel sets to thereby substantially reduce pressure drag on the vehicle.

Other previous attempts to reduce pressure drag induced on the body of the vehicle employed an air capture system to redirect air from the front to the rear of the vehicle, often including air ducts. For example, in U.S. Pat. No. 9,527,534 air ducts are used to capture air impinging near the front of the vehicle and communicating the thus captured air to rear of the vehicle through these ducts. The air ducts are generally directed either over the top or underneath the vehicle, while also generally extending rearward of the trailer wheel assembly. And such, these lengthy air ducts generally have substantial wind-exposed surface areas, introducing considerable friction drag thereon—both on surfaces thereof within and without the duct itself—to thereby limit any reduction in overall vehicle drag gained from any reduction in pressure drag on the vehicle itself.

And in U.S. Pat. No. 9,403,563 much smaller air ducts were used on the rear of the trailer, which still introduce considerable friction drag for their relatively small size, especially when considering that the their smaller size severely limits the potential amount of redirected air, thereby further limiting their effectiveness in increasing the effective pressure developed in the relatively large volume of reduced pressure zone located immediately behind the trailer. Thus, these smaller air ducts redirecting smaller volumes of air also have limited potential to reduce the overall pressure drag on the vehicle.

For these multiple reasons, a different approach is needed to reduce pressure drag on the vehicle, by using a minimal drag-inducing air diverting means to substantially increase the effective air pressure developed immediately behind the vehicle.

BRIEF SUMMARY OF THE INVENTION

Numerous reference embodiments for shielding open wheels of the vehicle—which include prior inventions by the present applicant in U.S. Pat. No. 9,567,016—are first presented herein, as the claimed embodiment itself can be even more effective in reducing overall vehicle drag when used in conjunction with such upper wheel-shielding embodiments. Since until recently prior embodiments shielding the upper wheel were largely unappreciated by those skilled in the art, the significance of both the reference and claimed embodiments may be more fully understood and appreciated when considered with a comprehensive understanding of the importance of specifically shielding the critical drag-inducing upper wheel using a minimal drag-inducing fairing, as taught previously in U.S. Pat. No. 9,567,016—as well as in U.S. Pat. Nos. 9,878,745 and 9,796,430—by the present applicant. And as a presently claimed embodiment may be more fully understood and appreciated when considered with a comprehensive understanding of the importance of inducing more stabilized air to flow under the central portion of the vehicle using a minimal drag-inducing air diverting means that may expose a forward-facing portion of an adjacent wheel assembly, additional reference embodiments disposed ahead of the wheel assembly are also presented herein as further background in support of the use thereof in combination with a claimed embodiment.

Reference embodiments presented herein generally comprise either wind-diverting skirts or panels for use on vehicles having otherwise wind-exposed wheels on a wheel assembly mounted underneath the vehicle body, such as on the trailers of large commercial trucks. Many of the reference embodiments are designed to deflect vehicle headwinds from directly impinging on the upper wheel surfaces—the predominate drag inducing surfaces on a wheel—and in part onto lower wheel surfaces—the least effective drag inducing surfaces on a wheel—thereby reducing vehicle drag and increasing vehicle propulsive efficiency. Each of these wheel shielding embodiments are also ideally designed to keep the lowermost wheel surfaces exposed to headwinds. Since propulsive counterforces applied at the axle have a natural mechanical advantage over lower wheel drag forces, deflecting headwinds onto fully exposed lower wheel surfaces also increases vehicle propulsive efficiency.

A reference embodiment comprises an inclined aerodynamic deflector panel assembly designed to deflect headwinds otherwise impinging on upper wheel surfaces downward onto lower wheel surfaces of a trailing wheel set on either side of the wheel assembly. The deflector panel assembly can be a generally flat panel tilted to deflect air downward onto the lower wheel surfaces, or a panel with perpendicular end plates projection forward forming a U-shaped channel arranged to funnel air downward onto the lower wheel surfaces. The deflector panel assembly extends down from the vehicle body to no lower than the level of the axle of the wheel assembly, and may included wheel skirts covering the trailing wheel sets. The panel may also be extended across the lateral width of the trailer to deflect headwinds below the trailing central axle assembly.

A reference embodiment comprises an aerodynamic skirt panel assembly designed to deflect headwinds otherwise impinging on upper wheel surfaces downward onto lower wheel surfaces of a trailing wheel set on either side of the wheel assembly. Toward the front end, the skirt panel assembly is located substantially inboard toward the centerline of the vehicle. Toward the rear end, the skirt panel assembly diverges rapidly to the outside of the trailing wheel set in order to divert headwinds in part onto the lower wheel surfaces. The ideal skirt assembly extends down from the vehicle body to no lower than the level of the axle in front of the wheel assembly, and may include wheel skirts covering the trailing wheel sets.

A reference embodiment comprises a method for reducing the total drag-induced resistive forces upon the wheel assembly as directed against the vehicle to reduce the required effective vehicle propulsive counterforce.

And a further reference embodiment comprises a medial inner skirt panel centrally located substantially in-between the forward and rearward wheels of a tandem wheel assembly on a semitrailer, thereby further streamlining the vehicle to reduce drag thereon. The medial inner skirt panel further stabilizes the generally static air passing under central axle and through the central tandem open-space underneath the tandem wheel assembly, further increasing the effective air pressure being developed immediately behind the trailer to reduce drag thereon.

A forward inner skirt panel located ahead of the rearward wheels of a tandem wheel assembly on a semitrailer also similarly streamlines the vehicle, reducing drag thereon. And a rearward inner skirt panel located behind the rearward wheels of a tandem wheel assembly on a semitrailer also similarly streamlines the vehicle, reducing drag thereon.

And a claimed embodiment herein comprises an inwardly disposed trailer skirt panel assembly located inset laterally toward the longitudinal centerline of the vehicle and disposed to extend substantially forward of the wheels of a rear wheel assembly on a semitrailer or truck. The trailer skirt panel assembly stabilizes the generally static air passing under the central portion of the vehicle and under the central axle through the central tandem open-space underneath the tandem wheel assembly of the semitrailer or rear axle of a truck, further increasing the effective air pressure being developed immediately behind the trailer or truck to reduce drag thereon.

BRIEF DESCRIPTION OF THE SEVERAL VIEWS OF THE DRAWINGS

While one or more aspects pertain to most wheeled vehicles not otherwise having fully shielded wheels that are completely protected from oncoming headwinds, the various embodiments can be best understood by referring to the following figures.

DETAILED DESCRIPTION OF THE INVENTION

Description of Wheel Drag Mechanics:

As mentioned, drag force on exposed wheels increases more rapidly on upper wheel surfaces than on vehicle frame surfaces, causing a non-linear relation from rising wind speeds between net drag forces on vehicle frame surfaces versus net drag forces on vehicle wheel surfaces. Thus, vehicles having wind-exposed wheels are particularly sensitive to external headwinds reducing propulsive efficiency. As a result, there exists a need for an improved aerodynamic deflector and skirt for use on industrial trucks and trailers.

Because of this rising dominance of wheel drag in rising headwinds—due to the non-linear relation from rising wind speeds between net drag forces on vehicle frame surfaces versus net drag forces on vehicle wheel surfaces—a discussion of the wheel drag mechanics central to this non-linear relationship is presented herein. The upper wheel fairing is described below as a simple solution for reducing vehicle drag in rising headwinds on a cycle, and is presented herein as background for the present embodiment.

Figure 11:
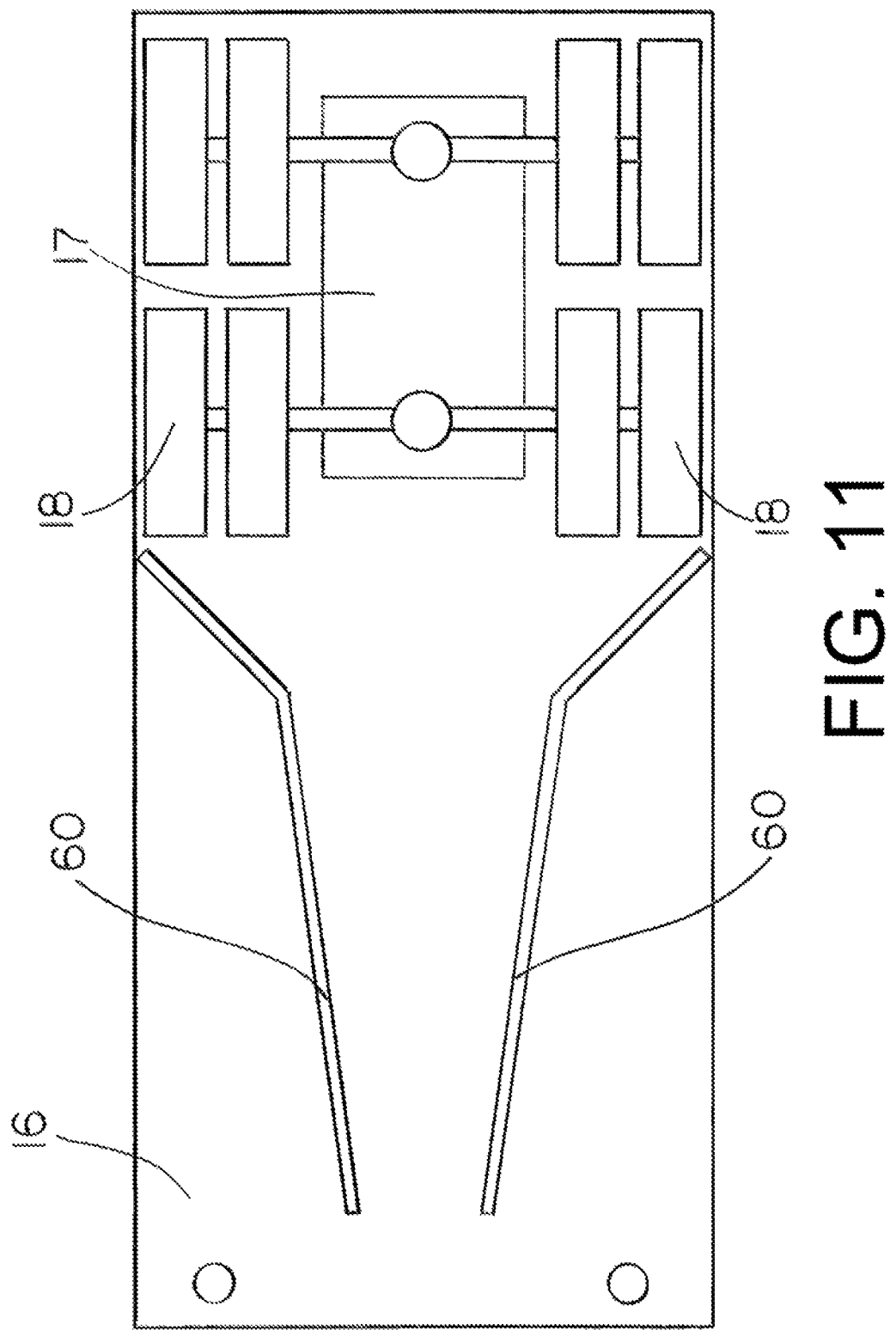
In FIG. 11, the aerodynamic deflector skirt assembly of FIG. 10 is shown from below the vehicle.

The shielding provided by fairing 1 in FIG. 11 is particularly effective since aerodynamic forces exerted upon exposed vehicle surfaces are generally proportional to the square of the effective wind speed impinging thereon. Moreover, the power required to overcome these drag forces is generally proportional to the cube of the effective wind speed. Thus, it can be shown that the additional power required to overcome these drag forces in propelling a vehicle twice as fast over a fixed distance, in half the time, increases by a factor of eight. And since this power requirement is analogous to rider effort—in the case of a bicycle rider—it becomes critical to shield the most critical drag-inducing surfaces on a vehicle from oncoming headwinds.

Figure 14:
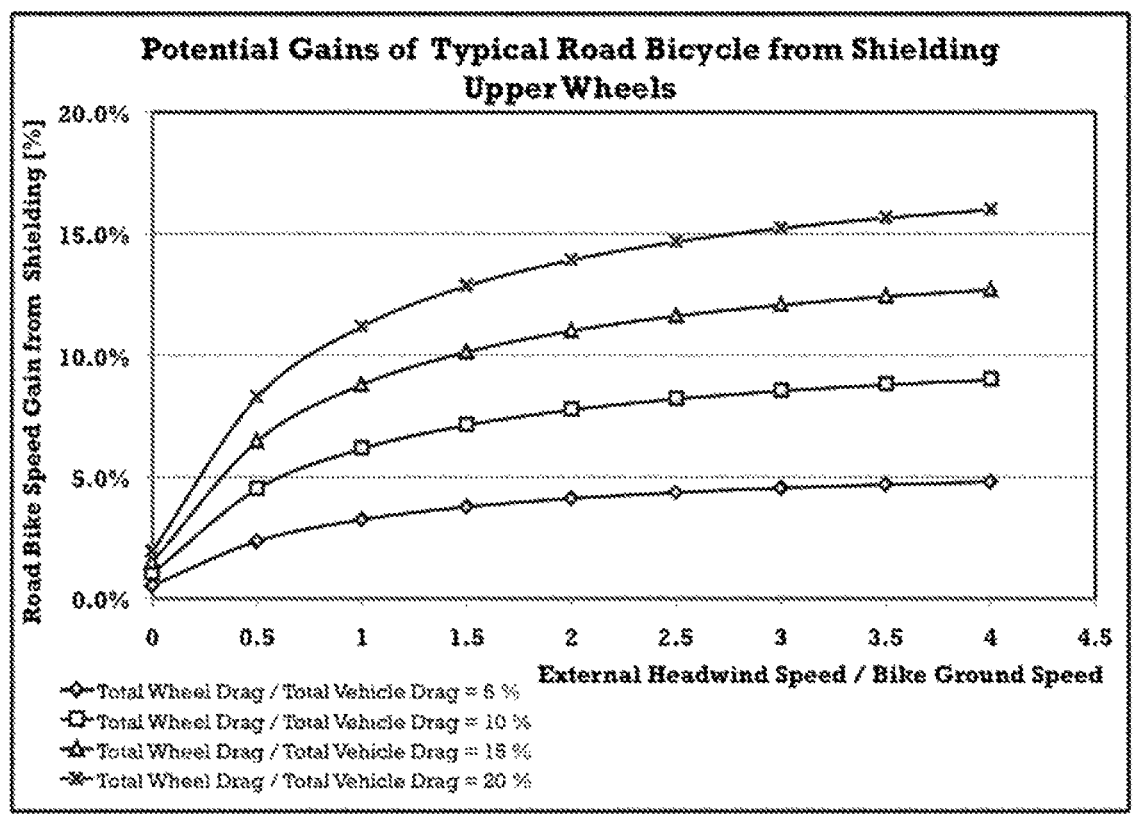
FIG. 14 is a series of curves showing the results of an analysis of the drag mechanics on a bicycle with shielded upper wheels, indicating that a bicycle with shielded upper wheels is faster when facing headwinds. Several curves are displayed, as examples of different bicycles each having a different proportion of wheel-drag to total-vehicle-drag.

FIG. 14 shows the results of an analysis of the drag mechanics on a bicycle with shielded upper wheels. The curves indicate that a bicycle with shielded upper wheels is faster when facing headwinds. Moreover, the gains in propulsive efficiency are shown to quickly increase in only a modest headwind, but continue to rise as headwinds increase further.

In any wheel used on a vehicle, and in the absence of any external headwinds, the effective horizontal wind speed at a point on the wheel at the height of the axle is equal to the ground speed of the vehicle. Indeed, the effective headwind speed upon any point of the rotating wheel depends on that point's current position with respect to the direction of motion of the vehicle.

Notably, a point on the moving wheel coming into direct contact with the ground is necessarily momentarily stationary, and therefore is not exposed to any relative wind speed, regardless of the speed of the vehicle. While the ground contact point can be rotating, it is not translating; the contact point is effectively stationary. And points on the wheel nearest the ground contact point are translating with only minimal forward speed. Hence, drag upon the surfaces of the wheel nearest the ground is generally negligible.

Contrarily, the topmost point of the wheel assembly (opposite the ground) is exposed to the highest relative wind speeds: generally at least twice that of the vehicle speed. And points nearest the top of the wheel are translating with forward speeds substantially exceeding the vehicle speed. Thus, drag upon the surfaces of the upper wheel can be quite substantial. Lower points on the wheel are exposed to lesser effective wind speeds, approaching a null effective wind speed—and thus negligible drag—for points nearest the ground.

Figure 17:
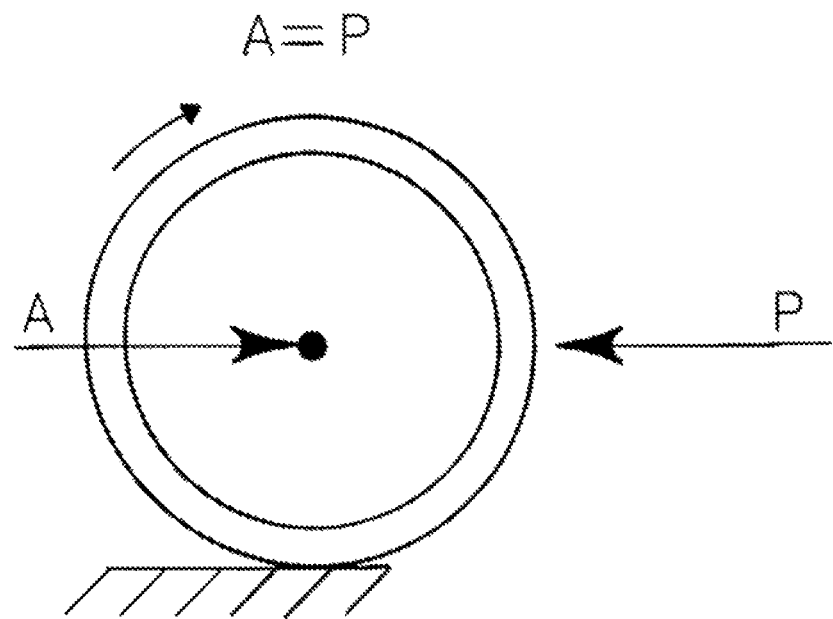
FIG. 17 (Prior Art) is a diagram of a wheel rolling on the ground representing typical prior art models, showing the net pressure drag force (P) exerted upon the forward wheel vertical profile—which moves at the speed of the vehicle— being generally centered near the axle of the wheel and balanced against the propulsive force (A) applied at the axle.
Figure 18:
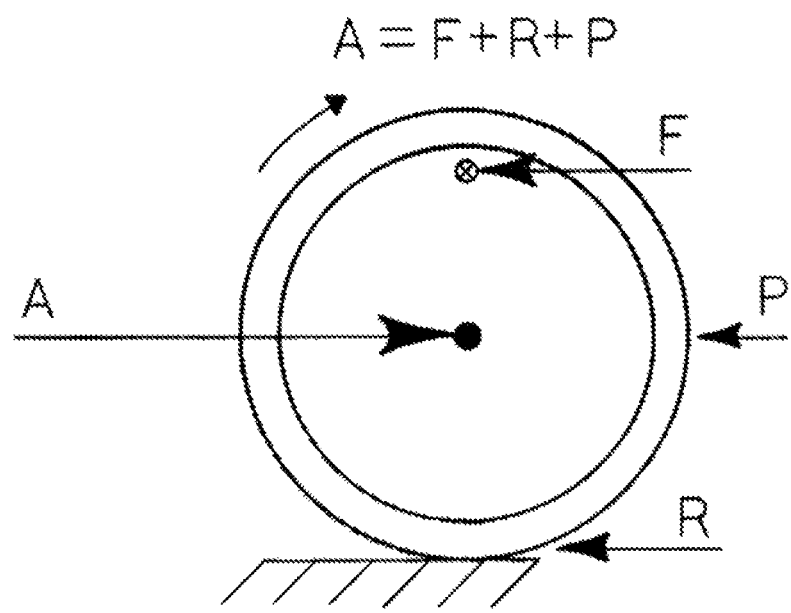
FIG. 18 is a diagram of a wheel rolling on the ground, showing the net friction drag force (F) upon the wheel surfaces—which move at different speeds depending on the elevation from the ground—being offset from the axle and generally centered near the top of the wheel. A ground reaction force (R)—arising due to the drag force being offset near the top of the wheel—is also shown. The force (A) applied at the axle needed to overcome the combination of drag forces (F+P) and reaction force (R) is also shown.
Figure 19:
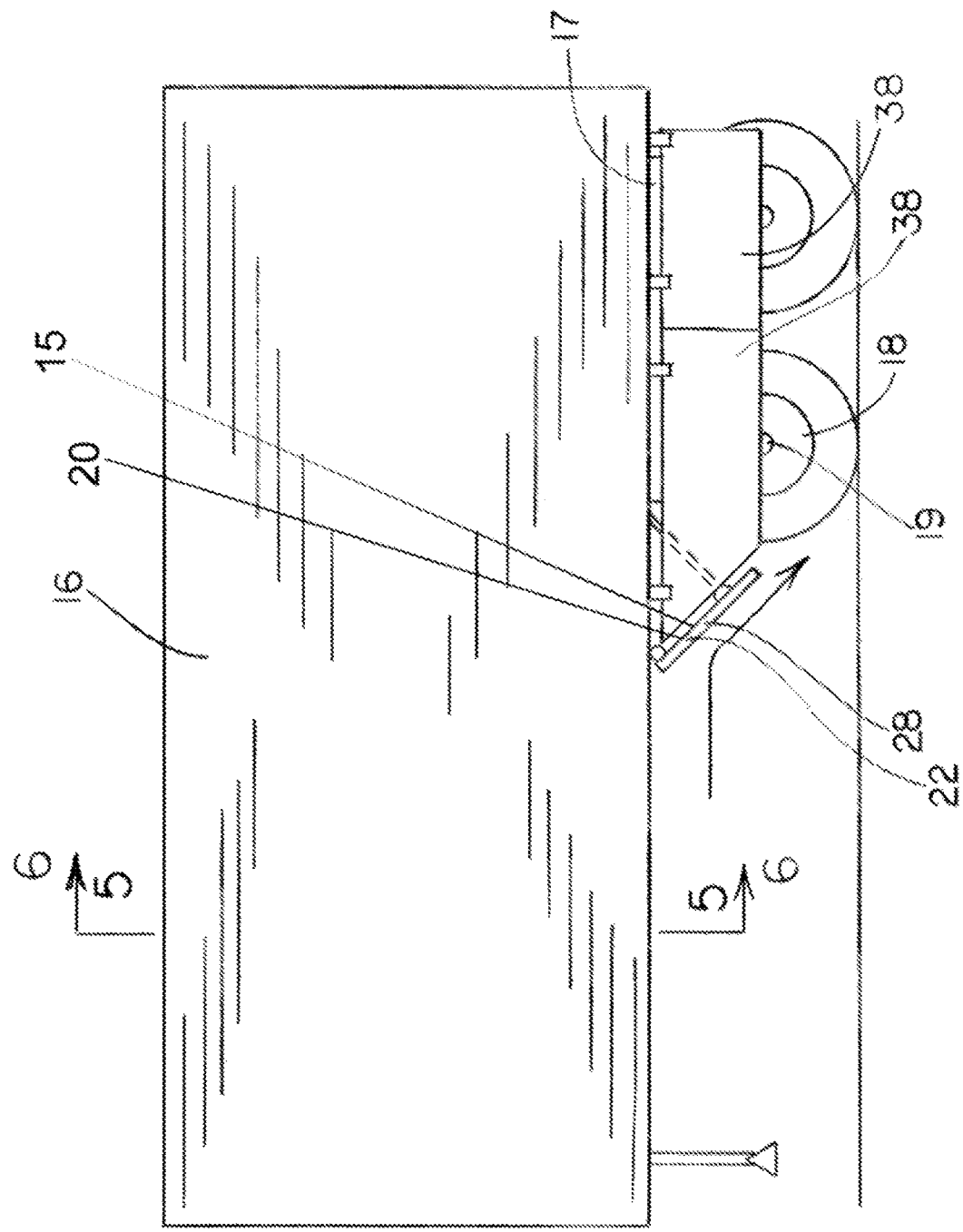
In FIG. 19, an inclined aerodynamic deflector panel and wheel skirt assembly is mounted underneath the trailer of an industrial truck.

Importantly, due to the rotating geometry of the wheel, it can be shown that the effective combined frictional drag force exerted upon the wheel is typically centered in closer proximity to the top of the wheel, rather than centered closer to the axle as has been commonly assumed in many past analyses of total wheel drag forces. While the net pressure (or form) drag (P) force on the forwardly facing profile of the wheel is generally centered with elevation and directed near the axle on the wheel (as shown in FIG. 17), the net frictional drag force (F) upon the moving surfaces is generally offset to near the top of the wheel (as shown in FIG. 18).

Indeed, it is near the top of the wheel where the relative winds are both greatest in magnitude, and are generally oriented most directly opposed to the forward motion of rotating wheel surfaces. Moreover, in the absence of substantial external headwinds, the frictional drag exerted upon the lower wheel surfaces contributes relatively little to the net drag upon the wheel, especially when compared to the drag upon the upper surfaces. The combined horizontal drag forces (from pressure drag from headwinds deflected by both the leading and trailing wheel forwardly facing profiles, and from frictional drag from headwinds impinging upon the forwardly moving surfaces) are thus generally concentrated near the top of the wheel under typical operating conditions. Moreover, with the faster relative winds being directed against the uppermost wheel surfaces, total drag forces combine near the top to exert considerable retarding torque upon the wheel.

As mentioned, the horizontal drag forces are primarily due to both pressure drag forces generally distributed symmetrically across the forwardly facing vertical profiles of the wheel, and to winds in frictional contact with moving surfaces of the wheel. Pressure drag forces arise primarily from the displacement of air from around the advancing vertical profile of the wheel, whose circular outline moves at the speed at the vehicle. As discussed above, since the entire circular profile moves uniformly at the vehicle speed, the displacement of air from around the moving circular profile is generally uniformly distributed with elevation across the forwardly facing vertical profile of the wheel. Thus, these pressure drag forces (P, as shown in FIG. 17 and FIG. 18) are also generally evenly distributed with elevation across the entire forwardly facing vertical profile of the wheel, and centered near the axle. And these evenly distributed pressure drag forces arise generally in proportion only to the effective headwind speed of the vehicle.

Frictional drag forces (F, as shown FIG. 18), however, are concentrated near the top of the wheel where moving surfaces generally exceed vehicle speed—while the lower wheel surfaces move at less than the vehicle speed. Since drag forces are generally proportional to the square of the effective wind speed, it becomes apparent that with increasing wind speed, that these upper wheel frictional drag forces directed upon the moving surfaces increase much more rapidly than do pressure drag forces directed upon the forward profile of the wheel. Indeed, these friction drag forces generally arise in much greater proportion to an increasing effective headwind speed of the vehicle. Nevertheless, these increased frictional drag forces being directed on the upper wheel is only a partial factor contributing to augmented wheel drag forces being responsible for significantly retarded vehicle motion.

Significantly, both types of drag forces can be shown to exert moments of force pivoting about the point of ground contact. And as such, either type of drag force exerted upon the upper wheel retards vehicle motion considerably more than a similar force exerted upon a substantially lower surface of the wheel. Minimizing these upper wheel drag forces is therefore critical to improving propulsive efficiency of the vehicle.

Also important—and due to the rotating geometry of the wheel—it can be shown that the vehicle propulsive force on the wheel applied horizontally at the axle must substantially exceed the net opposing drag force exerted near the top of the wheel. These forces on a wheel are actually leveraged against each other, both pivoting about the same point—the point on the wheel which is in stationary contact with the ground—and which is constantly changing lateral position with wheel rotation. Indeed, with the geometry of a rolling wheel momentarily pivoting about the stationary point of ground contact, the lateral drag and propulsive forces each exert opposing moments of force on the wheel centered about this same point in contact with the ground.

Furthermore, unless the wheel is accelerating, the net torque from these combined moments on the wheel must be null: The propulsive moment generated on the wheel from the applied force at the axle must substantially equal the opposing moment from drag forces centered near the top of the wheel (absent other resistive forces, such as bearing friction, etc.). And the propulsive moment generated from the applied force at the axle has a much shorter moment arm (equal to the wheel radius) than the opposing moment from the net drag force centered near the top of the wheel (with a moment arm substantially exceeding the wheel radius)—since both moment arms are pivoting about the same stationary ground contact point. Thus, for these opposing moments to precisely counterbalance each other, the propulsive force applied at the axle—with the shorter moment arm—must substantially exceed the net drag force near the top of the wheel.

In this way, the horizontal drag forces exerted upon the upper surfaces of the wheel are leveraged against opposing and substantially magnified forces at the axle. Hence, a relatively small frictional drag force centered near the top of the wheel can have a relatively high impact on the propulsive counterforce required at the axle. Shielding these upper wheel surfaces can divert much of these headwind-induced drag forces directly onto the vehicle body, thereby negating much of the retarding force amplification effects due to the pivoting wheel geometry.

Moreover, since the propulsive force applied at the axle exceeds the combined upper wheel drag forces, a lateral reaction force (R, as shown in FIG. 18) upon the wheel is necessarily developed at the ground contact point, countering the combined unbalanced propulsive and drag forces on the wheel: Unless the wheel is accelerating, the reaction force at the ground, together with the upper wheel net drag forces (F+P), combine (A=F+R+P, as shown in FIG. 18) to countervail the lateral propulsive force (A) applied at the axle. This reaction force is transmitted to the wheel through frictional contact with the ground. In this way, an upper wheel drag force is further magnified against the axle. For these multiple reasons, it becomes crucial to shield the upper wheel surfaces from exposure to headwinds.

Given that the propulsive force (A) applied at the axle must overcome both the net wheel drag forces (F+P) and the countervailing lower reaction force (R) transmitted through the ground contact point, it can be shown that the net drag force upon the upper wheel can oppose vehicle motion with nearly twice the sensitivity as an equivalent drag force upon the static frame of the vehicle. Hence, shifting the impact of upper wheel drag forces to the static frame can significantly improve the propulsive efficiency of the vehicle.

Furthermore, as drag forces generally increase in proportion to the square of the effective wind speed, the more highly sensitive upper wheel drag forces increase far more rapidly with increasing headwind speeds than do vehicle frame drag forces. Thus, as the vehicle speed increases, upper wheel drag forces rapidly become an increasing component of the total drag forces retarding vehicle motion.

And given the greater sensitivity of speed-dependent upper wheel drag forces—as compared against vehicle frame drag forces—to the retarding of vehicle motion, considerable effort should first be given to minimizing upper wheel drag forces. And shielding the faster-moving uppermost surfaces of the wheel assembly from oncoming headwinds, by using the smallest effective fairing assembly, is an effective means to minimize upper wheel drag forces.

Contrarily, drag forces on the lower wheel generally oppose vehicle motion with reduced sensitivity compared to equivalent drag forces on the static frame of the vehicle. Propulsive forces applied at the axle are levered against lower wheel drag forces, magnifying their impact against these lower wheel forces. Shielding lower wheel surfaces can generally negate this mechanical advantage, and can actually increase overall drag on the vehicle.

Moreover, as discussed above, headwinds on the static frame generally exceed the speed of winds impinging on the lower surfaces of the wheel. Hence, frictional drag forces on the lower wheel surfaces are greatly reduced. Thus, it is generally counterproductive to shield the wheel below the level of the axle. Drag on a vehicle is generally minimized with upper wheel surfaces shielded from headwinds and with lower wheel surfaces exposed to headwinds.

Wheel drag sensitivity to retarding vehicle motion becomes even more significant in the presence of external headwinds. With external headwinds, the effective wind speed impinging on the critical upper wheel surfaces can well exceed twice the vehicle speed. Shielding protects the upper wheel surfaces both from external headwinds, and from headwinds due solely to vehicle motion.

Indeed, wheel surfaces covered by the shield are exposed to winds due solely to wheel rotation; headwinds are deflected. The effective drag winds beneath the shield are generally directed tangentially to rotating wheel surfaces, and vary in proportion to radial distance from the axle, reaching a maximum speed at the wheel rim equal to the vehicle speed, regardless of external headwinds. Since drag forces vary generally in proportion to the square of the wind speed, the frictional drag forces are considerably reduced on shielded upper wheel surfaces. Using these wind shields, shielded wheel surfaces are exposed to substantially reduced effective wind speeds—and to generally much less than half of the drag forces without shielding.

Diminished drag forces from external headwinds impinging on the slower moving lower surfaces of a rolling wheel generally oppose wheel motion with much less retarding torque than drag forces from winds impinging on the faster upper surfaces. Indeed, tests demonstrate that with upper shields installed on a suspended bicycle wheel, the wheel will spin naturally in the forward direction when exposed to headwinds. Without the shields installed, the same wheel remains stationary when exposed to headwinds, regardless of the speed of the headwind. And an unshielded spinning wheel will tend to stop spinning when suddenly exposed to a headwind. This simple test offers an explanation for the unexpected result and demonstrates that by minimally shielding only the upper wheel surfaces from external headwinds, the overall drag upon the rotating wheel can be substantially reduced.

Furthermore, as external headwinds upon a forwardly rotating vehicle wheel add relatively little frictional drag to the lower wheel surfaces—which move forward at less than the vehicle speed—but add far more significant drag to the upper wheel surfaces, which move forward faster than the vehicle speed and which can more significantly retard vehicle motion, shielding the upper wheel surfaces against headwinds is particularly beneficial. Since drag forces upon the wheel are generally proportional to the square of the effective wind speed thereon, and the additional drag on the wheel—and thereby on the vehicle—increases rapidly with headwinds, shielding these upper surfaces greatly reduces the power required to propel the vehicle. Moreover, the relative effectiveness of shielding upper wheel surfaces generally increases with increasing headwinds.

Figure 15:
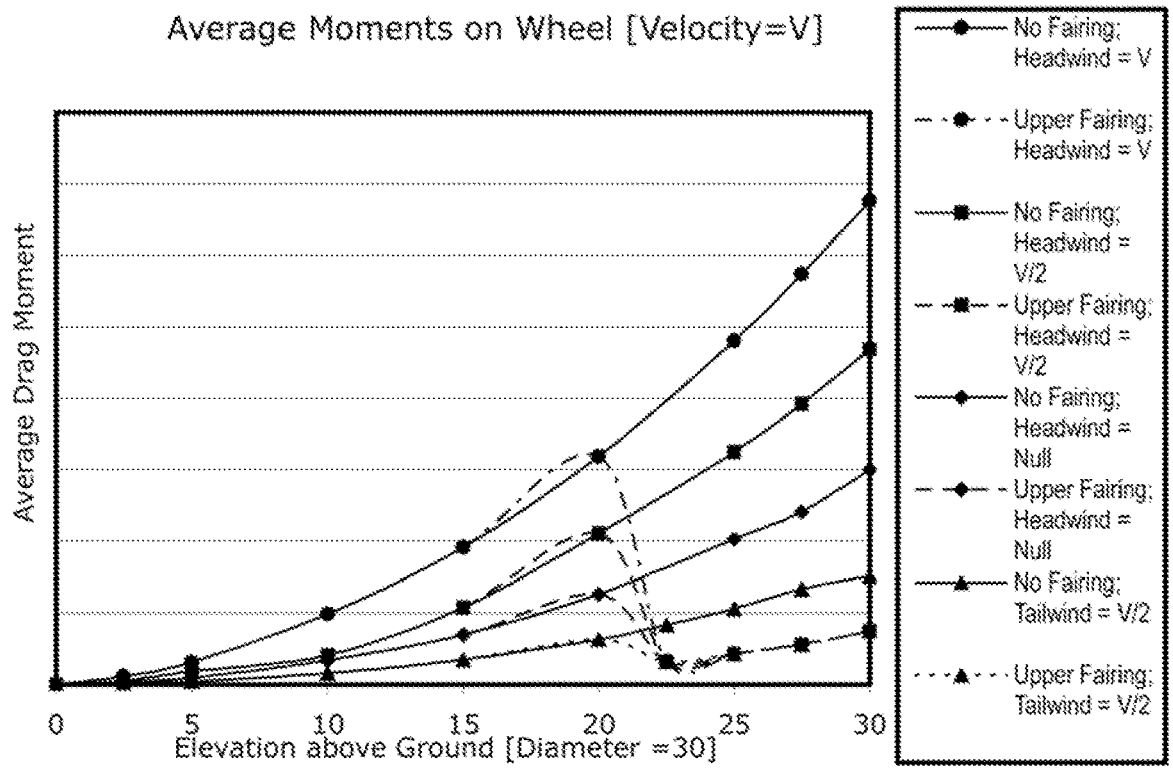
FIG. 15 shows a plot of calculated average moments— about the ground contact point—of drag force, that are exerted upon rotating wheel surfaces as a function of the elevation above the ground. The relative drag forces are determined from calculated wind vectors for the rotating surfaces on a wheel moving at a constant speed of V, and plotted for several different wind and wheel-surface shielding conditions. Specifically, relative magnitudes in average drag moments about the ground contact point as a function of elevation are plotted, for eight conditions: comparing with (dashed lines) and without (solid lines) shielding covering the upper third of wheel surfaces, for tailwinds equal to half the vehicle speed; for null headwinds; for headwinds equal to half the vehicle speed; and for headwinds equal to the vehicle speed. The rising solid curves plotted show the highest moments to be near the top of the wheel, while the dashed curves show the effect of the upper shield in substantially reducing the average drag moments on the rotating wheel.
Figure 16:
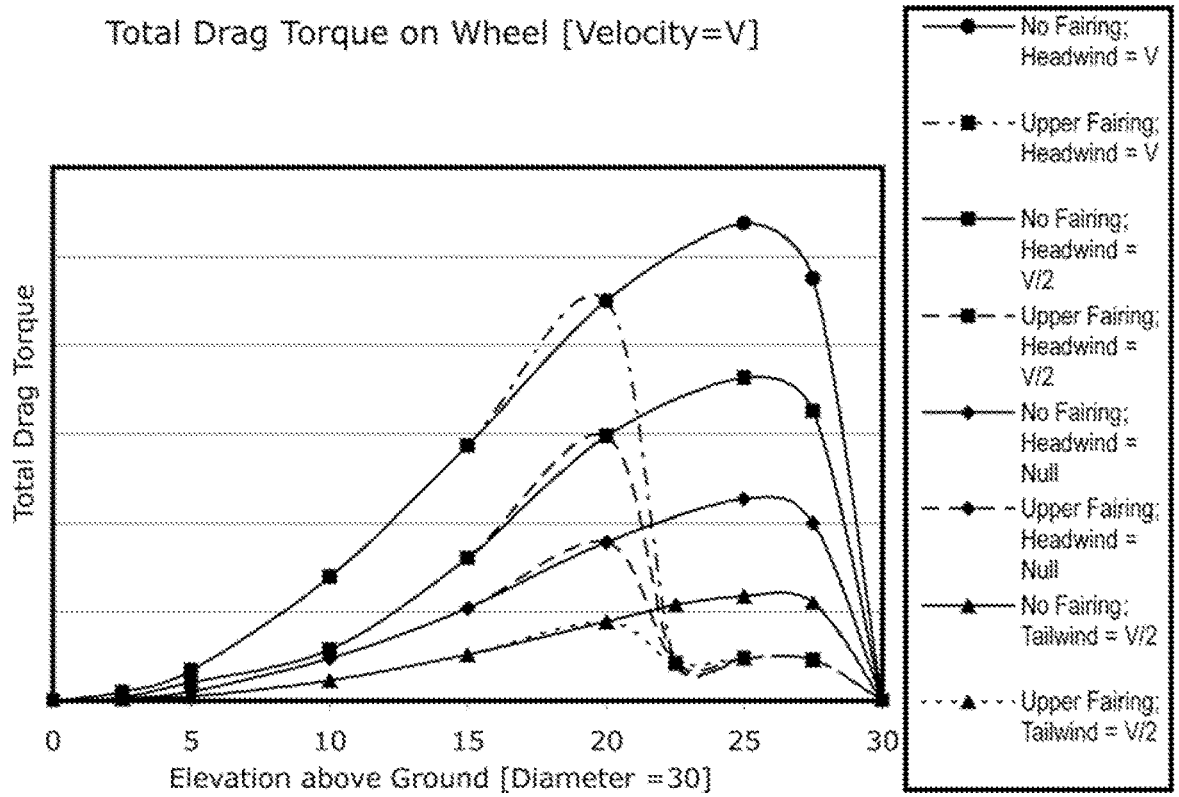
FIG. 16 shows a plot of calculated relative drag torque exerted upon rotating wheel surfaces as a function of elevation above the ground. The relative total drag torques are determined from the calculated average moments in combination with the chord length at various elevations on a wheel moving at a constant speed of V, for several different wind and wheel-surface shielding conditions. Relative magnitudes in total drag torque about the ground contact point as a function of elevation are plotted for eight conditions: comparing with (dashed lines) and without (solid lines) shielding covering the upper third of wheel surfaces, for tailwinds equal to half the vehicle speed; for null headwinds; for headwinds equal to half the vehicle speed; and for headwinds equal to the vehicle speed. The areas under the plotted curves represent the total torque from frictional drag on wheel surfaces. Comparing the differences in area under the plotted curves reveals the general trend of the upper shield to substantially reduce the total drag torque on the rotating wheel.

An examination of the retarding wind vectors on a rotating wheel can reveal the large magnitude of drag retarding moments upon the uppermost wheel surfaces, relative to the lower wheel surfaces. And an estimate of the frictional drag torque on the wheel can be determined by first calculating the average moments due to drag force vectors at various points—all pivoting about the ground contact point—on the wheel (results shown plotted in FIG. 15), and then summing these moments at various wheel elevations above the ground and plotting the results (FIG. 16). The area under the resulting curve (shown in FIG. 16 as a series of curves representing various headwind conditions) then represents the total frictional drag (absent profile drag) torque upon the wheel.

In order to determine the relationship between this torque and elevation on the wheel, the magnitudes of the drag wind vectors that are orthogonal to their corresponding moment arms pivoting about the point of ground contact must first be determined. These orthogonal vector components can be squared and then multiplied by the length of their corresponding moment arms, in order to determine the relative moments due to drag at various points along the wheel rim.

The orthogonal components of these wind vectors tend to increase linearly with elevation for points on the rim of the wheel, and also for points along the vertical mid-line of the wheel. Calculating the moments along the vertical mid-line of the wheel can yield the minimum relative drag moments at each elevation. Calculating an average of the maximum drag moment at the rim combined with the minimum drag moment along the mid-line can then yield the approximate average drag moment exerted at each elevation upon the wheel. Multiplying this average drag moment by the horizontal rim-to-rim chord length can yield an estimate of the drag torque exerted upon the wheel at each elevation level (FIG. 16). These calculations are simply determined from the geometry of the rotating wheel; the object of this analysis is to determine the likely relative magnitudes of drag torques upon the wheel at various elevations.

From the resulting plots (FIG. 16), it can be estimated that the uppermost approximate one-third section of the wheel likely contributes most of the overall drag torque upon the wheel. Thus, by shielding this upper section from headwinds, drag torque can be considerably reduced. With upper-wheel shielding, as noted above, the relative winds beneath the shield are due mostly to wheel rotation, and are generally directed tangentially to the wheel. The resulting drag torque under the shielded sections can then be determined as above, and compared with the unshielded drag torque for similar headwind conditions.

These calculations—generally confirmed by tests—indicate a substantial reduction in retarding drag torque upon the shielded upper wheel surfaces. In the absence of external headwinds, the plots of FIG. 16 indicate that shielding the uppermost approximate one-third section of the wheel can reduce the drag torque of this section considerably, by as much as 75 percent. Moreover, repeating calculations and testing with an external headwind equal to the vehicle speed indicates that upper wheel shielding can reduce the comparative upper wheel drag torque of this section by still more, perhaps by as much as 90 percent. Hence, the potential effectiveness of shielding upper wheel surfaces can be significant, especially with surfaces having higher drag sensitivities, such as wheel spoke surfaces.

As discussed above, since upper wheel drag forces are leveraged against the axle—thereby magnifying the propulsive counterforce required at the axle—an increase in drag force on the wheels generally retards vehicle motion much more rapidly than does an increase in other vehicle drag forces. And while under external headwind conditions, the total drag on a vehicle with wheels exposed directly to headwinds increases still more rapidly with increasing vehicle speed.

Shielding upper wheel surfaces effectively lowers the elevation of the point on the wheel where the effective net drag force is exerted, thereby diminishing the magnifying effect of the propulsive counterforce required at the axle, as discussed above. As a result, the reduction in drag force upon the vehicle achieved by shielding the upper wheel surfaces is comparatively even more significant with increasing external headwinds. Shielding these upper wheel surfaces can thereby improve relative vehicle propulsion efficiency under headwinds by an even greater margin than under null wind conditions.

Moreover, shielding these upper wheel surfaces can be particularly beneficial to spoked wheels, as round spokes can have drag sensitivities many times greater than that of more streamlined surfaces. As round spokes—in some configurations—can have drag coefficients ranging from one to two orders of magnitude greater than corresponding smooth, streamlined surfaces, shielding the spokes of the upper wheel from external wind becomes particularly crucial in reducing overall drag upon the wheel.

Accordingly—given these multiple factors—a relatively small streamlined fairing attached to the vehicle structure and oriented to shield the upper surfaces of the wheel assembly from oncoming headwinds substantially reduces drag upon the wheel, while minimizing total drag upon the vehicle. Consequently, an embodiment includes the addition of such a fairing to any wheeled vehicle—including vehicles having spoked wheels, where the potential drag reduction can be even more significant.

The addition of such minimal fairings to each side of a traditional spoked bicycle wheel, for example, reduces windage losses and improves propulsive efficiency of the bicycle, particularly at higher cycle speeds or in the presence of headwinds, while minimizing cycle instability due to crosswind forces. Since crosswinds are a significant factor restricting the use of larger wheel covers, minimizing the fairing size is also an important design consideration. And minimizing form drag induced by the forward-facing profile of the fairing also will influence the fairing design. The preferred fairing size will likely substantially cover the upper section of the exposed wheel, and be placed closely adjacent to the wheel surfaces, consistent with general use in bicycles. In heavier or powered cycles, design considerations may permit somewhat larger fairings, covering even more of the wheel surfaces.

As shielding upper wheel surfaces can reduce overall drag on the vehicle, while simultaneously augmenting the total frontal profile area of the vehicle exposed to headwinds, a natural design constraint emerges from these competing factors: Shields should be designed sufficiently streamlined and positioned sufficiently close to wheel surfaces to provide reduced overall vehicle drag. And as shielding effectiveness potentially increases under headwind conditions, shields designed with larger surface areas and larger frontal profiles may still provide reduced overall vehicle drag under headwind conditions, if not under null wind conditions. Thus, a range of design criteria may be applied to selecting the best configuration and arrangement of the fairing, and will likely depend on the particular application. In any particular application, however, the embodiment will include a combination of design factors discussed above that will provide a reduction in overall vehicle drag.

In a cycle application, for example, fairings positioned within the width of the fork assembly will likely provide the most streamlined design which both shields spokes from headwinds but also minimizes any additional form drag profile area to the vehicle frame assembly. In other applications, insufficient clearances may preclude positioning the fairings immediately adjacent to moving wheel surfaces. In such situations, headwinds may be sufficient in magnitude to cause a reduction in overall vehicle drag to justify the use of wider upper wheel fairings—positioned largely outside the width of the fork assembly—with extended forward profile areas.

Furthermore, from the previous analysis a consideration the drag torque curves wholly above the level of the axle, it becomes apparent that shielding the wheel is best centered about an elevation likely between 75 and 80 percent of the diameter of the wheel, or near the center of the area under the unshielded torque curve shown in FIG. 16. While drag forces are generally greatest in magnitude near the top of the wheel, the effective exposed topmost surface areas are much smaller, thereby limiting the magnitude of drag torques upon the uppermost surfaces of the wheel. Thus, the upper wheel fairing would best extend above and below this critical level (generally, between 75 and 80 percent of the diameter of the wheel) in order to optimally minimize drag upon the wheel. And as the surfaces forward of the axle are the first to be impacted by headwinds, shielding these surfaces is essential to deflecting headwinds from the rearward surfaces. Thus, the higher-sensitivity drag-inducing surfaces in the forward upper quadrant and centered about this critical elevation on the wheel generally need to be shielded for optimal minimization of drag. These higher-sensitivity drag-inducing surfaces generally centered about this critical elevation and extending to include those surfaces with higher drag-inducing sensitivities that are positioned mostly in the forward upper quadrant of the wheel, but likely also to include much of the wheel surfaces positioned in the rearward upper quadrant, are herein defined and later referred to as: major upper drag-inducing surfaces. And the critical level about which the major drag-inducing surfaces are generally centered in elevation is herein defined and later referred to as: critical elevation.

As discussed, the precise elevation about which the major upper drag-inducing surfaces are centered, as well as the precise extent to which surfaces in the forward quadrant and in the upper half of the wheel are included in the major upper drag-inducing surfaces, will depend on the particular application and operating conditions. Certain wheel surfaces with higher drag sensitivities, such as wheel spokes, generally need to be shielded when positioned within the region of the major upper drag-inducing surfaces. Other surfaces such as smooth tire surfaces having lower drag sensitivities may also benefit from shielding if their surface areas are extensive, are positioned near the critical level in elevation, or are the primary upper wheel surfaces exposed to headwinds. In the example analysis of FIGS. 15 and 16, a uniform surface across the wheel having a constant drag-sensitivity was assumed. In any particular application, the unique combination of different wheel surfaces with differing drag sensitivities will determine the particular height of the critical elevation level about which the major upper drag-inducing surfaces are centered.

A similar analysis can be performed for form drag forces on the moving forward vertical profiles of the wheel rim or tire. The results obtained are generally similar in form, though may differ somewhat in magnitudes as the effective wind speeds on the moving profiles are generally lower on the upper wheel—equal to the vehicle speed—and will depend on the particular application, including the total area of the wheel forward profile exposed to headwinds, and to headwind and vehicle speeds. Nevertheless, the net pressure drag torque caused by the moving outline of the wheel is also centered above the level of the axle, and thereby merits consideration in determining the particular height of the critical elevation level, and in the ultimate configuration of the fairing.

Figure 13:
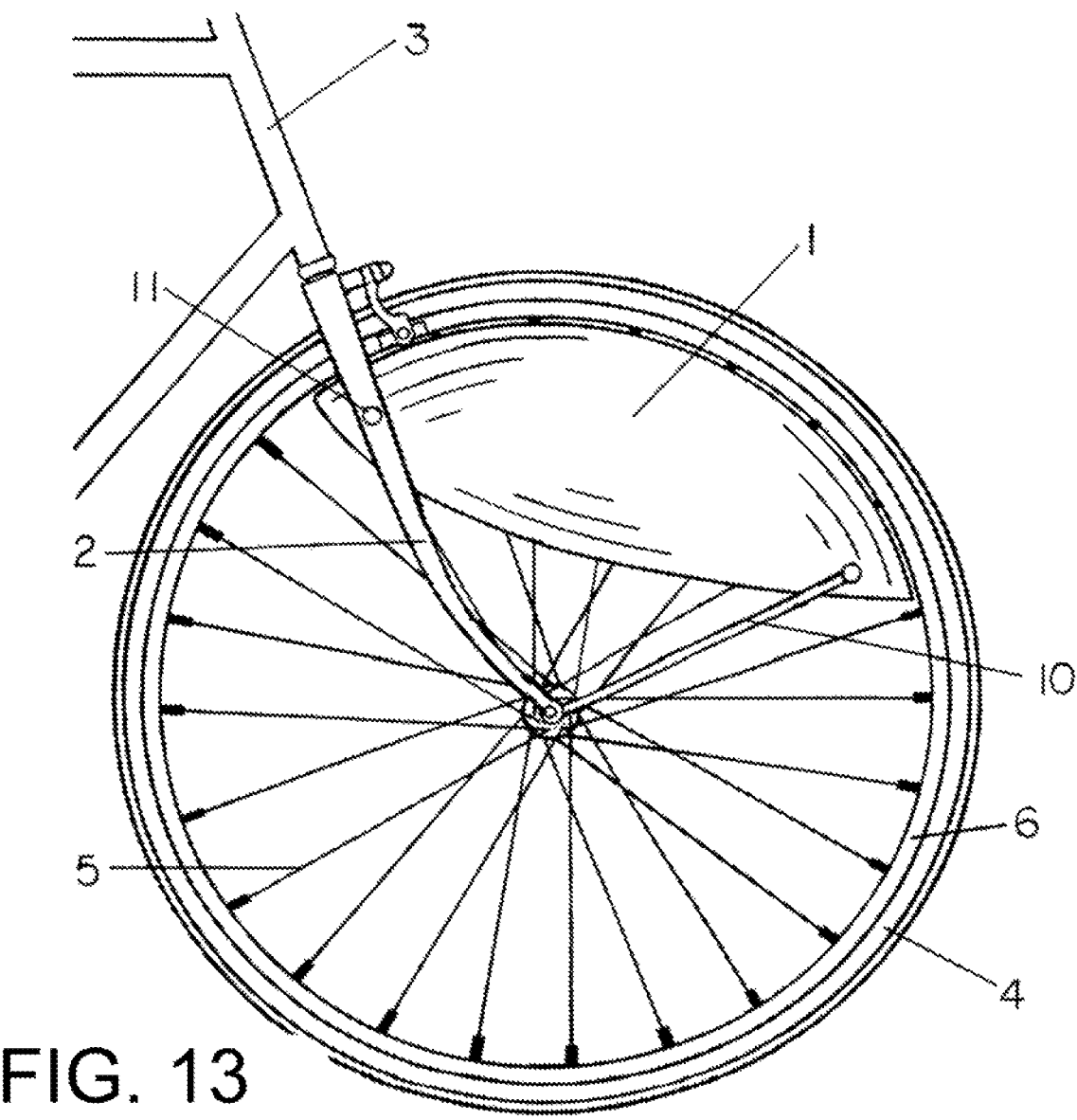
FIG. 13 is a front cycle wheel assembly, as typically found on a bicycle or motorcycle, where a fairing is attached and positioned as shown to each interior side of the fork assembly, thereby shielding the upper- and front-most surfaces of the spoked wheel from oncoming headwinds.

Hence, the fairing shown in FIG. 13 is best configured to shield the uppermost and forward wheel surfaces, and to extend rearward to at least partially shield the forward profile of the trailing portion of the upper wheel rim, consistent with the further requirement to extend downward as much as practical to the level of the axle. As mentioned, crosswind considerations will also influence the ultimate configuration for a particular application.

In consideration of further embodiments described below, the operating principles described above will generally apply, and may be referred thereto.

DESCRIPTION OF VARIOUS REFERENCE EMBODIMENTS

Various wheel-shielding reference embodiments are first described below in detail, each providing means to deflect headwinds from directly impinging on the upper wheel surfaces and partially onto the lower wheel surfaces of a trailing wheel assembly, thereby reducing vehicle drag and increasing propulsive efficiency. A reference embodiment is then presented comprising an inner skirt panel disposed under a semitrailer and arranged to stabilize the air passing under central axle and through the central open-space within the tandem wheel assembly. And finally, a present embodiment is then presented comprising an inwardly disposed trailer skirt panel assembly located substantially inset laterally toward the longitudinal centerline of the vehicle and disposed to extend substantially forward of the wheels of a rearward wheel assembly disposed on a semitrailer or truck.

Figure 1:
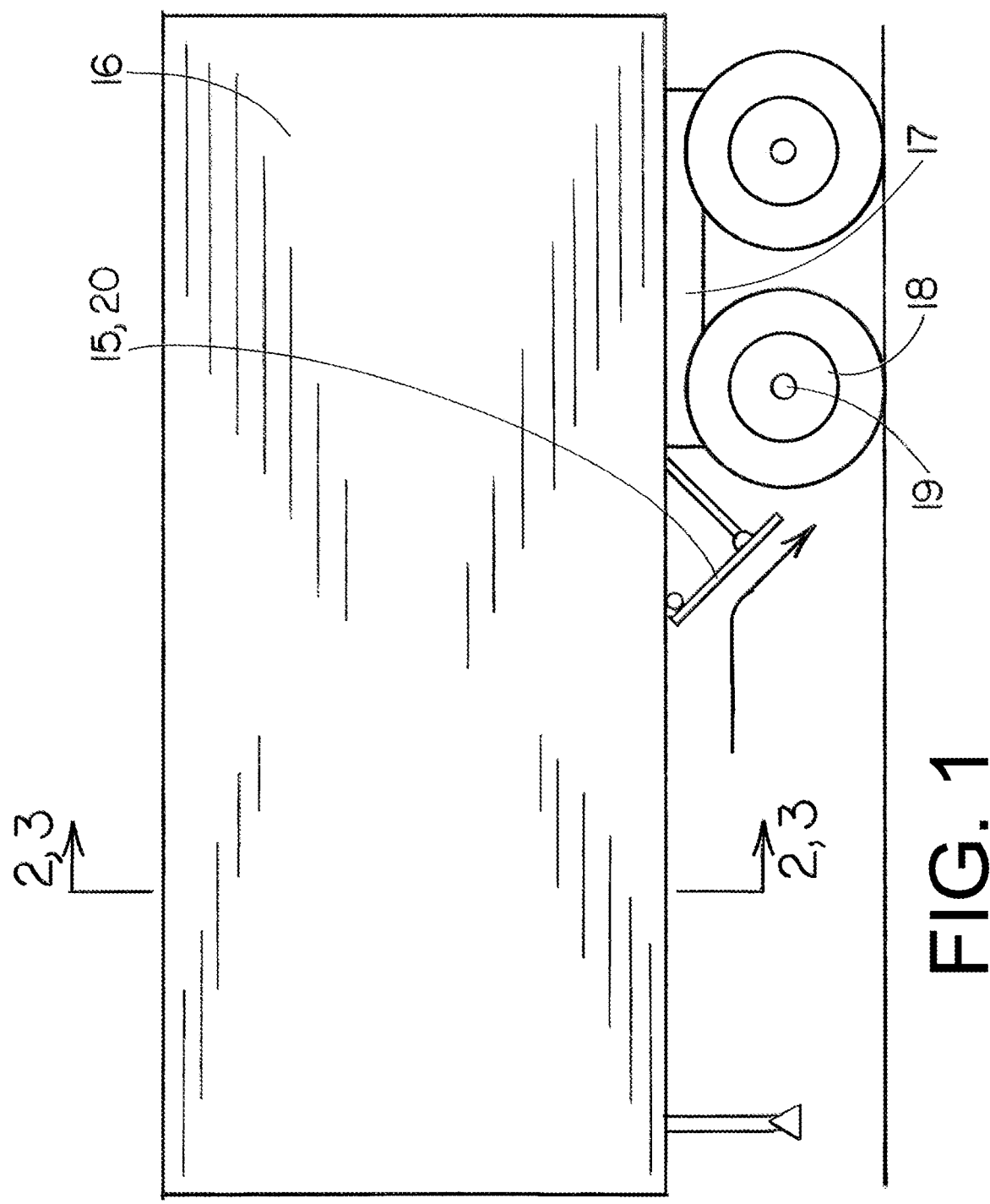
In FIG. 1, an inclined aerodynamic deflector panel assembly is mounted underneath the trailer of an industrial truck in front of a wheel set of the rear wheel assembly and rearward of the forward landing gear.
Figure 2:
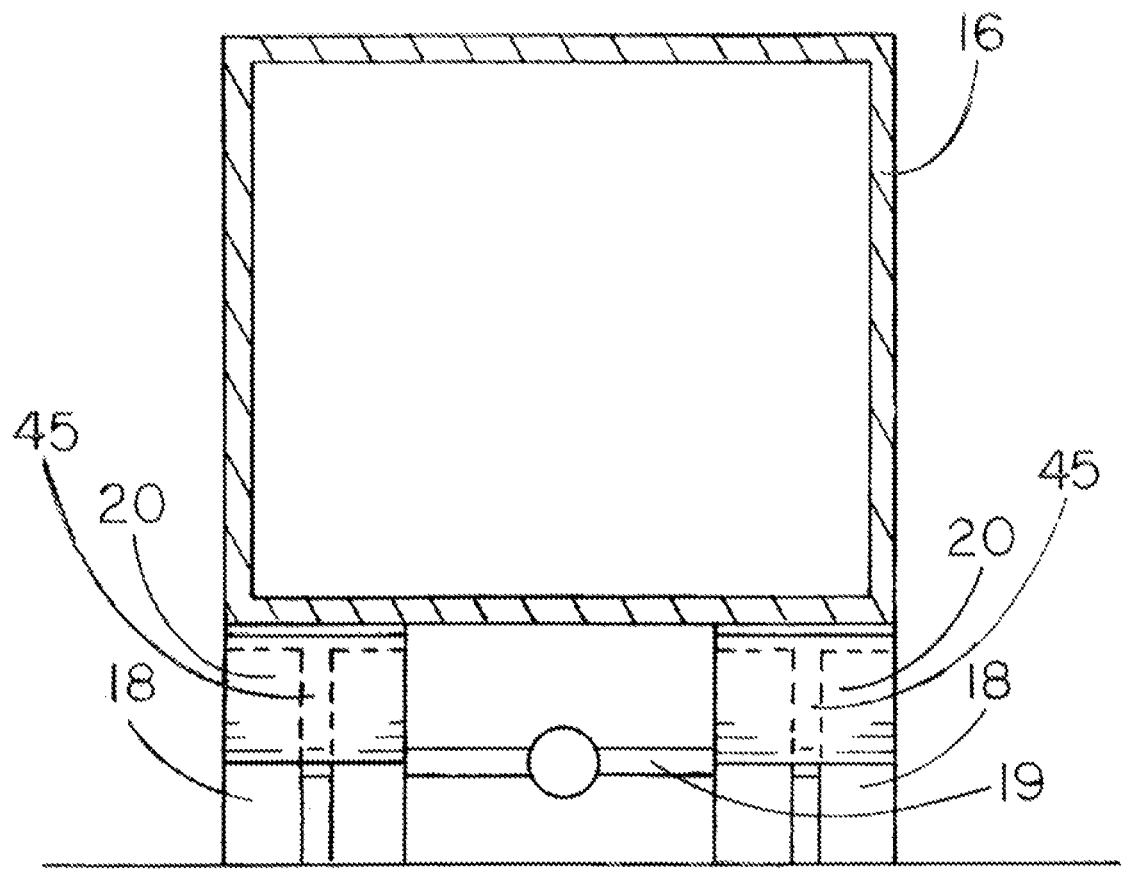
In FIG. 2, the inclined aerodynamic wheel deflector panel assembly of FIG. 1 is shown mounted on the trailer as viewed in cross-section from the front of the vehicle. Two deflector panel assemblies are shown, each as mounted in front of one of the wheel sets of the rear wheel assembly.

First Reference Embodiment FIGS. 1 and 2

As shown in FIGS. 1 and 2, a reference embodiment comprises an inclined aerodynamic wheel deflector panel assembly 20 attached to and mounted underneath the body of a trailer 16 for a commercial vehicle. The inclined wheel deflector panel assembly 20 is located forward of the rear wheel assembly 17 and located directly in front of a trailing wheel set 18 which would otherwise be exposed to headwinds when the vehicle is in forward motion. The inclined wheel deflector panel assembly 20 is planar in shape, mounted inclined in a forwardly-angled orientation with the upper edge more forwardly located and the lower surface located more rearward on the vehicle. The inclined wheel deflector panel assembly 20 spans the lateral width of the trailing wheel set 18 of the trailing rear wheel assembly 17 located on either side of the vehicle. The optimal inclined wheel deflector panel assembly 20 extends downward ideally to no lower than the level of the axle 19 and is located proximal to the trailing wheel set 18 in order to deflect upper wheel headwinds onto the exposed lower wheel surfaces.

It can be concluded from the discussion of wheel drag mechanics above, that since propulsive counterforces applied to the wheel at the axle have a mechanical advantage over lower wheel drag forces—which are necessarily applied to the wheel below the level of the axle—directing upper wheel headwinds onto the lower wheel surfaces can significantly reduce overall vehicle drag and improve propulsive efficiency. The reasons for these gains in vehicle efficiency become apparent by further considering how wheel drag forces compare with vehicle body drag forces.

As discussed earlier, drag forces on the wheel must be countered by a propulsive force from the vehicle body applied at the axle. And it can be established that drag forces on the upper wheel have a mechanical advantage over countervailing propulsive counterforces applied at the axle. And with the wheel deflector assembly attached to the vehicle body, drag on the deflector must also be countervailed by a propulsive counterforce applied to the vehicle body at a propulsive axle.

Thus, in order to determine the relative difference in total vehicle drag between the traditional extended height deflector diverting headwinds from impinging on both the upper and the lower wheels, and the improved reduced height deflector with the lower wheel surfaces ideally fully exposed to headwinds, the added vehicle drag derived from the surface of the deflector panel extending below the level of the axle must be compared against the vehicle drag arising from the corresponding additional surfaces of the lower wheel otherwise shielded by the extended deflector. And as already established above, the relative effects of these resistive forces on vehicle propulsion are non-linearly related, and vary considerably with increasing headwinds: for vehicles facing faster external headwinds the nonlinear effects quickly increase, as discussed above and as shown in FIG. 14, where the results of an analysis of the drag mechanics of a bicycle facing increasing headwinds shows rapid increases in propulsive efficiency by shielding the upper wheels.

A skilled artisan will recognize from the curves shown FIG. 14 that as the relative external headwind increases on the vehicle, so does the increase in propulsive efficiency of the vehicle. And a skilled artisan will also recognize that the natural design constraint described above for the cycle wheel fairing of FIG. 13 similarly applies to the wind deflecting fairing of the present embodiment.

This inherent design constraint implies that for a given vehicle under a given relative external headwind condition—as shown along the horizontal axis of the plots in FIG. 14—a wind-deflecting fairing of the present embodiment will similarly be constrained to have a limited overall wind-deflecting extent that will produce a reduction in overall vehicle drag. This limited wind-deflecting extent includes a limit on the total drag-inducing surface area extent of the wind-deflecting fairing, including a combined limit in both forward and downward extension of fairing surfaces.

And as discussed extensively above for the cycle wheel fairing of FIG. 13, the relative effects of drag forces on the fairing versus drag on the various points on the wheel are not simply related. Instead, the drag forces on various points on the wheel are magnified or de-magnified as applied against the axle, whereas the drag on either the cycle fairing or on the similar drag-inducing surfaces of the wind-deflecting fairing of the present embodiment are directly applied equivalently against the same axle.

Thus, since propulsive counterforces applied at the axle have a mechanical advantage over drag forces on the lower wheel surfaces, a simple comparison of the net drag force on either surface alone—either on the lower wheel or on the extended deflector surface—is entirely insufficient to determine the relative effect each has on vehicle propulsive efficiency. Instead, the magnitudes of the drag force from each surface must be reflected to an equivalent force applied at the same axle and compared against one another.

For the lower wheel surfaces, the net drag force as applied against the axle is diminished by leveraging about the point of ground contact, as previously discussed. For the lower deflector panel surface, the drag force is directed against the axle without magnification since it is transmitted directly through the body and frame of the vehicle. Although another axle of the vehicle may be the used as the propulsive axle, the two net drag forces must be compared against each other as reflected at the same affected axle in order to gauge their relative effects on overall vehicle drag.

For the lower deflector surface, the drag force on the surface is—like other vehicle body drag forces—directly countervailed by the propulsive counterforce applied at the driven axle. For the lower wheel surfaces, the situation is more complicated due both to the mechanical advantage that the propulsive forces have over lower wheel drag forces, and to the effects that the summation moments of drag force (FIG. 15) at different points on the rotating wheel have on the net lower wheel drag force.

As noted earlier under the Description of Wheel Drag Mechanics, and as shown in the plot of FIG. 16, the average drag torque exerted against the lower wheel surfaces has far less impact on the total wheel drag as exerted upon the vehicle than does the average drag torque exerted against the upper wheel surfaces. This is due largely to the pivoting geometry of the rotating wheel, where wheel forces are levered about the same stationary point of ground contact at the bottom of the wheel. Owing in part to their longer moment arms, drag forces applied to the upper wheel produce far greater resistive torques on the wheel than do drag forces applied to the lower wheel.

Consequently, drag forces on the upper wheel surfaces are ideally shifted to the lower wheel surfaces in order to benefit the propulsive efficiency of the vehicle. As a result, deflecting headwinds from the upper wheel surfaces onto the lower wheel surfaces can substantially reduce overall vehicle drag and improve propulsive efficiency.

And in the case of industrial trucks having large wheels with larger tires, the relative effects of resistive pressure drag forces on the wheel over frictional drag forces is exacerbated over that of a spoked bicycle wheel as described above in the discussion of the wheel drag mechanics. As mentioned, the spoked wheels with thin tires and rims used on a bicycle can produce significant frictional drag effects resisting vehicle propulsion. Trucks with smooth wheels and tires are more significantly affected by pressure drag forces acting against the upper wheel forward-facing profile surfaces, than are bicycles with thin tires and rims.

Thus for trucks, deflecting upper wheel headwinds downward onto the lower wheel becomes an important operating function. Since propulsive counterforces at the axle have a mechanical advantage over lower wheel drag forces applied to the wheel below the level of the axle, deflecting headwinds downward onto the lower wheel can reduce overall vehicle drag and improve propulsive efficiency.

The natural design constraint method discussed above can also be used in combination with an accounting for the non-linear effects on vehicle drag from drag forces directed on various points on the wheel to determine the limited extent of the wind-deflecting fairing of the present embodiment that will also yield an overall reduction in vehicle drag, including the combined limit in both forward and downward extent of the fairing. And as is evident from the curves of FIG. 14, the combined limit for the overall drag-inducing extent of the wind-deflecting fairing of the present embodiment will vary with both vehicle configuration and relative external headwind condition.

From an examination of the curves of FIG. 14, it becomes evident that the worst-case limit for the overall extent of the fairing is while the vehicle is operated under null wind conditions, where the relative gains in vehicle efficiency are comparatively minimal, and as shown at the left vertical axis of the plots of FIG. 14. As the relative external headwind increases, the relative gains in vehicle efficiency quickly increase, as shown in the general trend of the efficiency curves rising toward the right side of the plots.

Therefore, a skilled artisan then will understand that the most restrictive limit for the overall extent of the fairing will be while the vehicle is operated under null external headwinds conditions. If the extent of the fairing is sufficiently limited to produce an overall reduction in vehicle drag under null operating conditions, then the thus limited fairing will also produce even more gains in vehicle efficiency under an external headwind condition.

And from the discussion above, it becomes evident that the fairing could be designed either to be more limited in forward extent and more extensive in downward extent or alternatively could be designed instead to be more extensive in forward extent and more limited in downward extent, and still produce the same measure of gains in overall vehicle propulsive efficiency.

Thus, the fairing could be designed to be somewhat limited in forward extent and to extend somewhat below the level of the axle while still yielding a reduction in overall vehicle drag, especially while the vehicle is operated under a substantial relative external headwind condition. This potential configuration for the fairing becomes quite evident both from an examination of the curves of FIG. 16, and from a consideration of how the very limited mechanical disadvantage that surfaces of the wheel located not very far below the level of the axle have over vehicle frame drag forces, such as wheel fairing or deflector drag forces.

Indeed, FIG. 16 shows that near the level of the axle, much less relative gains in propulsive efficiency are gained from shielding more centrally located wheel surfaces in elevation than from shielding the uppermost wheel surfaces positioned substantially above the axle near the critical elevation. And FIG. 16 also shows that the relative gains in vehicle efficiency increase in rising relative external headwinds.

While the ideal configuration of the fairing includes a limit for fairing surfaces to extend downward to lower than the level of the axle, the discussion above makes clear that this is optimal limitation is not fully restrictive. Instead, a skilled artisan would recognize that a wind-deflecting fairing of the present embodiment could be designed to be somewhat limited in forward extent while also extending somewhat below the level of the axle while still yielding a reduction in overall vehicle drag, especially while the vehicle is operated under a variety of relative external headwind conditions.

Or alternatively, a wind-deflecting fairing of the present embodiment could be designed to be more extensive in forward extent, while being somewhat limited in extending to no lower than the level of the axle, while still yielding a reduction in overall vehicle drag, especially while the vehicle is operating under a variety of relative external headwind conditions. Thus, a variety of configurations for extending the surfaces of the wind-deflecting fairing of the present embodiment is included that will yield an effective reduction in overall vehicle drag.

In consideration of further reference embodiments described below, the operating principles described above will generally apply, and may be referred thereto.

Figure 3:
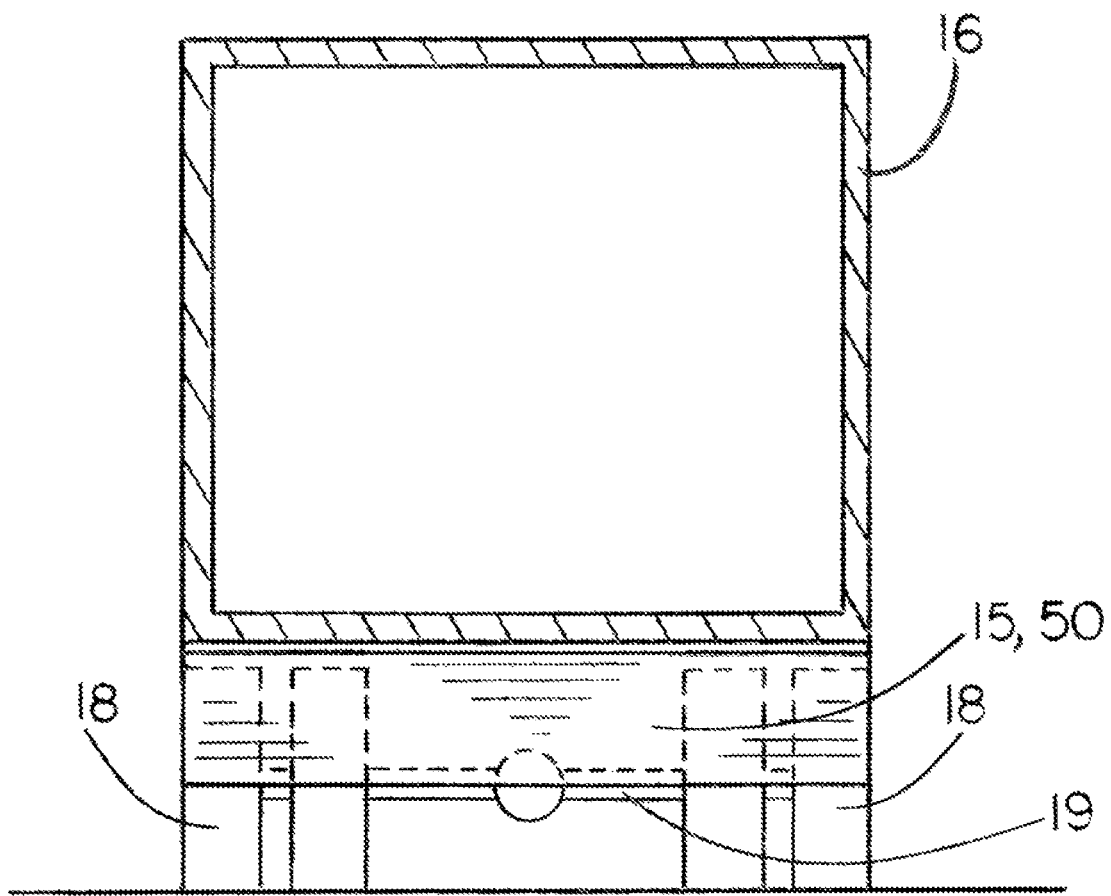
In FIG. 3, an inclined aerodynamic deflector panel assembly, which appears in side view similar to as shown in FIG. 1, is shown mounted on the trailer as viewed in cross-section from the front of the vehicle.

Second Reference Embodiment FIGS. 1 and 3

As shown in FIGS. 1 and 3, a reference embodiment comprises an inclined aerodynamic deflector panel assembly 15 attached to and mounted underneath the body of a trailer 16 for a commercial vehicle. The inclined deflector panel assembly 15 is located forward of the rear wheel assembly 17 and located in front of trailing wheel sets 18 which would otherwise be exposed to headwinds when the vehicle is in forward motion. The inclined deflector panel assembly 15 is planar in shape, mounted inclined in a forwardly-angled orientation with the upper edge more forwardly located and the lower surface located more rearward on the vehicle. The inclined deflector panel assembly 15 spans the lateral width of the trailer 17, and where aligned directly in front of the wheel sets 18 ideally extends downward to no lower than the level of the axle. The inclined deflector panel assembly 15 is located proximal to the trailing wheel assembly 18 in order to deflect headwinds onto the exposed lower wheel surfaces, and to deflect headwinds from directly impinging on the central axle assembly 19, thereby reducing overall vehicle drag and improving propulsive efficiency.

Figure 4:
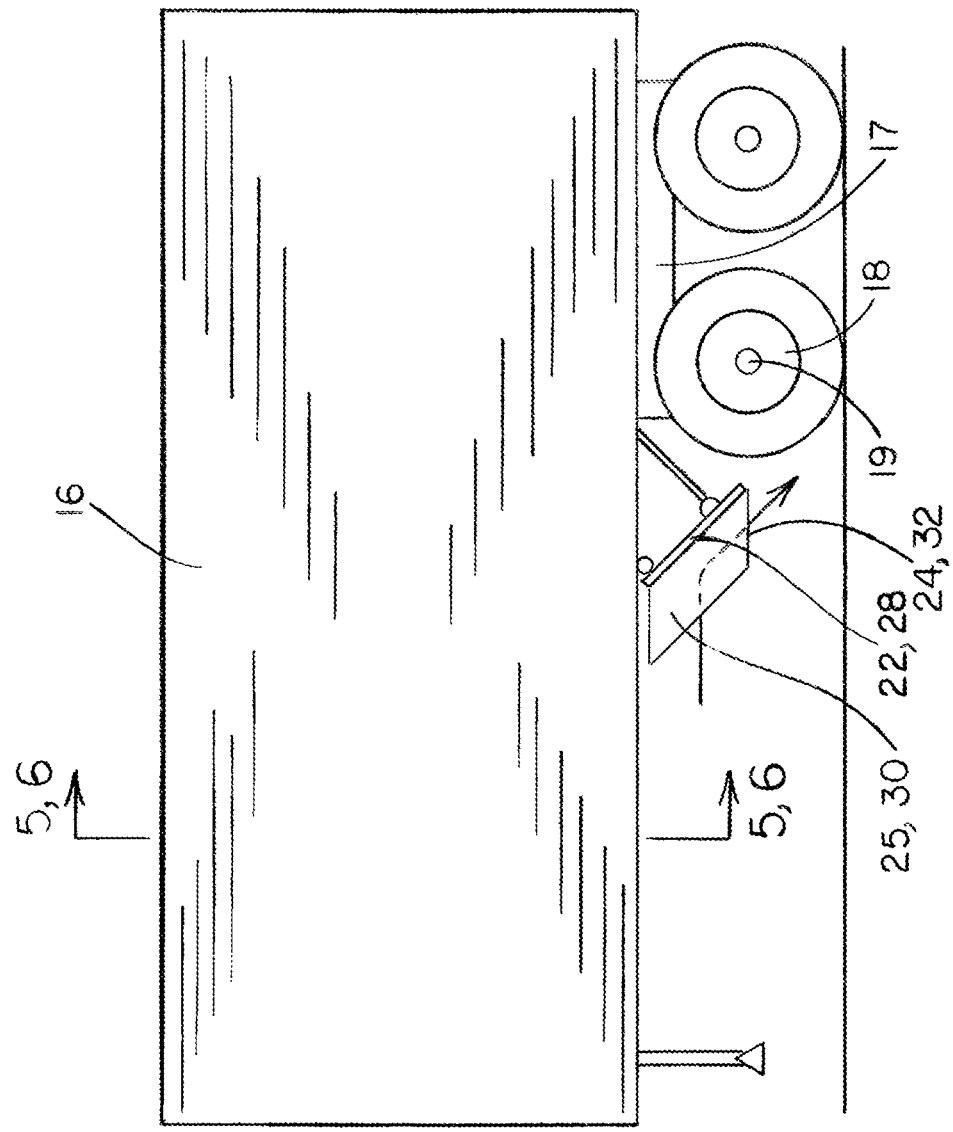
In FIG. 4, a channeled aerodynamic deflector panel assembly is mounted underneath the trailer of an industrial truck in front of the rear wheel assembly.
Figure 5:
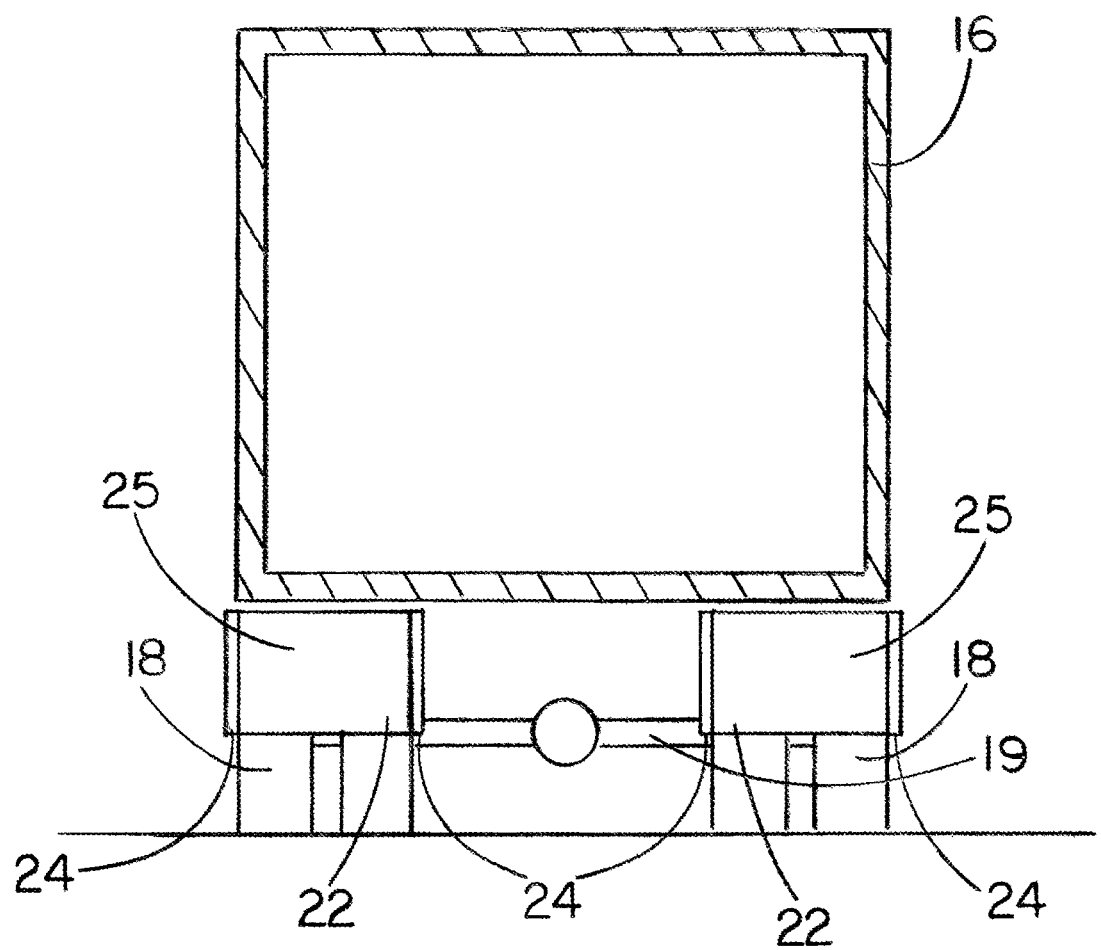
In FIG. 5, the channeled aerodynamic wheel deflector panel assembly of FIG. 4 is shown mounted on the trailer as viewed in cross-section from the front of the vehicle. Two deflector panel assemblies are shown, each as mounted in front of one of the wheel sets of the rear wheel assembly.

Third Reference Embodiment FIGS. 4 and 5

As shown in FIGS. 4 and 5, a reference embodiment comprises a channeled aerodynamic wheel deflector panel assembly 25 attached to and mounted underneath the body of a trailer 16 for a commercial vehicle. The channeled wheel deflector panel assembly 25 is located forward of the rear wheel assembly 17 and located directly in front of a trailing wheel set 18 which would otherwise be exposed to headwinds when the vehicle is in forward motion. The channeled wheel deflector panel assembly 25 includes a deflector plate 22 which is generally planar in shape, mounted inclined in a forwardly-angled orientation with the upper edge more forwardly-located and the lower surface located more rearward on the vehicle. The channeled wheel deflector panel assembly 25 includes forwardly-projecting end plates 24 attached to either side edge of the deflector plate 22, forming a channeled deflector panel assembly 25 to funnel headwinds directly onto the lower wheel surfaces, minimizing any outwardly deflected headwind from otherwise impinging on the trailing upper wheel surfaces.

The channeled wheel deflector panel assembly 25 ideally extends downward to no lower than the level of the axle 19 and is located proximal to the trailing wheel set 18 in order to deflect and funnel headwinds onto the exposed lower wheel surfaces, thereby reducing overall vehicle drag and improving propulsive efficiency.

Figure 6:
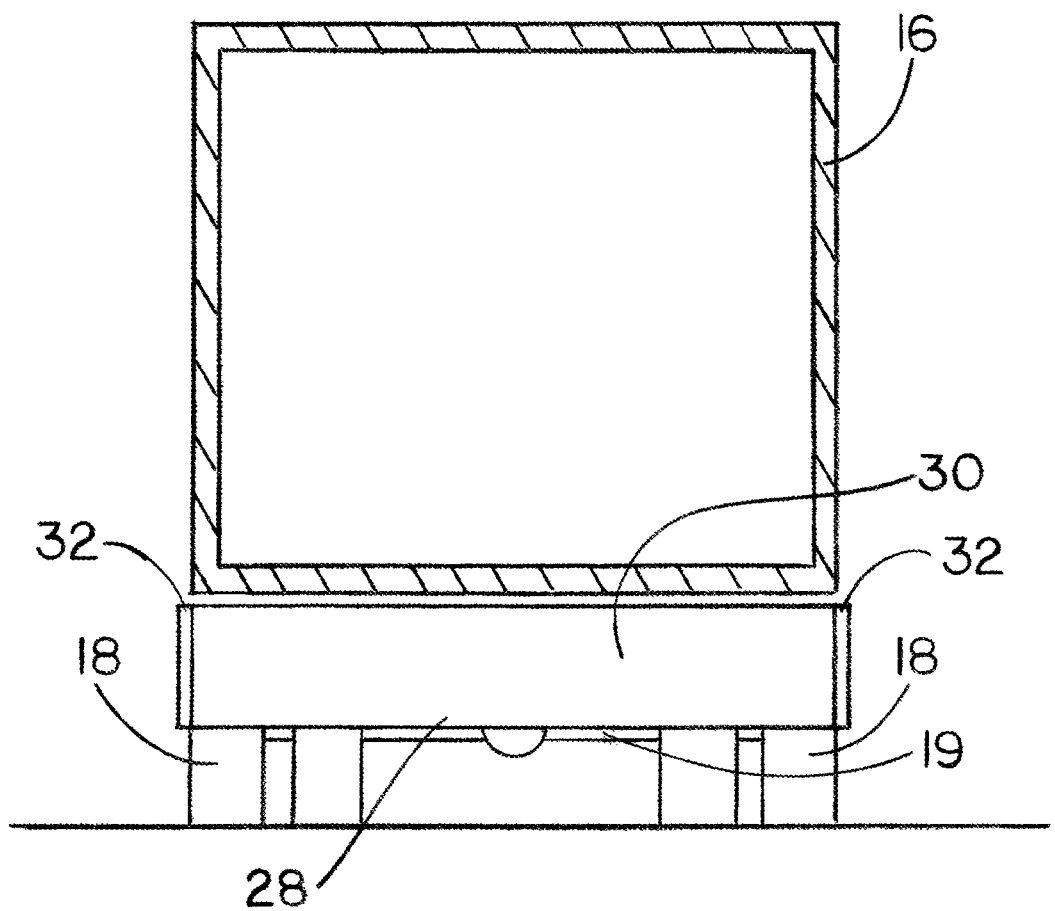
In FIG. 6, the channeled aerodynamic deflector panel assembly, which appears in side view similar to as shown in FIG. 4, is shown mounted on the trailer as viewed in cross-section from the front of the vehicle.

Fourth Reference Embodiment FIGS. 4 and 6

As shown in FIGS. 4 and 6, a reference embodiment comprises a channeled aerodynamic deflector panel assembly 30 attached to and mounted underneath the body of a trailer 16 for a commercial vehicle. The channeled deflector panel assembly 30 is located forward of the rear wheel assembly 17 and located in front of both trailing wheel sets 18 which would otherwise be exposed to headwinds when the vehicle is in forward motion. The channeled deflector panel assembly 30 includes a deflector plate 28 which is generally planar in shape, mounted inclined in a forwardly-angled orientation with the upper edge more forwardly-located and the lower surface located more rearward on the vehicle. The deflector plate 28 spans the lateral width of the trailer 16, and where directly aligned in front of the wheels ideally extends downward to no lower than the level of the axle 19. The channeled deflector panel assembly 30 includes forwardly-projecting end plates 32 attached to either side edge of the deflector plate 28, forming a channeled deflector panel assembly 30 to funnel headwinds directly onto the lower wheel surfaces and minimize any outwardly deflected headwind from otherwise impinging on the trailing upper wheel surfaces. Although not shown, between the wheel sets 18, the deflector plate 28 may extend further downward to deflect headwinds well below the central axle assembly 19.

The channeled deflector panel assembly 30 is located proximal to the trailing wheel set 18 in order to deflect headwinds onto the exposed lower wheel surfaces, and to deflect headwinds from directly impinging on the central axle assembly 19, thereby reducing overall vehicle drag and improving propulsive efficiency.

Figure 7:
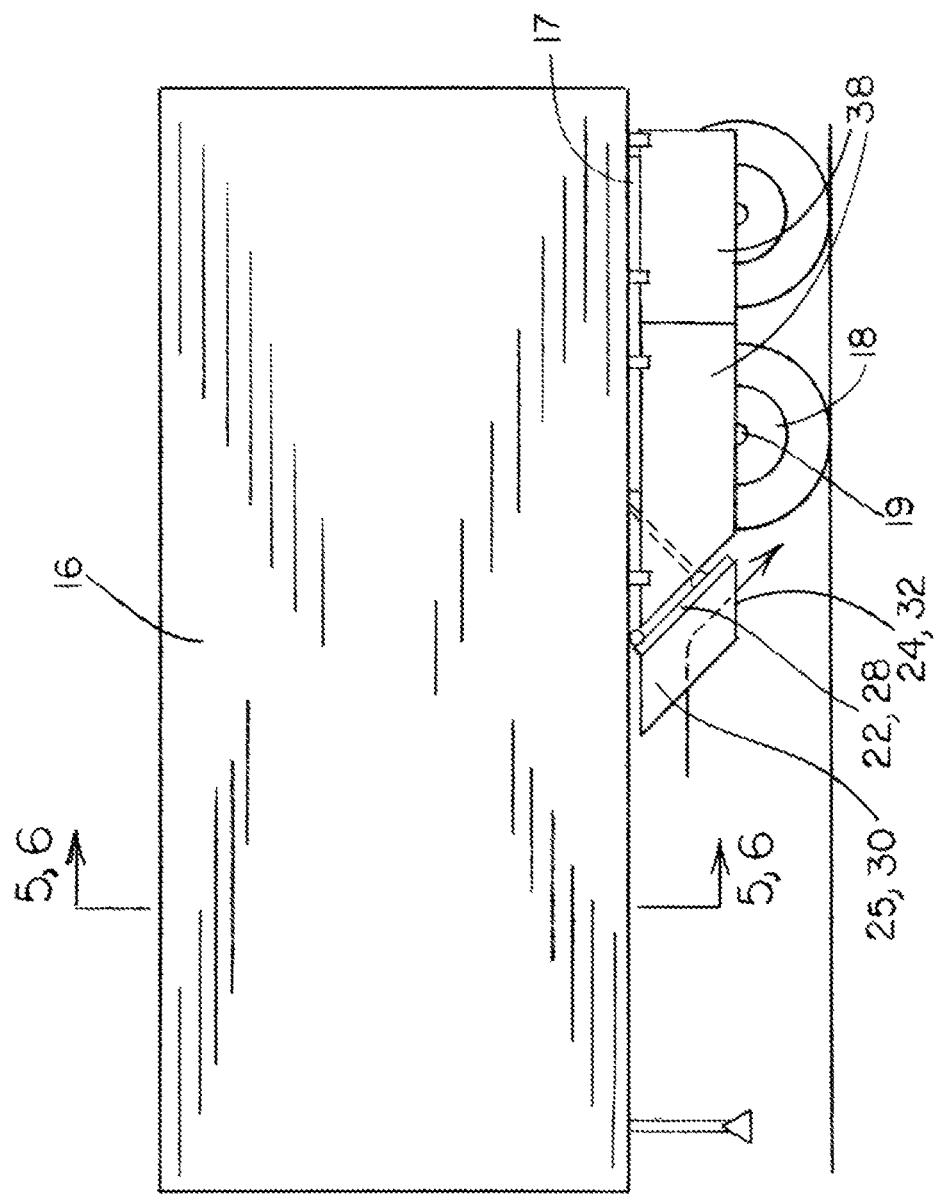
In FIG. 7, a channeled aerodynamic deflector panel and wheel skirt assembly is mounted underneath the trailer of an industrial truck in front of a wheel set of the rear wheel assembly.

Fifth Reference Embodiment FIGS. 7 and 5

As shown in FIG. 7 in side view, and as shown in FIG. 5 when viewed in cross-section from the front of the vehicle, a reference embodiment comprises the channeled aerodynamic wheel deflector panel assembly 25 identical to that of the third embodiment above, together with removable upper wheel skirt panels 38 covering the outside of the trailing wheel sets 18. The upper wheel skirt panels 38 also ideally extend downward to no lower than the level of the axle 19.

The upper wheel skirt panels 38 extend from the deflector plate 22 rearward to cover adjacent trailing wheel sets 18, thereby shielding the trailing upper wheels from external headwinds. The channeled wheel deflector panel assembly 25 used in combination with the upper wheel skirt panels 38 reduces overall vehicle drag and improves propulsive efficiency.

Sixth Reference Embodiment FIGS. 7 and 6

As shown in FIG. 7 in side view, and as shown in FIG. 6 when viewed in cross-section from the front of the vehicle, a reference embodiment comprises the channeled aerodynamic deflector panel assembly 30 identical to that of the fourth embodiment above, together with removable upper wheel skirt panels 38 covering the outside of the trailing wheel sets 18. The upper wheel skirt panels 38 also ideally extend downward to no lower than the level of the axle 19.

The upper wheel skirt panels 38 extend from the deflector plate 28 rearward to cover adjacent trailing wheel sets 18, thereby shielding the trailing upper wheels from external headwinds. The channeled deflector panel assembly 30 used in combination with the upper wheel skirt panels 38 reduces overall vehicle drag and improves propulsive efficiency.

Figure 8:
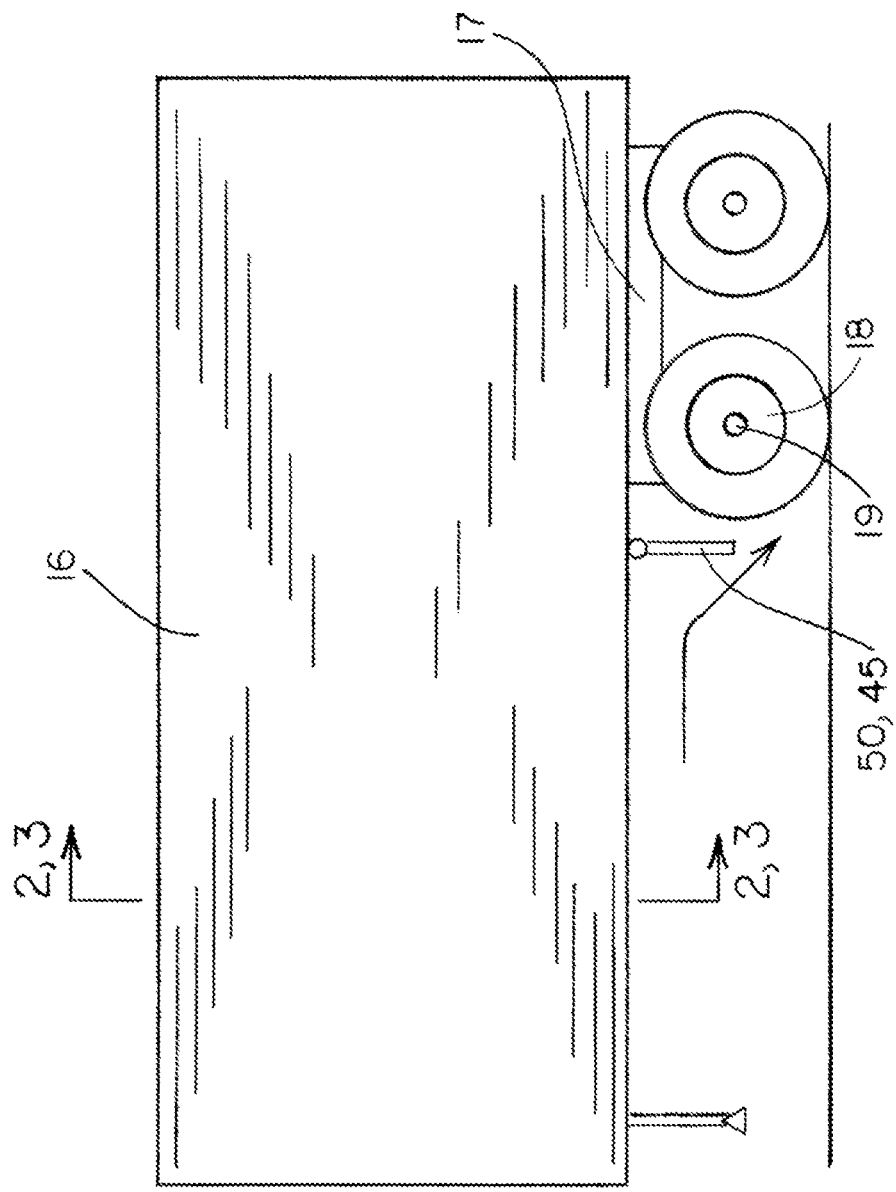
In FIG. 8, an aerodynamic wheel deflector panel is mounted underneath the trailer of an industrial truck in front of a wheel set of the rear wheel assembly.

Seventh Reference Embodiment FIGS. 8 and 2

As shown in FIG. 8 in side view, and as shown in FIG. 2 when viewed in cross-section from the front of the vehicle, a reference embodiment comprises an aerodynamic wheel deflector panel 45 is attached to and mounted underneath the body of a trailer 16 for a commercial vehicle. The wheel deflector panel 45 is located forward of the rear wheel assembly 17 and located in front of a trailing wheel set 18, which would otherwise be exposed to headwinds when the vehicle is in forward motion. The wheel deflector panel 45 is planar in shape, sufficiently wide to deflect headwinds from directly impinging on the upper wheels of the trailing wheel set, mounted vertically and shown oriented parallel to the axle 19. The wheel deflector panel 45 ideally extends downward no lower than the level of the axle 19, and is located proximal to the trailing wheel set 18 in order to deflect headwinds substantially toward either the outside or the inside of the wheel set 18, or onto the lower wheel surfaces—thereby reducing overall vehicle drag and improving propulsive efficiency.

This simple wheel deflector panel configuration is appropriate for use when limited clearance space exists in front of the trailing wheel set.

Eighth Reference Embodiment FIGS. 8 and 3

As shown in FIG. 8 in side view, and as shown in FIG. 3 when viewed in cross-section from the front of the vehicle, a reference embodiment comprises an aerodynamic deflector panel 50 is attached to and mounted underneath the body of a trailer 16 for a commercial vehicle. The deflector panel 50 is located forward of the rear wheel assembly 17 and located in front of a trailing wheel sets 18 which would otherwise be exposed to headwinds when the vehicle is in forward motion. The deflector panel 50 is planar in shape, spans the lateral width of the trailer 16, and where aligned directly in front of the wheel sets 18 ideally extends downward to no lower than the level of the axle 19. The deflector panel 50 is mounted vertically and parallel to the axle 19. The deflector panel 50 is located proximal to the trailing wheel sets 18 in order to deflect headwinds substantially toward either the outside of the trailing upper wheels, under the central axle assembly, or onto the lower wheel surfaces—thereby reducing overall vehicle drag and improving propulsive efficiency.

This simple deflector panel configuration is appropriate for use when limited clearance space exists in front of the trailing wheel assembly.

Figure 9:
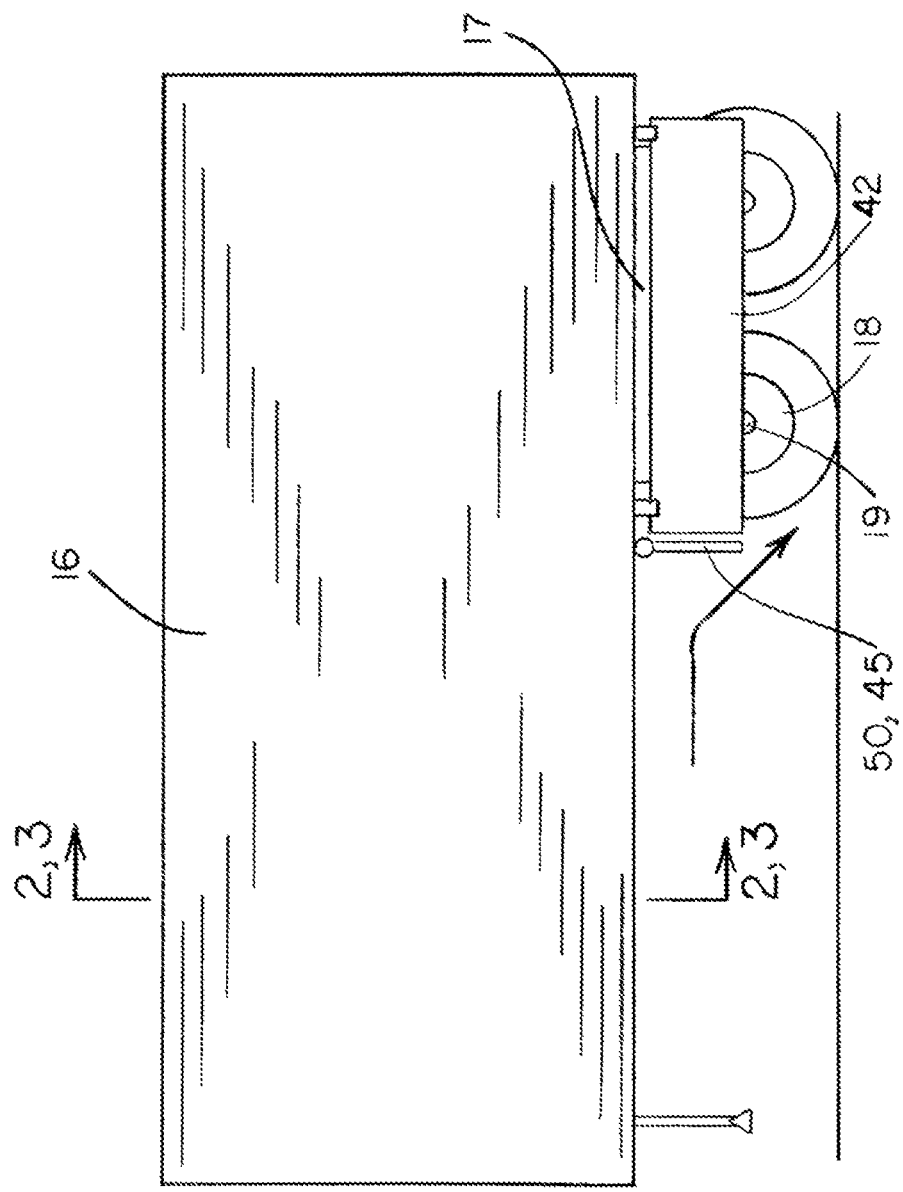
In FIG. 9, an aerodynamic deflector panel and wheel skirt assembly is mounted underneath the trailer of an industrial truck in front of the rear wheel assembly.

Ninth Reference Embodiment FIGS. 9 and 2

As shown in FIG. 9 in side view, and similar to as shown in FIG. 2 when viewed in cross-section from the front of the vehicle, a reference embodiment comprises the aerodynamic wheel deflector panel 45 identical to that of the seventh embodiment above, together with removable upper wheel skirt panels 42 covering the outside of the trailing wheel sets 18. The upper wheel skirt panels 42 also ideally extend downward to no lower than the level of the axle 19.

The upper wheel skirt panels 42 extend from the deflector panel 45 rearward to cover adjacent trailing wheel sets 18, thereby shielding the trailing upper wheels from external headwinds. The wheel deflector panel 45 used in combination with the upper wheel skirt panels 42 reduces overall vehicle drag and improves propulsive efficiency.

This simple wheel deflector panel configuration is appropriate for use when limited clearance space exists in front of the wheel sets and where the use of exterior wheel skirts panels is permitted.

Tenth Reference Embodiment FIGS. 9 and 3

As shown in FIG. 9 in side view, and similar to as shown in FIG. 3 when viewed in cross-section from the front of the vehicle, a reference embodiment comprises the aerodynamic wheel deflector panel 50 identical to that of the eighth embodiment above, together with removable upper wheel skirt panels 42 as used in the ninth embodiment above. The deflector panel 50 used in combination with the upper wheel skirt panels 42 reduces overall vehicle drag and improves propulsive efficiency.

This simple wheel deflector panel configuration is appropriate for use when limited clearance space exists in front of the wheel sets, where deflecting headwinds from directly impinging on the central axle assembly 19 is needed, and where the use of exterior wheel skirts panels is permitted.

Figure 10:
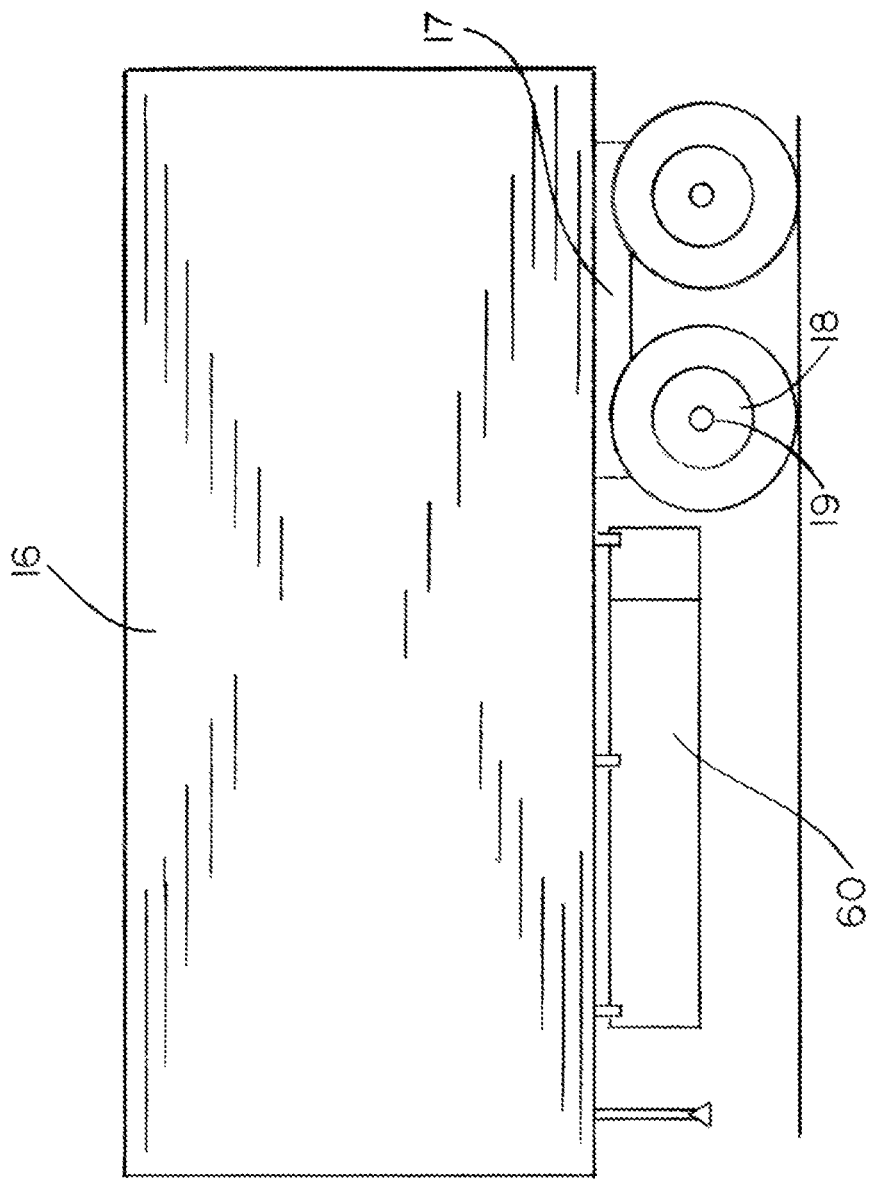
In FIG. 10, an aerodynamic deflector skirt assembly is mounted underneath the trailer of an industrial truck in front of the rear wheel assembly.

Eleventh Reference Embodiment FIGS. 10 and 11

As shown in FIGS. 10 and 11, a reference embodiment comprises an aerodynamic vehicle skirt assembly 60 is attached to and mounted underneath the body of a trailer 16 for a commercial vehicle. The vehicle skirt assembly 60 is located forward of the rear wheel assembly 17 which would otherwise be exposed to headwinds when the vehicle is in forward motion. The vehicle skirt assembly 60 ideally extends downward to no lower than the level of the axle 19 of the trailing wheel set 18, leaving lower wheel surfaces of the trailing wheel set 18 exposed to headwinds.

The vehicle skirt assembly 60 is shown mounted to the trailer 16 with the forwardmost end of the vehicle skirt assembly 60 inset toward the centerline of the trailer 16 to a position in general longitudinal alignment with the inside of—and thereby substantially in front of—the innermost surface of the trailing wheel set 18. Extending rearward, the vehicle skirt assembly 60 progressively varies in position toward the outside of the body of the trailer 16, extending more rapidly toward the outside wheel when nearest the rear end, which is located proximate to the trailing wheel set 18. The rear end of the vehicle skirt assembly 60 is located near the outer side of the wheel set 18, thereby deflecting headwinds substantially toward the outside of the upper wheel surfaces and below onto the lower wheel surfaces.

The vehicle skirt assembly 60 may be constructed from either a single panel or from multiple panels arranged end-to-end. The vehicle skirt assembly 60 may be constructed with resilient materials, especially along the lower edge that may occasionally contact road obstacles. The vehicle skirt assembly 60 may also be mounted to the trailer 16 by deflectable resilient means, returning the vehicle skirt assembly 60 to the proper aerodynamic position after contacting road obstacles.

Figure 12:
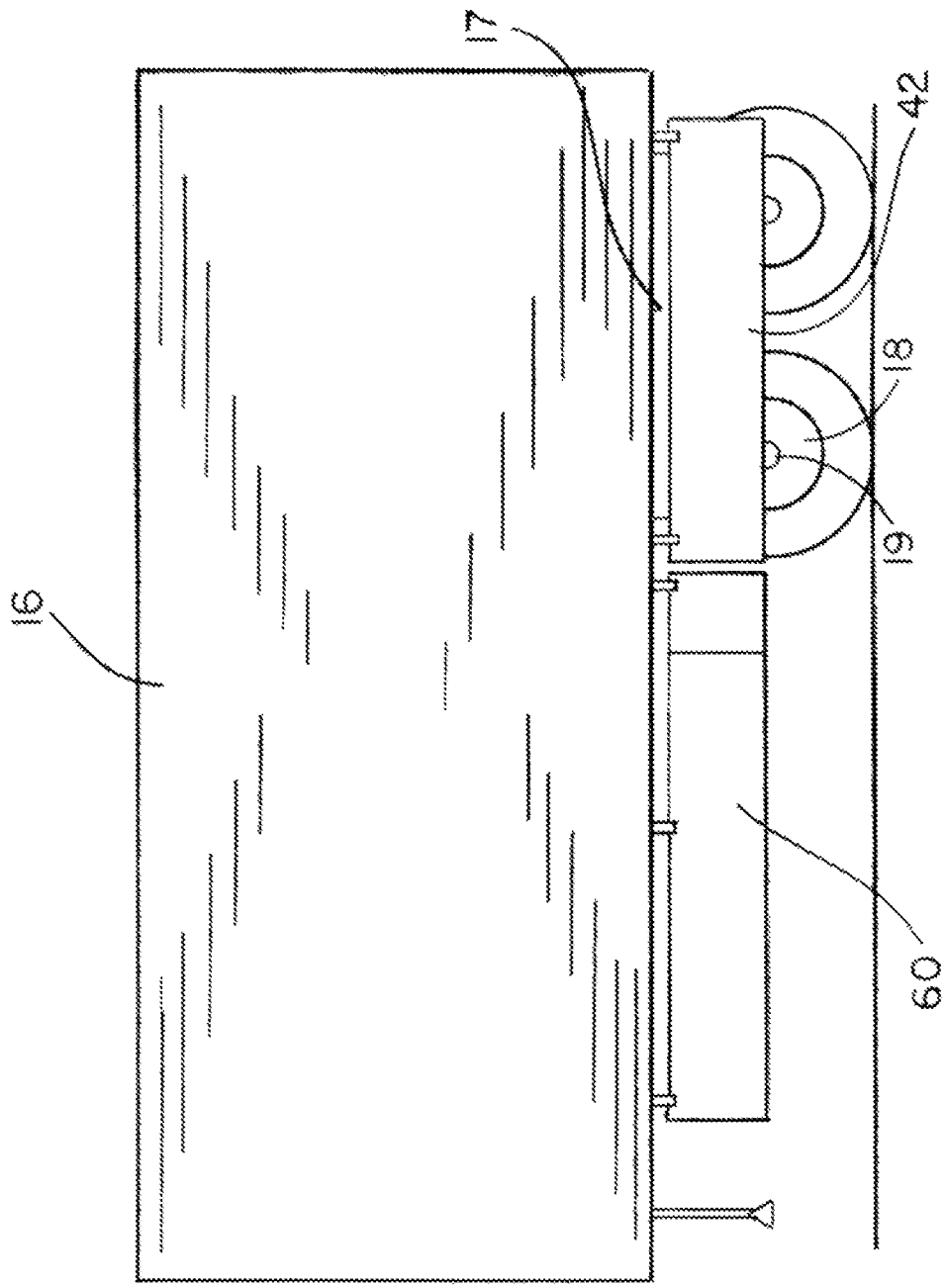
In FIG. 12, the aerodynamic deflector skirt assembly together with a wheel skirt panel assembly is mounted to the trailer of an industrial truck.

Twelfth Reference Embodiment FIG. 12

As shown in FIG. 12, a reference embodiment comprises the aerodynamic vehicle skirt assembly 60 identical to that of the eleventh embodiment above, together with removable upper wheel skirt panels 42 covering the outside of the trailing wheel sets 18 as used in the tenth embodiment above.

The upper wheel skirt panels 42 extend from the aerodynamic vehicle skirt assembly 60 rearward to cover adjacent trailing wheel sets 18, thereby ideally shielding the trailing upper wheel surfaces from external headwinds. The aerodynamic vehicle skirt assembly 60 used in combination with the upper wheel skirt panels 42 reduces overall vehicle drag and improves propulsive efficiency.

Figure 20:
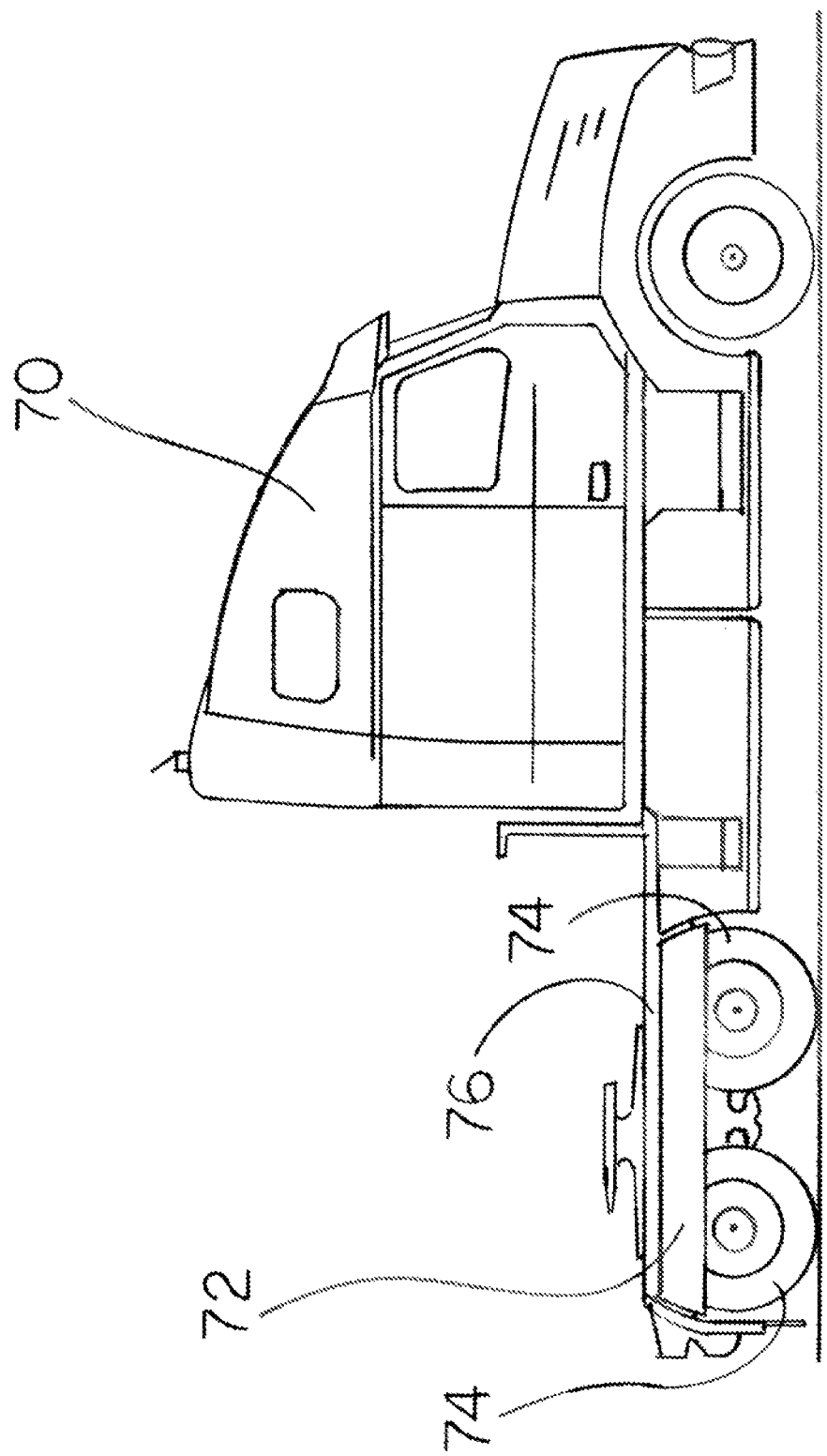
In FIG. 20, an aerodynamic wheel skirt panel 72 is shown attached the frame of a semitruck tractor. The wheel skirt panel is disposed to shield upper tire sidewalls of the rearward wheels of the truck tractor from headwinds otherwise impinging thereon.
Figure 21:
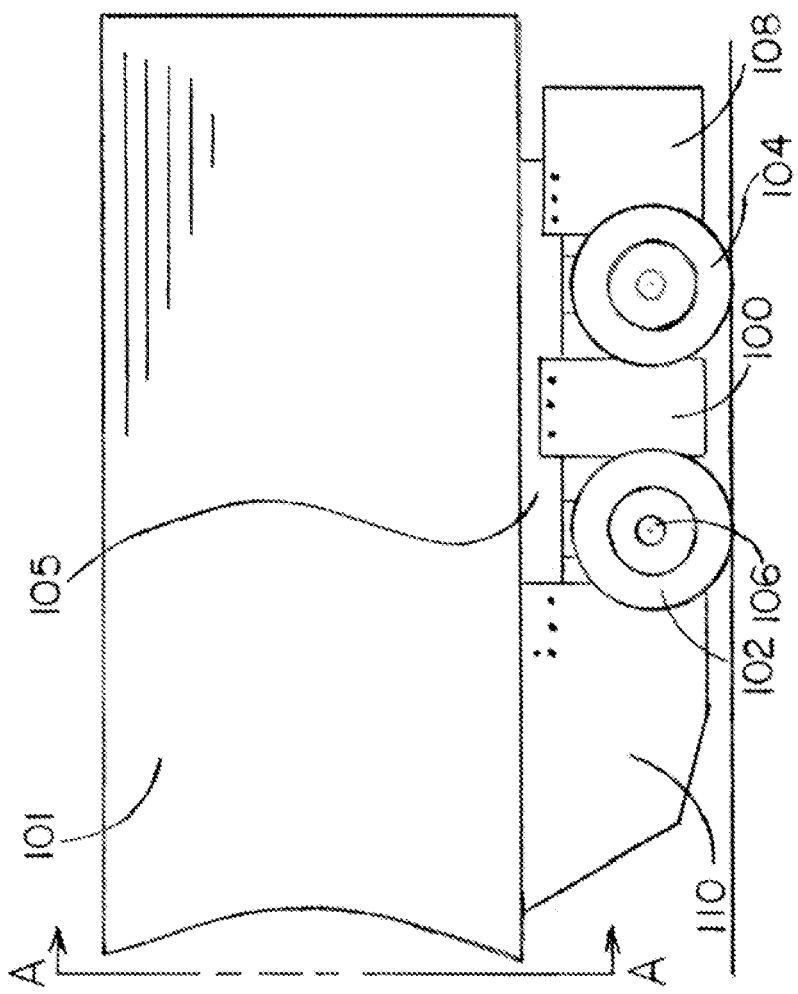
In FIG. 21, a medial inner skirt panel 100 is shown in side view largely spanning the space in-between the forward and rearward wheels of a tandem wheel assembly 105 on a rearward body component of a truck or semitrailer 101, while being further disposed laterally proximate to the lateral position of the innermost sidewalls of the wheel assembly. A rear inner skirt panel 108 is also similarly shown disposed inline with the medial inner skirt panel, while instead extending rearward of the rearmost wheel of the tandem wheel assembly. And a forward inner skirt panel 110 is also similarly shown disposed inline with medial inner skirt panel, while instead extending ahead of the forwardmost wheel of the tandem wheel assembly. All panels are disposed at a laterally interior location near an innermost sidewall of the wheel assembly.
Figure 22:
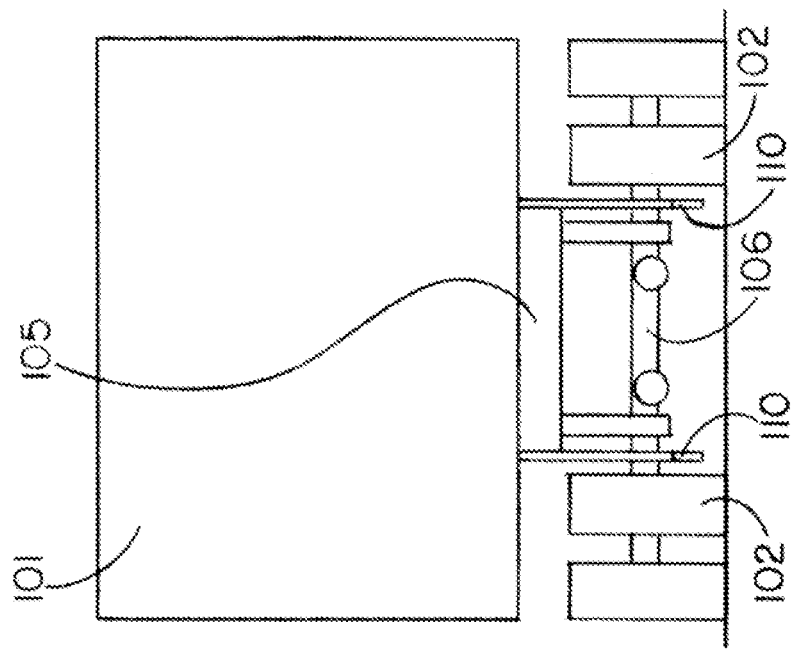
In FIG. 22, the inner skirt panels of FIG. 21 are shown on the semitrailer in front view disposed inline underneath the rearward body component of a truck or semitrailer. The front view is shown as the cross sectional view A-A of FIG. 21.
Figure 23:
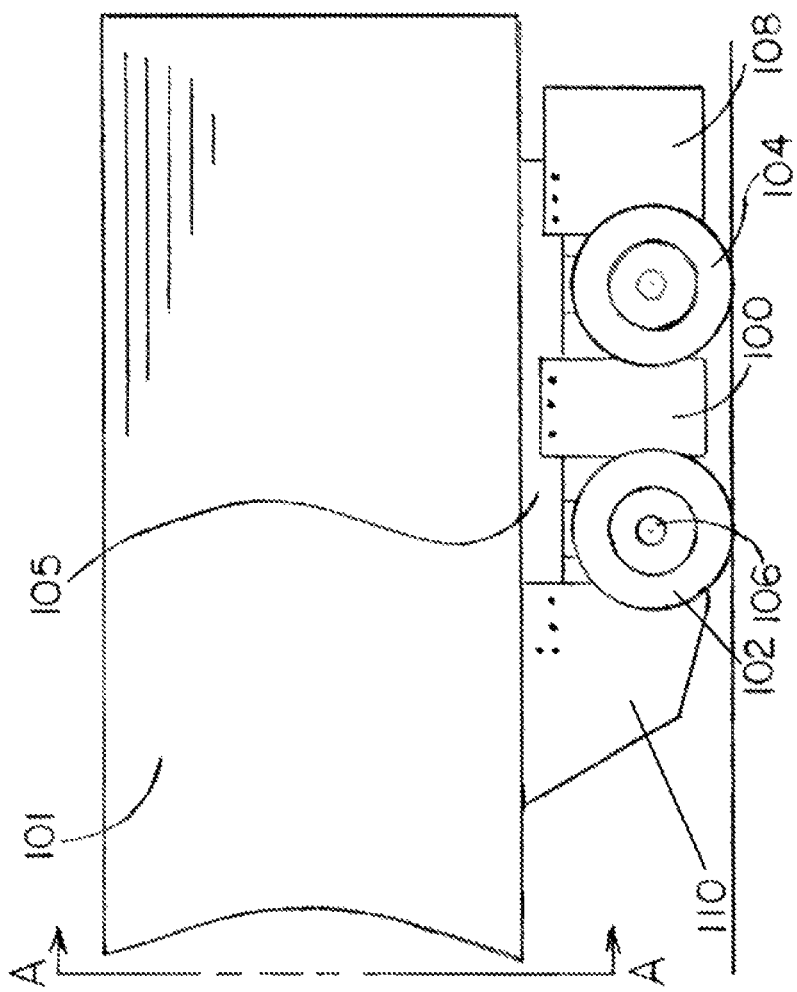
In FIG. 23, inner skirt panels are shown on the rearward body component of a truck or semitrailer in side view.
Figure 24:
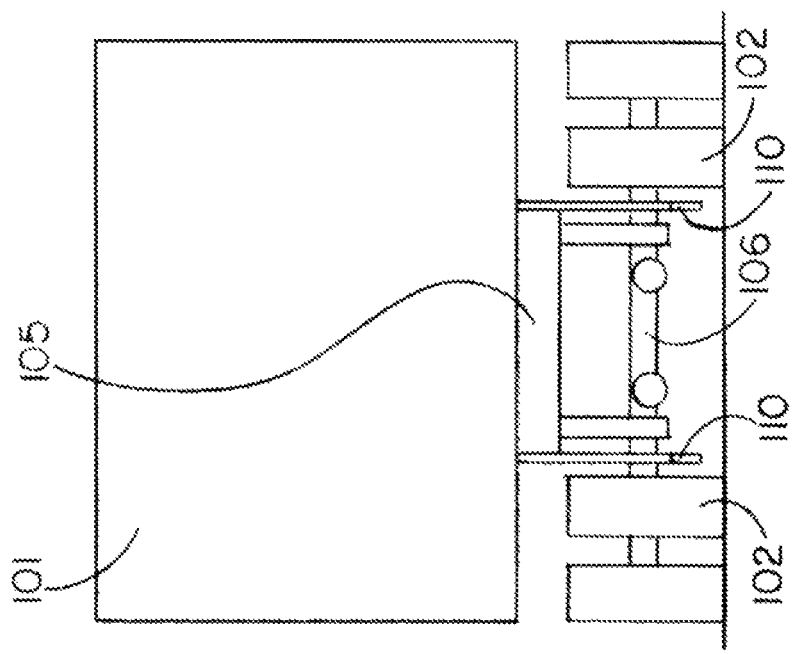
In FIG. 24, the inner skirt panels of FIG. 23 are shown in front view, being disposed inline underneath the rearward body component of a truck or semitrailer. The front view is shown as the cross sectional view A-A of FIG. 23.

Thirteenth Reference Embodiment FIG. 20

As shown in FIG. 20, a reference embodiment comprises an aerodynamic wheel skirt panel 72 disposed adjacent to an upper sidewall of a tire of a rearward wheel assembly 74 of a semi truck tractor 70. The skirt panel 72 is attached to the vehicle frame 76 and arranged to shield the upper tire sidewall from being otherwise exposed to headwinds, thereby reducing overall vehicle drag and improving vehicle propulsive efficiency. While the tractor is shown with dual wheel assemblies 74, the skirt panel could also be utilized on a tractor having only a single rearward wheel assembly.

Fourteenth Reference Embodiment Includes FIGS. 21-24 and 51

As shown in FIGS. 21-24, a reference embodiment comprises a medial inner skirt panel 100 disposed substantially in-between the forwardmost rearward wheel 102 and rearmost wheel 104 of a tandem wheel assembly 105 on a rearward body component of a truck or semitrailer 101. The medial inner skirt panel 100 is ideally attached to the frame of the tandem wheel assembly 105, and is further disposed to be laterally aligned near to the lateral position of the laterally innermost sidewall of the innermost wheel 102 of the tandem wheel assembly. The medial inner skirt panel 100 preferably extends from near the top of tandem assembly downwards to substantially below the axle 106.

The medial inner skirt panel 100 provides a barrier between the otherwise intervening wheel open-space that exists in-between the forward and rearward wheels of the tandem wheel assembly, and the central tandem open-space that exists in-between the opposing innermost wheels of the tandem wheel assembly. So disposed, the medial inner skirt panel 100 inhibits displacement of air molecules from exchanging in-between the intervening wheel open-space and the central tandem open-space between the dual wheels—which is caused by the motion of the passing wheels—thereby reducing drag on the moving vehicle.

As shown in FIGS. 21-24, another reference embodiment comprises a rear inner skirt panel 108 disposed rearward of the rearmost wheel 104 of a wheel assembly on a rearward body component of a truck or semitrailer. The rear inner skirt panel 108 is attached to the frame of the tandem wheel assembly, and is further disposed to be laterally aligned near to the lateral position of the laterally innermost sidewall of innermost wheel of the tandem wheel assembly. The rear inner skirt panel 108 preferably extends from near the top of tandem assembly downwards to generally below the axle 106, consistent with ground obstacle clearance requirements.

As shown in FIGS. 21-24, another reference embodiment comprises a forward inner skirt panel 110 disposed ahead of the forwardmost wheel 104 of a wheel assembly on a rearward body component of a truck or semitrailer. The forward inner skirt panel 110 is ideally attached to the frame of the tandem wheel assembly, and is further disposed to be laterally aligned near to the lateral position of the laterally innermost sidewall of the innermost wheel of the tandem wheel assembly. The forward inner skirt panel 110 preferably extends from near the top of tandem assembly downwards to substantially below the axle 106, consistent with any ground obstacle clearance requirements.

And while the inward-facing surface of the rear skirt panels 108 is generally flat for minimal drag thereon from air passing in-between the innermost wheels through the central tandem open-space, the outward-facing surface thereof may be curved in a streamlined shape—for reduced drag from the laterally inward directed movement of air impinging thereon—to provide more laminar motion of air toward the rearmost portion of the panel, further reducing drag on the vehicle. By the further streamlining the outward facing surface for lateral air motion, a more laminar condition of air motion immediately behind the rear skirt panel 108 can be achieved, thereby further reducing drag on the moving vehicle.

And while the inner skirt panels 100, 108 and 110 generally extend substantially below the axle 106, the function of the inner skirt panels is not principally for reducing drag on the relatively low effective vehicle-drag-inducing lower-wheel surfaces, but rather includes further stabilizing the generally static air passing under the central axle 106 and through the central tandem open-space.

Since a static air column possesses maximum pressure therein relative to an adjacent moving air column—since moving air molecules possess a component of momentum force in addition to a pressure force component that then offsets the resistive wholly pressure force component existing within the adjacent static air column—a generally static air column more effectively connected to the rear of the vehicle can thereby transmit maximum air pressure from the front onto the rear of the vehicle.

By further stabilizing any internal relative motion of air molecules within this central air column, then maximizes the volume of static air passing with minimal disturbance under the moving vehicle through the central tandem open-space, with the central air column thereby remaining in a more laminar relative flow condition as a result. With a maximally stabilized streamlined flow condition present within the central air column passing under or through the center of the tandem wheel assembly, any increased air pressure developed ahead of tandem wheel assembly is then more fully communicated through the central tandem open-space to the rear of the vehicle at up to the speed of sound.

Any increased air pressure developed ahead of the tandem wheel assembly then also acts to increase the amount of relative air flowing through the central tandem open-space to the rear of the vehicle. And as taught above, any increase in effective air flowing to the rear of the vehicle then reduces the differential pressure developed between the front and rear of the moving vehicle, to thereby reduce the overall pressure drag being developed thereon.

Furthermore, since a function of the inner skirt panel reference embodiment is to stabilize the central air column passing under the vehicle, the inner skirt panels 100, 108 and 110 are best positioned laterally inward near to the lateral position of the innermost sidewall of the innermost wheel, rather than closer to the laterally outermost tire sidewall. So positioned, the inner skirt panels largely prevent lateral air displacement within the central air column under the tandem wheel assembly by the moving wheels, thereby protecting the stability of this air column from disturbance by the passing wheels.

If for example, the medial inner skirt panels were instead positioned laterally near the outside of the vehicle, then the medial inner skirt panel 100 would then allow for otherwise largely undisturbed air to be exchanged laterally from in-between the central tandem open-space that exists in-between the opposing innermost wheels of the tandem wheel assembly, and the intervening wheel moving open-space that exists in-between the forward and rearward wheels of the moving tandem wheel assembly, thereby diminishing any vehicle drag-reducing effect from air passing relatively undisturbed through the central open portion of the tandem wheel assembly. With the skirt panels instead positioned near the outside of the vehicle, lateral air displacement from the outside of the vehicle to partially fill the passing void in-between the wheels is instead diminished, thereby enhancing the flow exchange of air instead from within the central air column itself to fill the passing void in-between the wheels, thereby minimizing any vehicle drag reduction from stabilizing air within the central air column passing in-between the wheel sets.

While the inner skirt panels are shown disposed laterally just inside the inner sidewalls of the wheel assembly, the inner skirt panels could also be arranged either flush with the inner sidewalls for additional streamlining, or even be disposed further towards the outside of the vehicle. So disposed more towards the outermost wheel of the dual wheel assembly—rather than adjacent to the innermost sidewalls of the innermost wheel—the medial inner skirt panel would then largely span the space in-between the forward are rearward wheels of the tandem wheel assembly.

In a further example, as shown in FIGS. 21-24, the forward inner skirt panel 110 shown disposed immediately ahead of the wheels may further enhance the stabilization of the central air column by deflecting any air stream impinging the forwardmost wheel toward the outside of the vehicle, rather than allowing the displaced air from the wheel to disturb the central air column in front of the central axle, as would an outer forward-extending skirt panel positioned near the outside of the wheel assembly as explained above. And while shown arranged parallel to the longitudinal centerline of the vehicle, the forward inner skirt panel 110 could also be arranged at a converging inwardly progressing angle to enhance air flow between the innermost wheels under the tandem wheel assembly.

If arranged at an inwardly progressing convergent angle, the forward central skirt panel 110 disposed on both lateral sides of the vehicle may then form a partial open funnel to increase the relative air flowing in-between the wheels through the central tandem open-space. However, if arranged at too steep an inwardly progressing angle, the drag induced on the forward central skirt panel may more than offset the gains in vehicle drag reduction from more air flowing in-between the wheels through the central tandem open-space. Hence, a method for determining the proper inwardly progressing angle and overall dimension of the forward central skirt panel 110 to be used for any given vehicle operating condition arises as a compromise between these two opposing design considerations. Any inwardly progressing angle of the forward central skirt panel 110 must be optimized to a limited angle that actually reduces overall vehicle drag.

And as shown in FIGS. 21-24, in another reference embodiment the rear inner skirt panel 108 disposed immediately behind the wheels may further enhance air flow through the central tandem open-space by arranging the trailing panels at an outwardly progressing angle. This diverging arrangement of the trailing panels may then provide for a partial open nozzle flow-accelerating effect from the expanding air exiting therefrom, thereby helping to further increase air flow through the central tandem open-space. The outwardly progressing angle of the panels is again limited to that which will increase the air flowing through the central tandem open-space without either adding too much additional drag on the panels, or reducing the transmitted air pressure gained at the rear of the vehicle, to offset any gains in overall vehicle drag reduction achieved therefrom. Hence, a method for determining the proper outwardly progressing angle and overall dimension of the rear inner skirt panel 108 to be used for any given vehicle operating condition also arises as a compromise between these two opposing design considerations. Any outwardly progressing angle of the rear inner skirt panel 108 must be optimized to a limited angle that actually reduces overall vehicle drag.

An even further reference embodiment comprises two or more of the skirt panels connected together to form a single streamlined panel, extending from as far as from immediately ahead of the forwardmost wheel, rearward to as far as immediately behind the rearmost wheel of the tandem wheel assembly. The combined panel is then arranged to accommodate vertical motion of the axle, while largely shielding the central tandem open-space from moving innermost wheel sidewalls and the moving spaces located immediately forward and rearward of the wheels, thereby providing streamlined surfaces along the lateral sides of the central tandem open-space to minimize any lateral disturbance of air within central tandem open-space by the moving wheel surfaces.

Since modern tandem wheel assemblies on trucks or semitrailers are often adjustable to slide longitudinally along the body of the vehicle, the inner skirt panels are often arranged to remain in a fixed position relative to the slidable tandem wheel assembly itself, rather than being in a fixed longitudinal position attached directly to the underside of the vehicle body. Thus, the inner skirt panels can be attached directly to the slidable tandem wheel assembly. So disposed attached to the tandem wheel assembly, the moveable inner skirt panels remain largely effective in stabilizing air within the central air column under the moveable tandem wheel assembly—from induced displacement by the adjacent moving wheels—regardless of the longitudinal location of the tandem wheel assembly along the vehicle body.

However, this arrangement of inner skirt panels attached to the slidable bogey is not exclusive. The inner skirt panels could be instead attached to the frame or body of the vehicle, or even attached together in combination with other wheel deflector or trailer skirt panels for further augmented reductions in vehicle drag.

Figure 51:
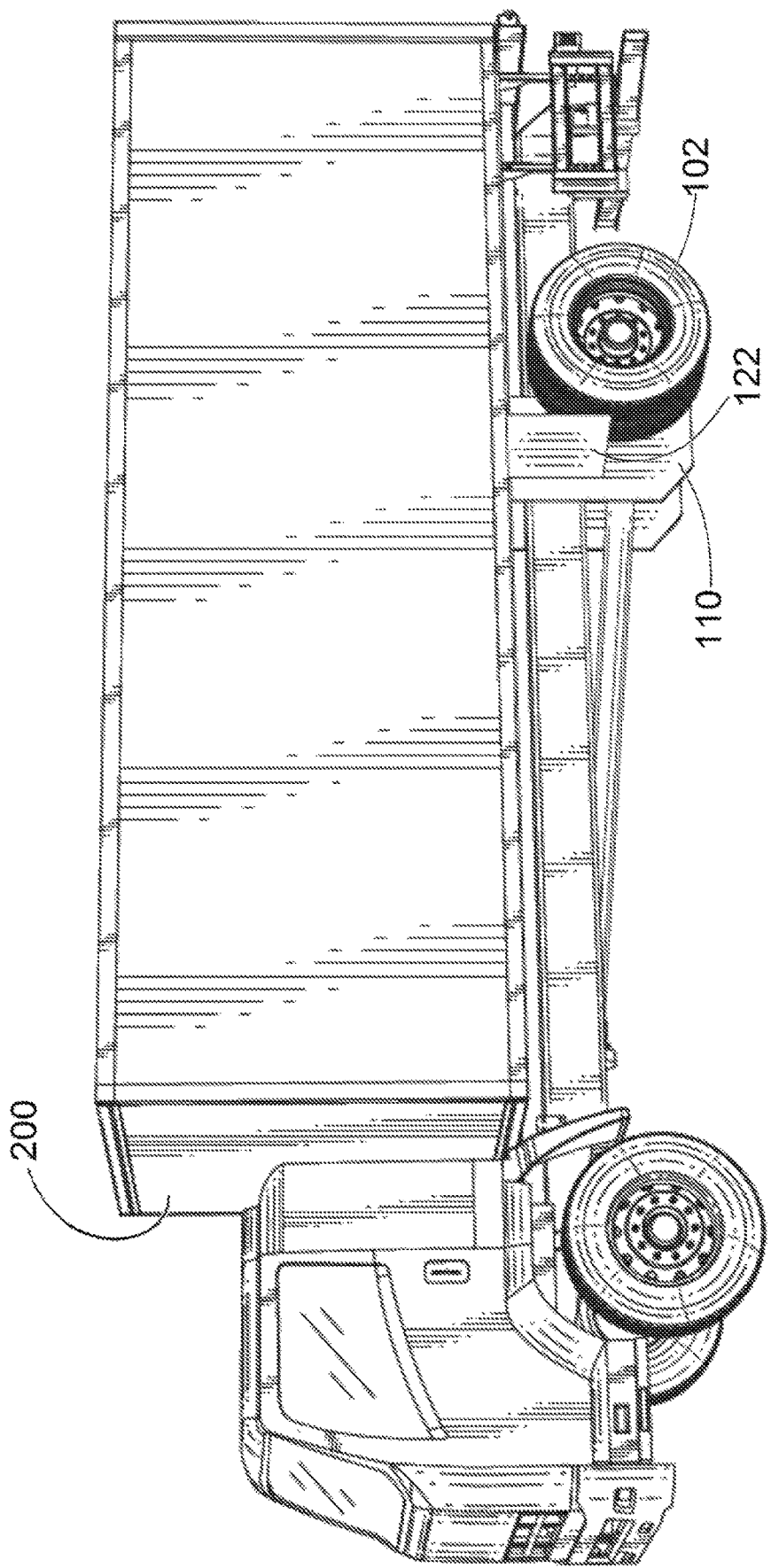
In FIG. 51, the inner skirt panels 110 together with wheel deflector panels 122 are shown disposed on the reward body component of a cargo truck 200.
Figure 52:
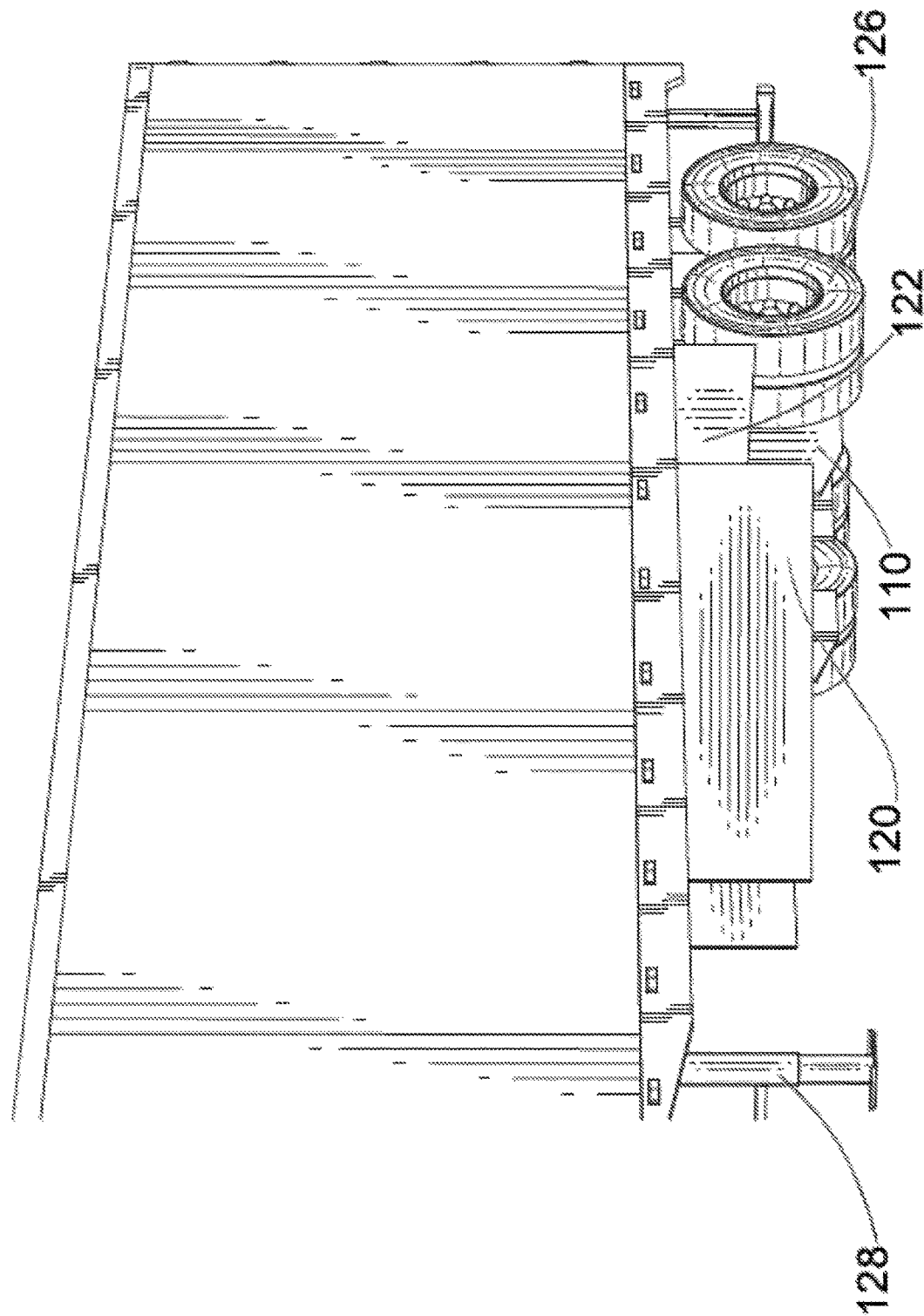
In FIG. 52, the trailer skirt panel assembly 120 together with inner skirt panel 110 and wheel deflector panel 122 is shown disposed on the reward body component of a tractor-trailer. However, the combination shown could also represent as disposed on a cargo truck, absent the vehicle landing gear 128.

Moreover, the inner skirt panels—including panel 110—also can be useful while employed on other vehicles, including on cargo delivery trucks 200, as shown in FIG. 51—and even on automobiles or racecars. Being smaller in overall surface area, cargo delivery trucks can often enjoy even more relative drag reduction from the use of inner skirt panels than when used on the much larger tractor-trailers. Indeed, the vehicle drag induced by the wheels disturbing the central air column passing under the vehicle between the rearward wheels 102 of either the smaller cargo trucks 200 or even automobiles is often a much larger component of overall vehicle drag than is on the far larger tractor-trailers. As such, employing inner skirt panels on these smaller vehicles can offer even more overall vehicle drag reduction on a relative basis than on semitrucks.

Figure 25:
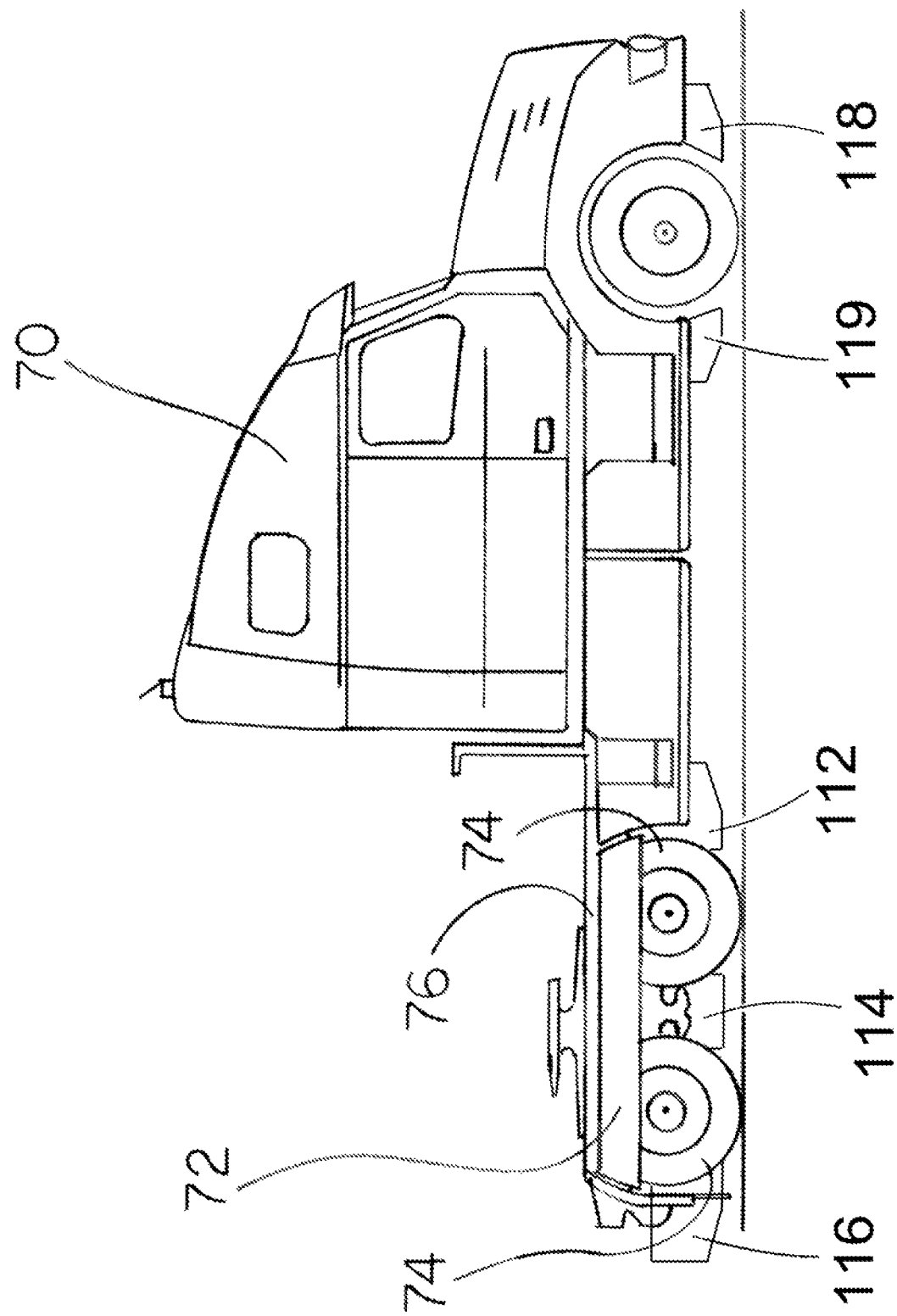
In FIG. 25, inner skirt panels similar to those shown in FIG. 21 are shown instead similarly suspended underneath the frame of a semitruck tractor. The inner skirt panels are similarly disposed adjacent to the innermost sidewalls of the respective front or rearward wheel assembly. On the front wheel assembly, the inner skirt panels are disposed with sufficient clearance apart from the tire tread to allow for directional turning of the front wheels.
Figure 26:
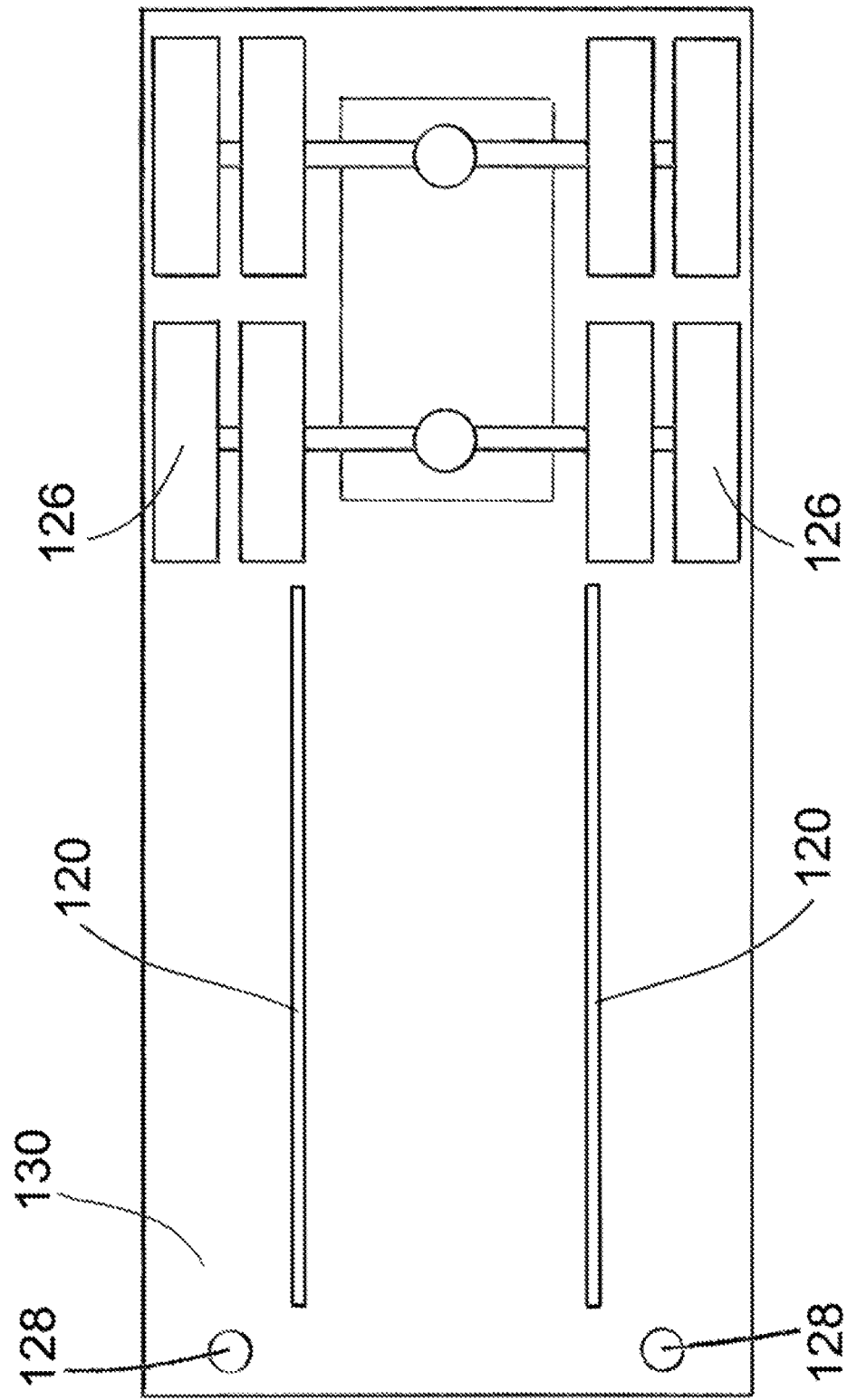
In FIG. 26, a trailer skirt panel assembly 120 is shown suspended underneath the rearward body component of a truck or semitrailer having an otherwise substantially headwind-exposed rearward wheel assembly. The trailer skirt panel assembly is disposed substantially parallel to the lateral sidewall of the vehicle body component and laterally inset substantially inline with the location of an innermost sidewall of the wheel assembly. The trailer skirt panel assembly ideally extends downward substantially below the midmost level of the axle.
Figure 27:
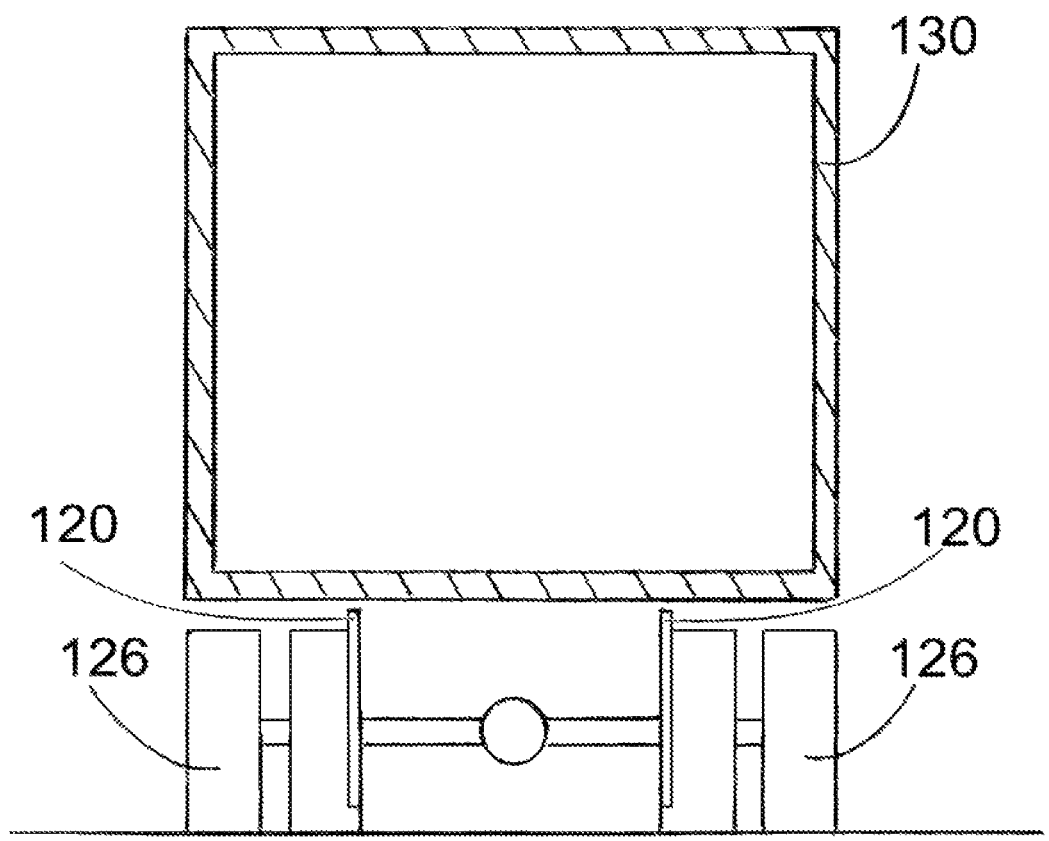
In FIG. 27, the trailer skirt panel assembly 120 as suspended underneath the rearward body component 130 of a truck or semitrailer in FIG. 26 is shown as viewed in cross-section from the front of the vehicle. Two trailer skirt panel assemblies are shown, one disposed on each lateral side of the vehicle. The rearward wheel assemblies are substantially exposed to headwinds flowing along a lateral side of the vehicle.
Figure 28:
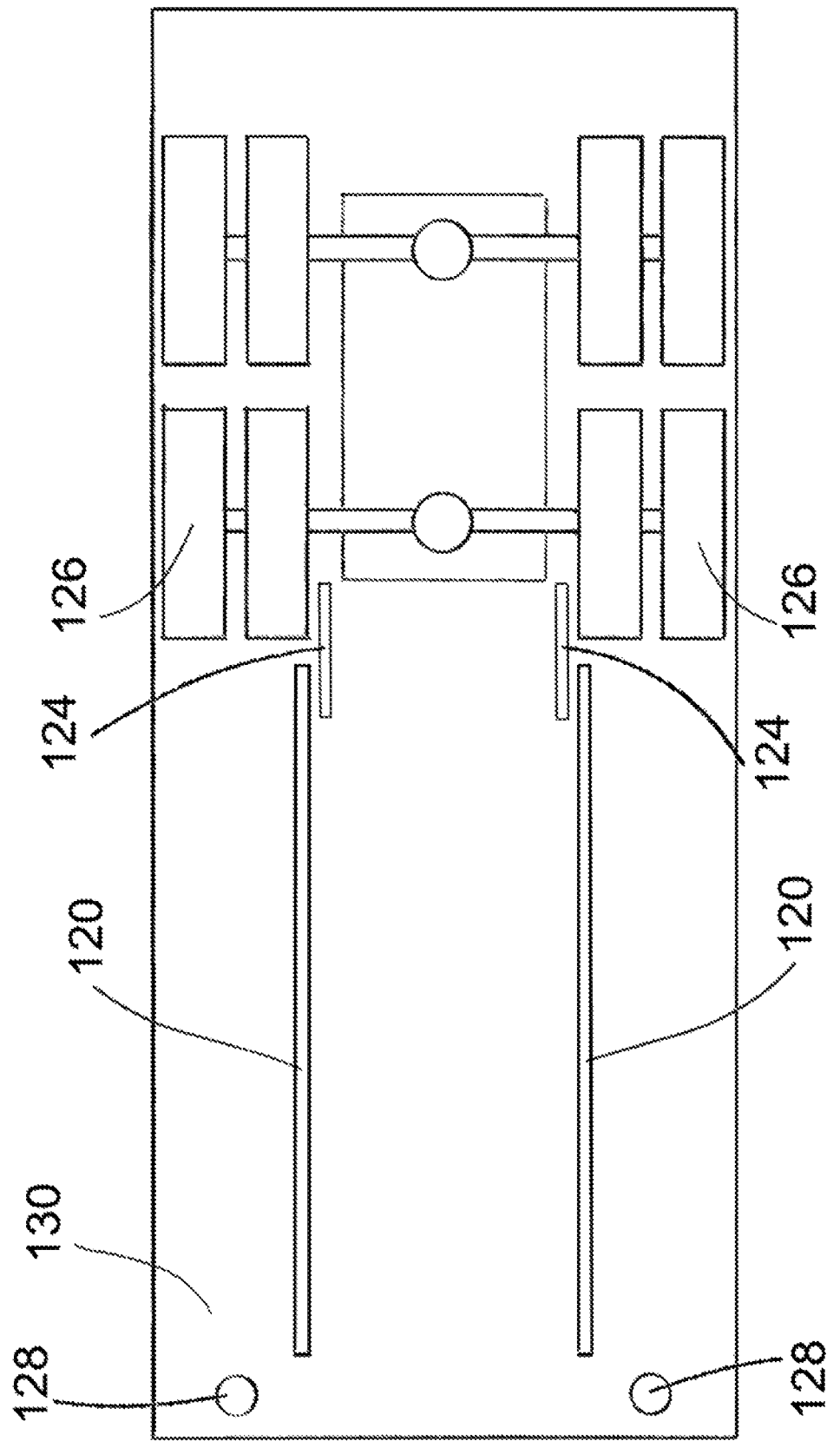
In FIG. 28, a trailer skirt panel assembly 120 as suspended underneath the rearward body component 130 of a truck or semitrailer in FIG. 26 is shown in combination with inner skirt panels 124 disposed adjacent to the rearward wheel assembly.
Figure 29:
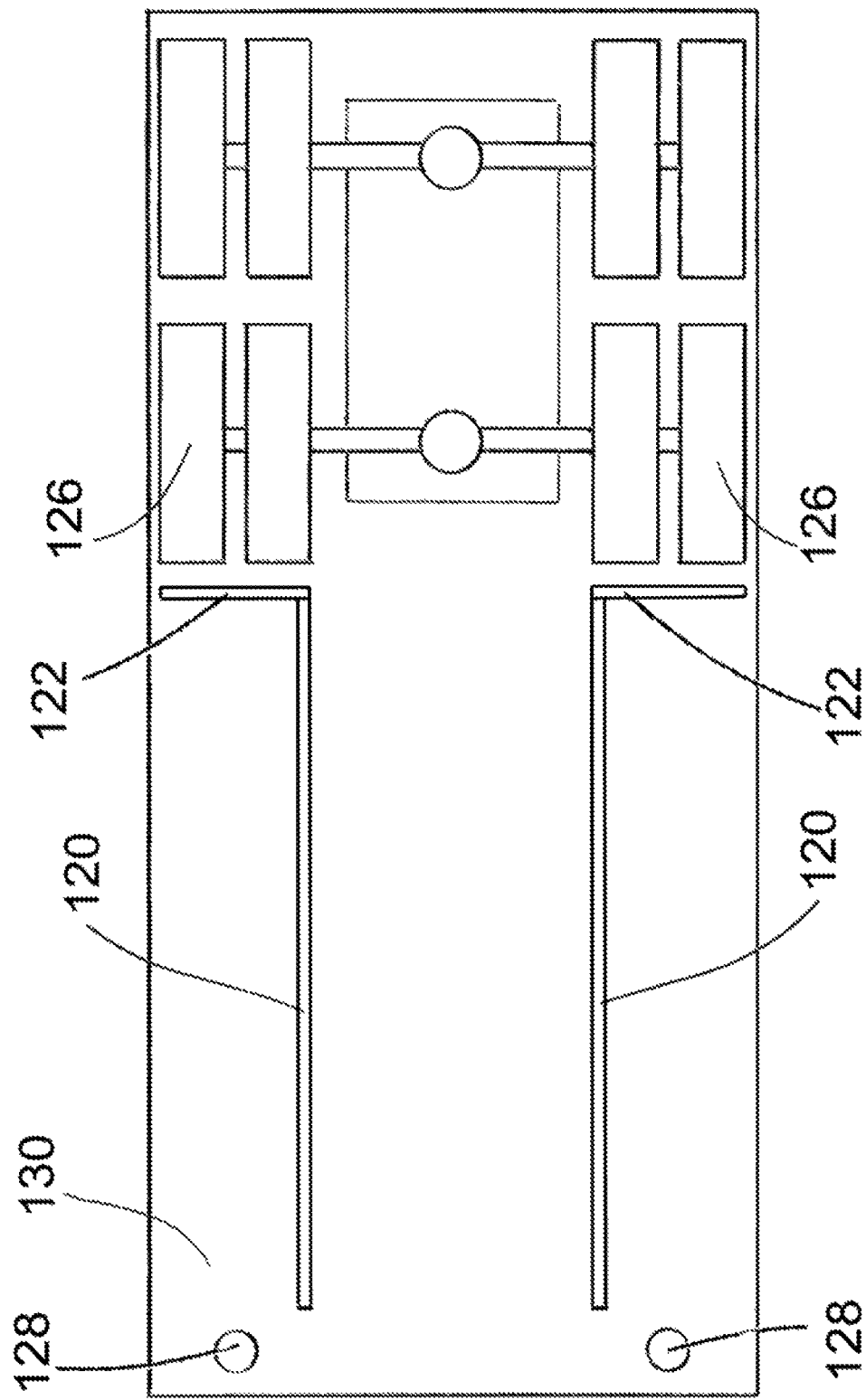
In FIG. 29, a trailer skirt panel assembly 120 as suspended underneath the rearward body component 130 of a truck or semitrailer in FIG. 26 is shown in combination with a lateral deflector panel 122 shielding the otherwise exposed uppermost portion of the trailing wheel assembly from headwinds flowing along the respective lateral side of the vehicle.
Figure 30:
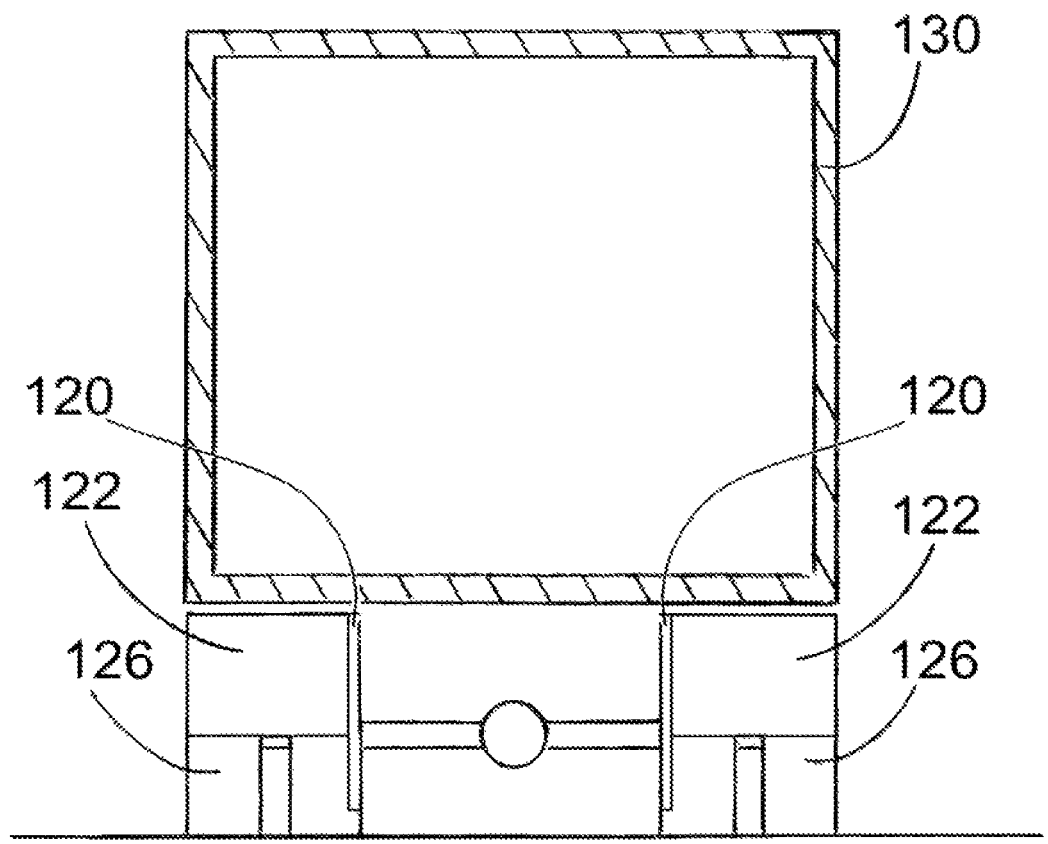
In FIG. 30, the trailer skirt panel assembly 120 as suspended underneath the rearward body component 130 of a truck or semitrailer in FIG. 29 is shown as viewed in cross-section from the front of the vehicle. Two trailer skirt panel assemblies are shown, each disposed on a lateral side of the vehicle, and each in combination with a lateral deflector panel 122 shielding the otherwise exposed uppermost portion of the trailing wheel assembly including an outermost wheel 126. As shown, ideally the lowermost portion of the rearward wheel assemblies remain substantially exposed to headwinds flowing along a lateral side of the vehicle.
Figure 31:
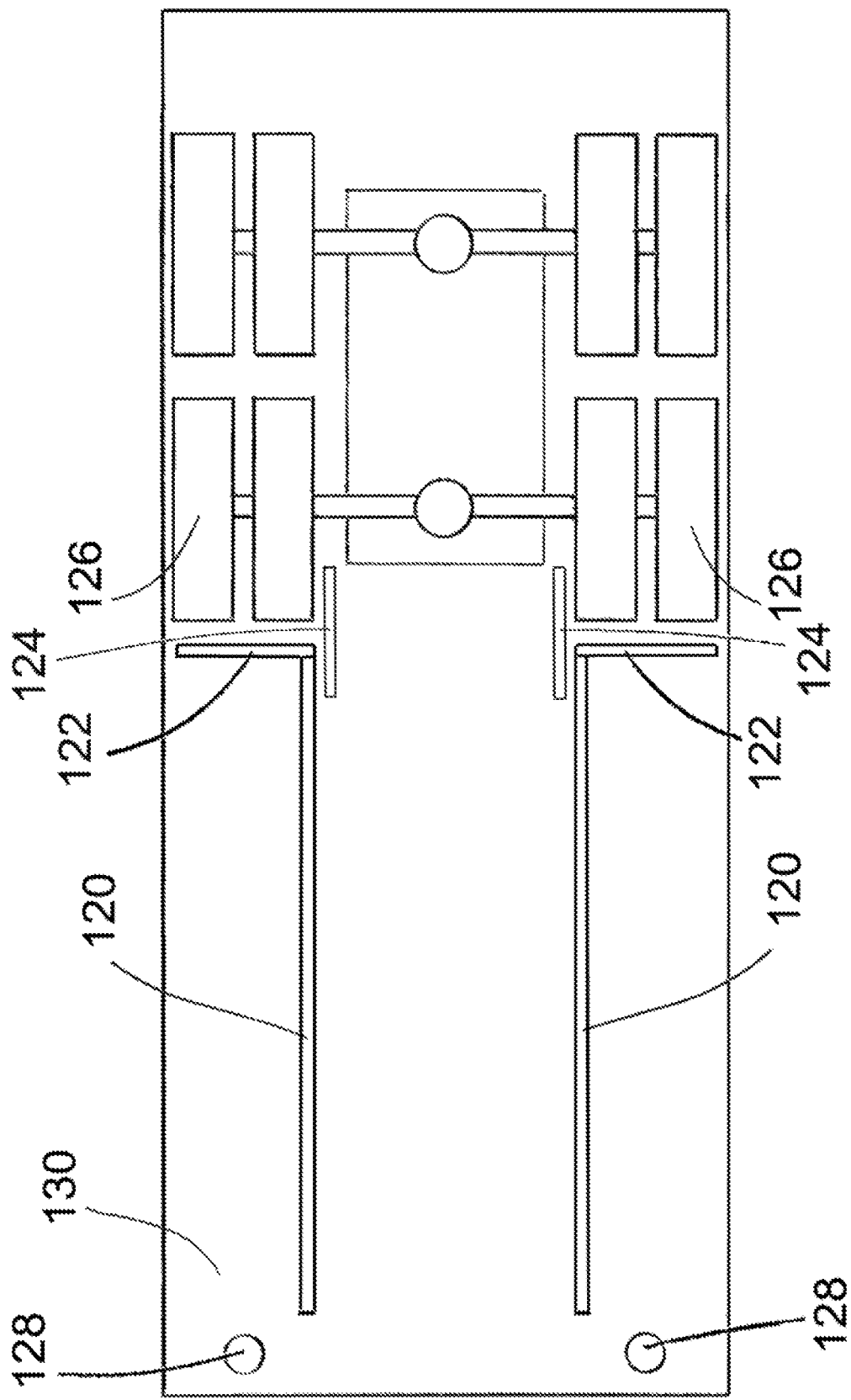
In FIG. 31, the trailer skirt panel assembly 120 as suspended underneath the rearward body component 130 of a truck or semitrailer in combination with the lateral deflector panel 122 of FIG. 29 is shown in further combination with inner skirt panels 124 disposed adjacent to the rearward wheel assembly.
Figure 32:
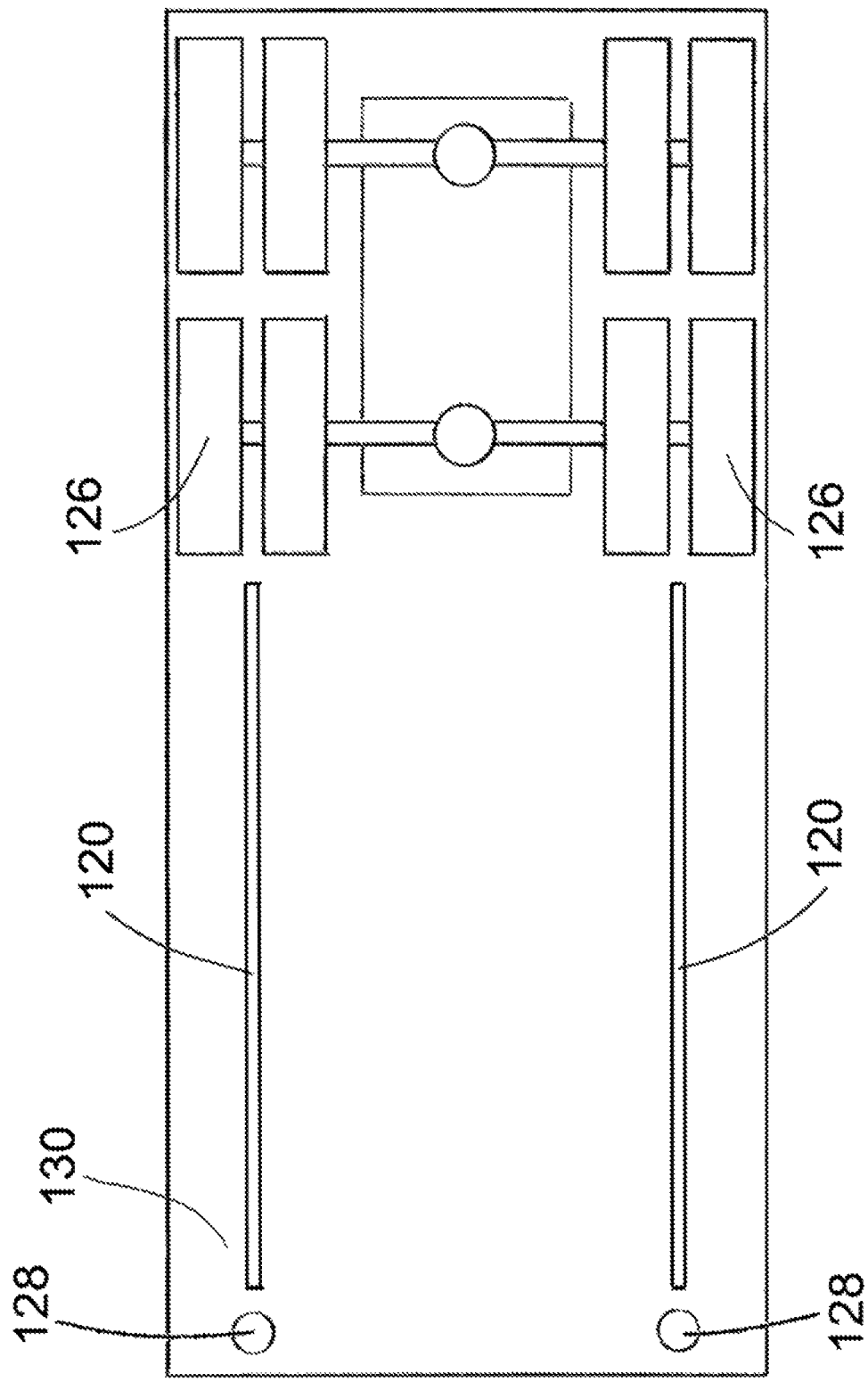
In FIG. 32, a trailer skirt panel assembly 120 is shown suspended underneath the rearward body component 130 of a truck or semitrailer having an otherwise substantially headwind-exposed rearward wheel assembly. The trailer skirt panel assembly is disposed substantially parallel to the lateral sidewall of the vehicle body component and laterally inset midway toward the location of an innermost sidewall of the wheel assembly. The trailer skirt panel assembly ideally extends downward substantially below the midmost level of the axle.
Figure 33:
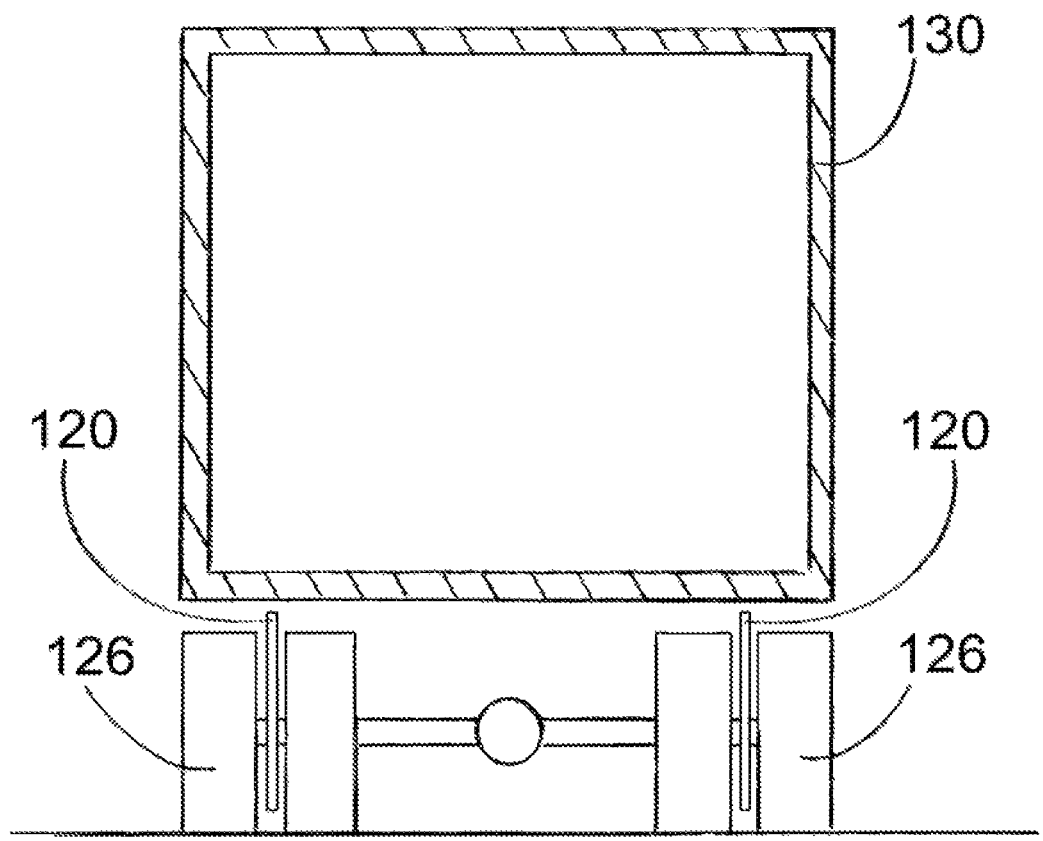
In FIG. 33, the trailer skirt panel assembly 120 as suspended underneath the rearward body component 130 of a truck or semitrailer in FIG. 32 is shown as viewed in cross-section from the front of the vehicle. Two trailer skirt panel assemblies are shown, one disposed on each lateral side of the vehicle. The rearward wheel assemblies are substantially exposed to headwinds flowing along the respective lateral side of the vehicle.
Figure 34:
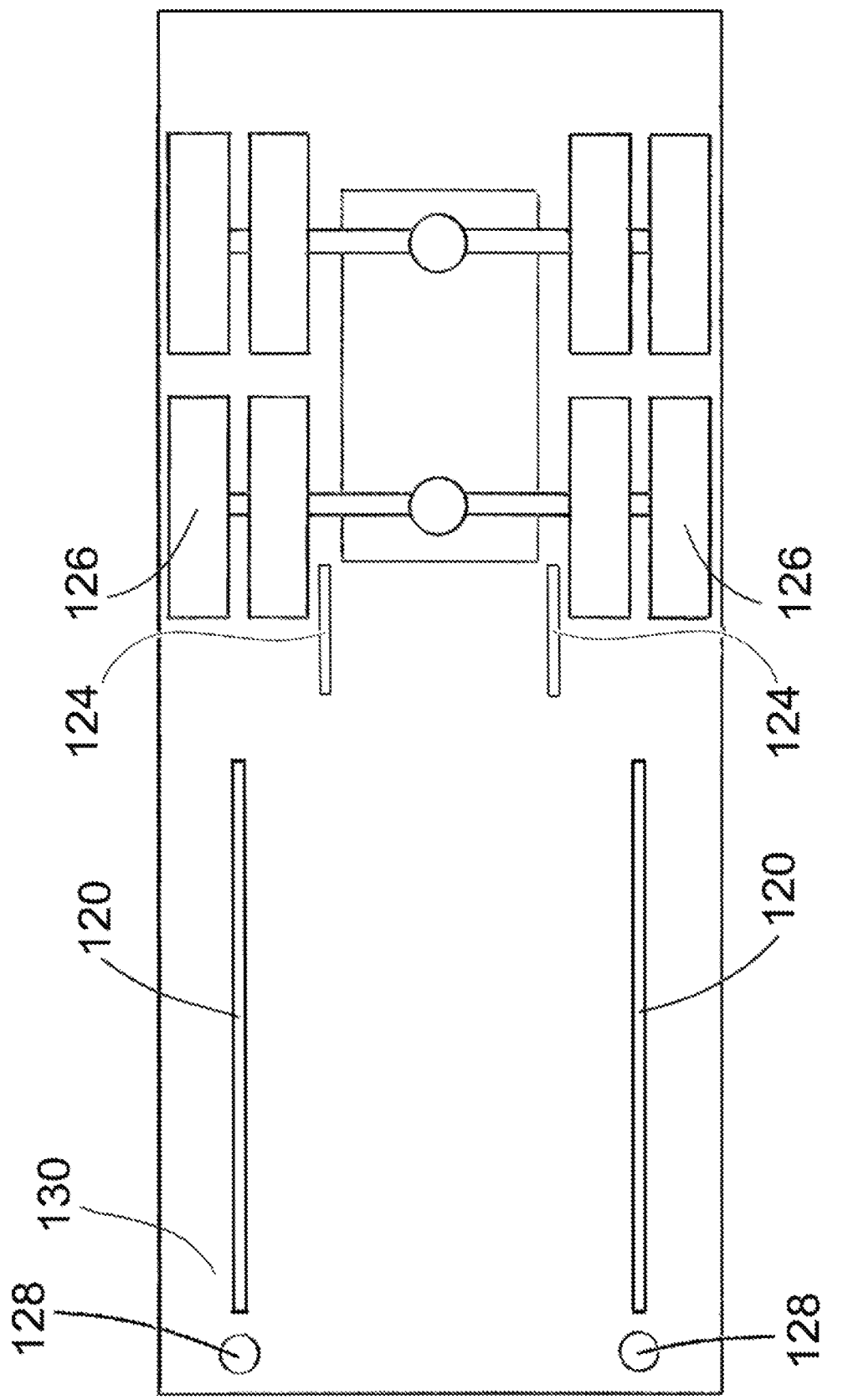
In FIG. 34, a trailer skirt panel assembly 120 as suspended underneath the rearward body component 130 of a truck or semitrailer in FIG. 32 is shown in combination with inner skirt panels 124 disposed adjacent to the rearward wheel assembly. The trailer skirt panel assembly 120 extends rearward a sufficient distance to inhibit substantial lateral air flow under the vehicle.
Figure 35:
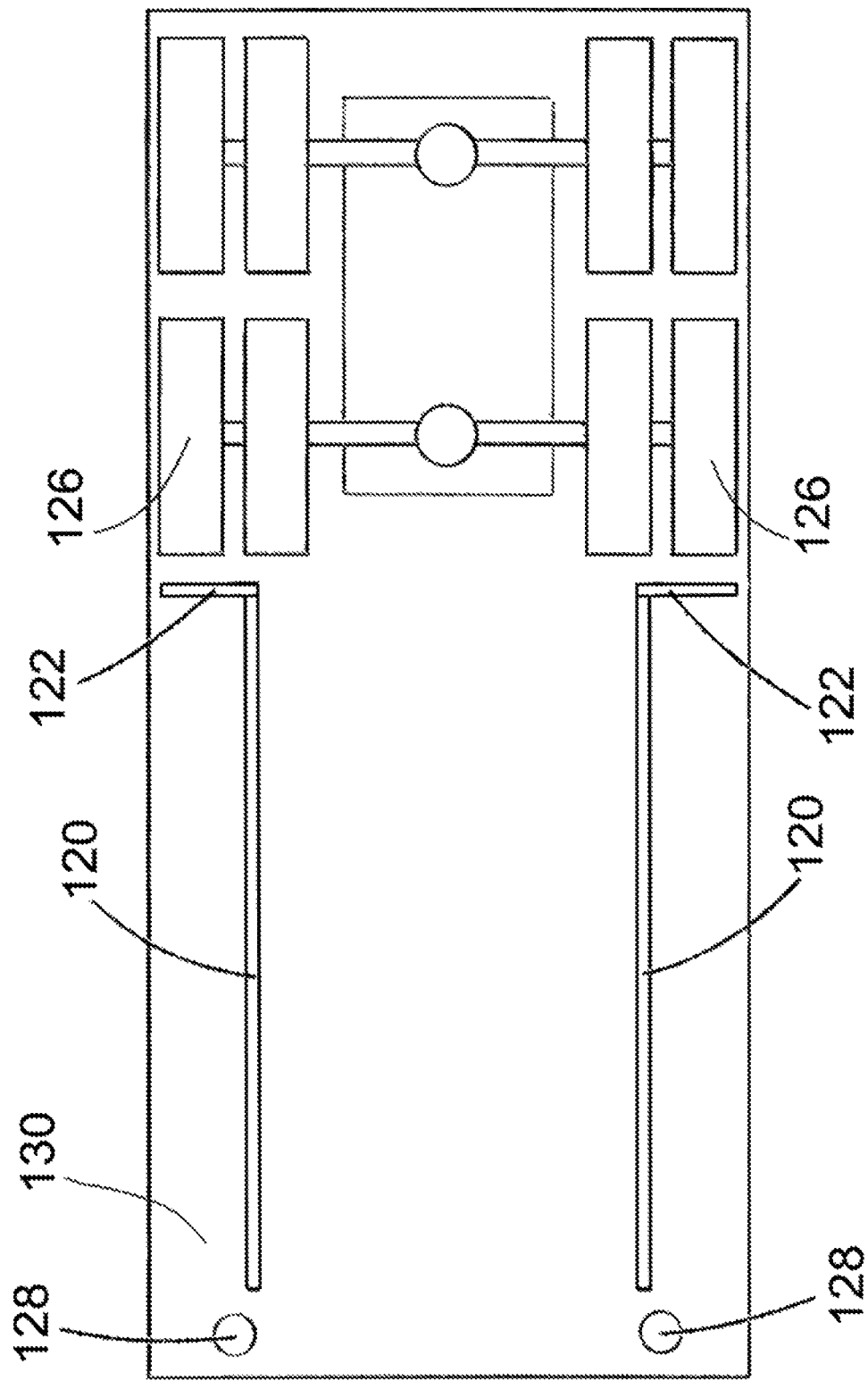
In FIG. 35, a trailer skirt panel assembly 120 as similarly suspended underneath the rearward body component 130 of a truck or semitrailer as in FIG. 32 is shown instead in combination with a lateral deflector panel 122 shielding an otherwise exposed uppermost portion of the trailing wheel assembly from headwinds flowing along the respective lateral side of the vehicle.
Figure 36:
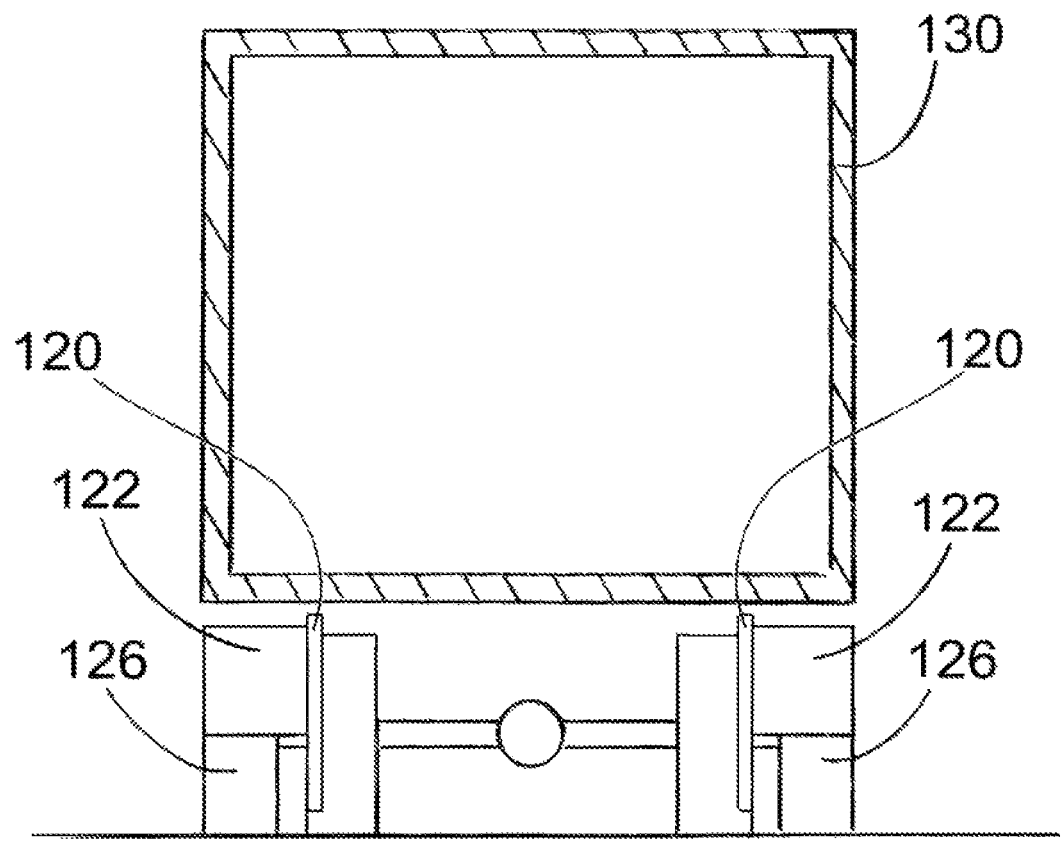
In FIG. 36, the trailer skirt panel assembly 120 as suspended underneath the rearward body component 130 of a truck or semitrailer in FIG. 35 is shown as viewed in cross-section from the front of the vehicle. Two trailer skirt panel assemblies are shown, each disposed on a lateral side of the vehicle, each in combination with a lateral deflector panel 122 shielding an otherwise exposed uppermost portion of the trailing wheel assembly. As shown, ideally a lowermost portion of the rearward wheel assemblies remain substantially exposed to headwinds flowing along a lateral side of the vehicle.
Figure 37:
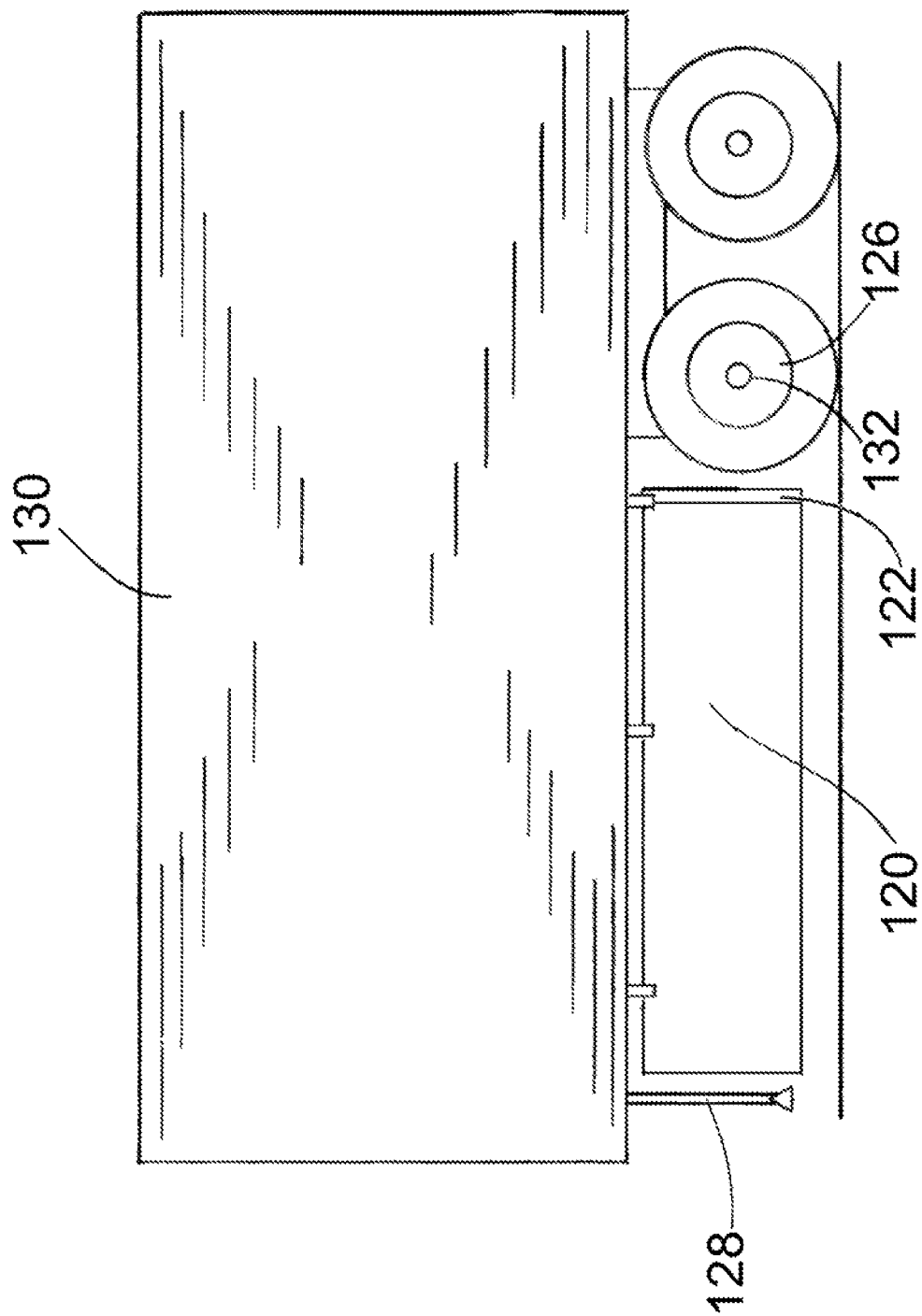
In FIG. 37, the trailer skirt panel assembly 120 as suspended underneath the rearward body component 130 of a truck or semitrailer in FIG. 29 or 35 is shown as viewed from the lateral side of the vehicle.
Figure 38:
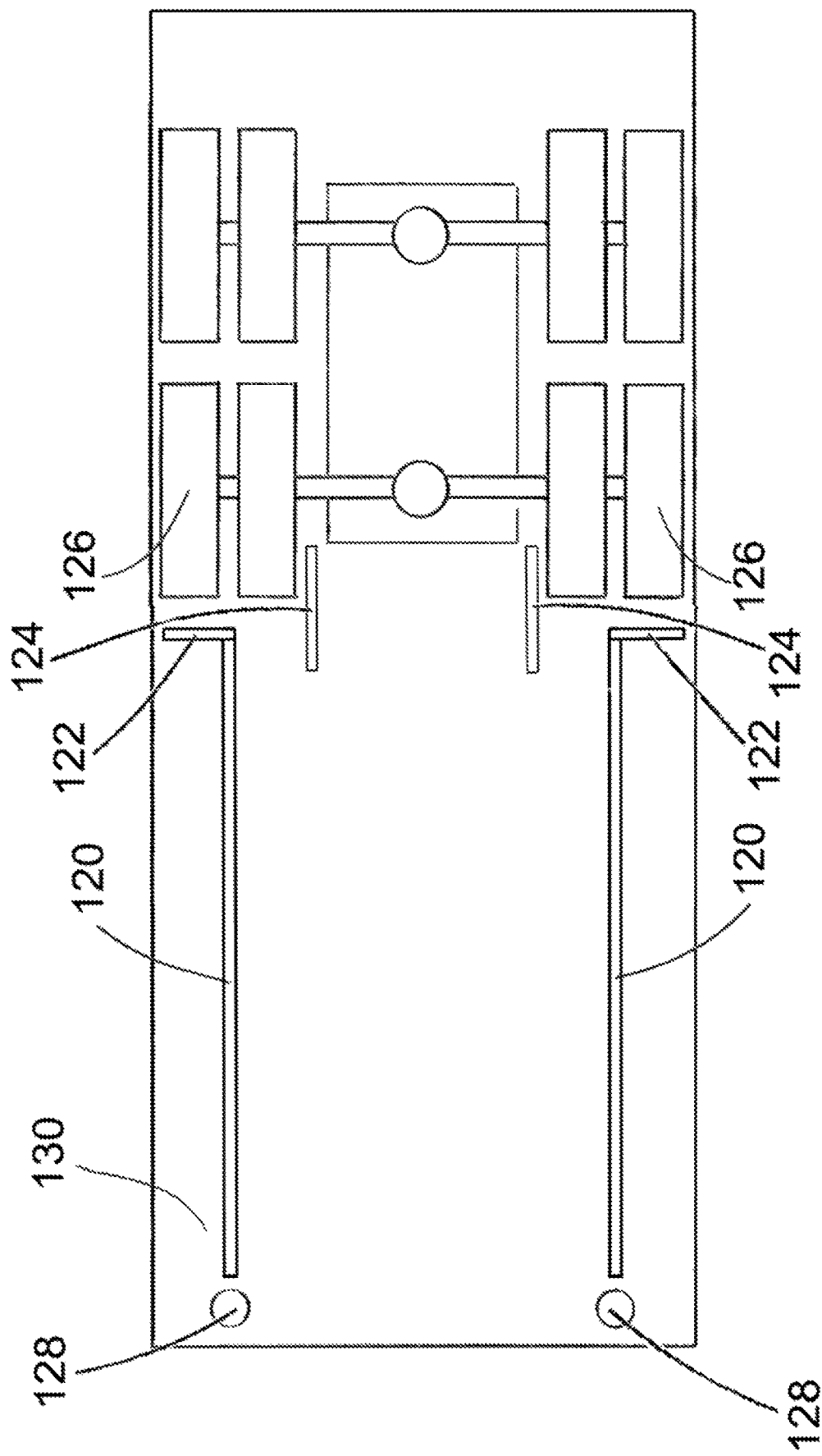
In FIG. 38, the trailer skirt panel assembly 120 as suspended underneath the rearward body component 130 of a truck or semitrailer as shown in similar combination with the lateral deflector panels 122 of FIG. 35 is furthermore shown in further combination with inner skirt panels 124 disposed adjacent to the rearward wheel assembly.
Figure 39:
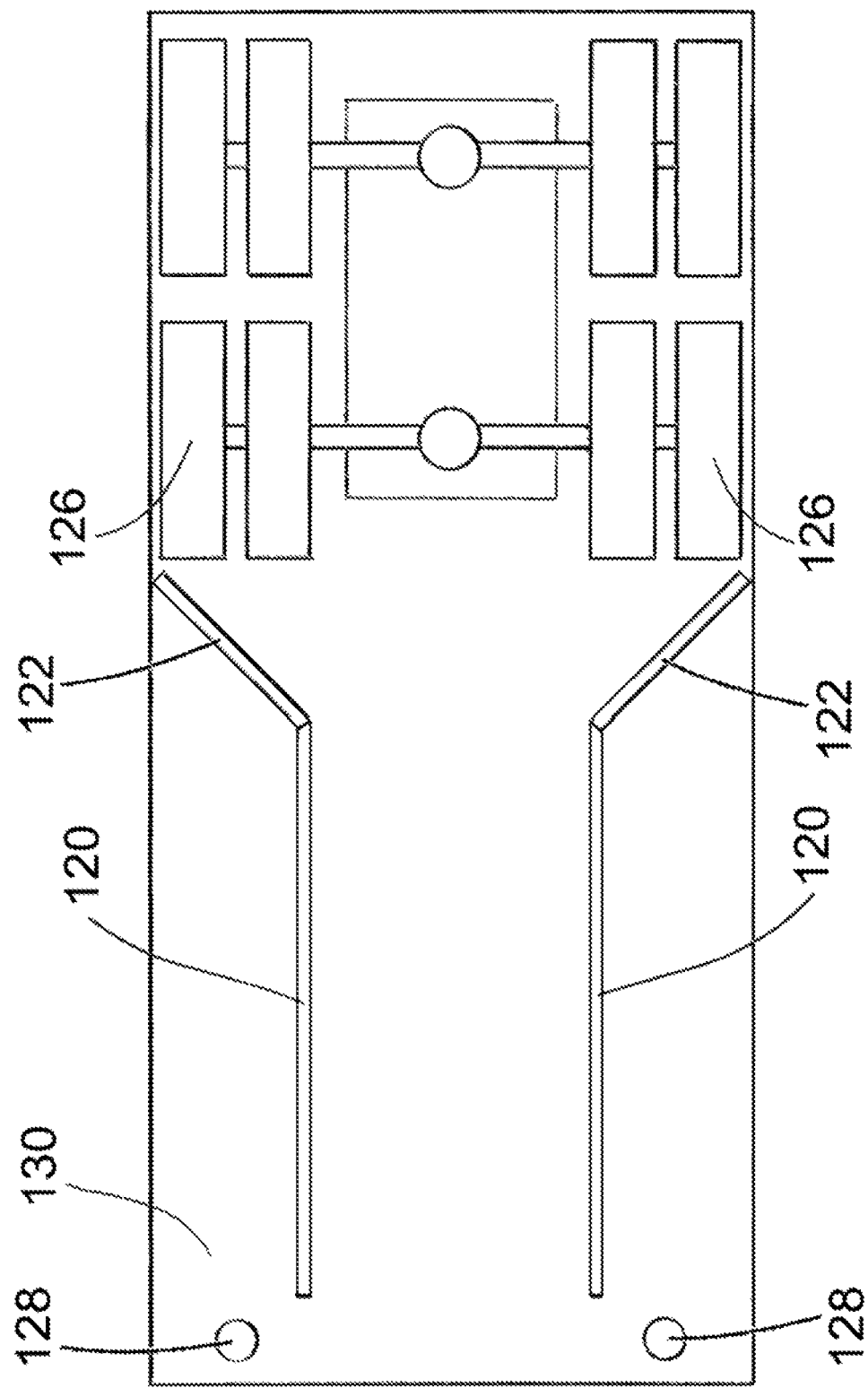
In FIG. 39, a trailer skirt panel assembly 120 is shown suspended underneath the rearward body component 130 of a truck or semitrailer having an otherwise substantially headwind-exposed rearward wheel assembly. The trailer skirt panel assembly is disposed substantially parallel to the lateral sidewall of the vehicle body component and laterally inset substantially inline with the location of an innermost sidewall of the wheel assembly. The trailer skirt panel assembly ideally extends downward substantially below the midmost level of the axle. The trailer skirt panel assembly is shown in combination with a slanted deflector panel 122 shielding the otherwise exposed uppermost portion of the trailing wheel assembly.
Figure 40:
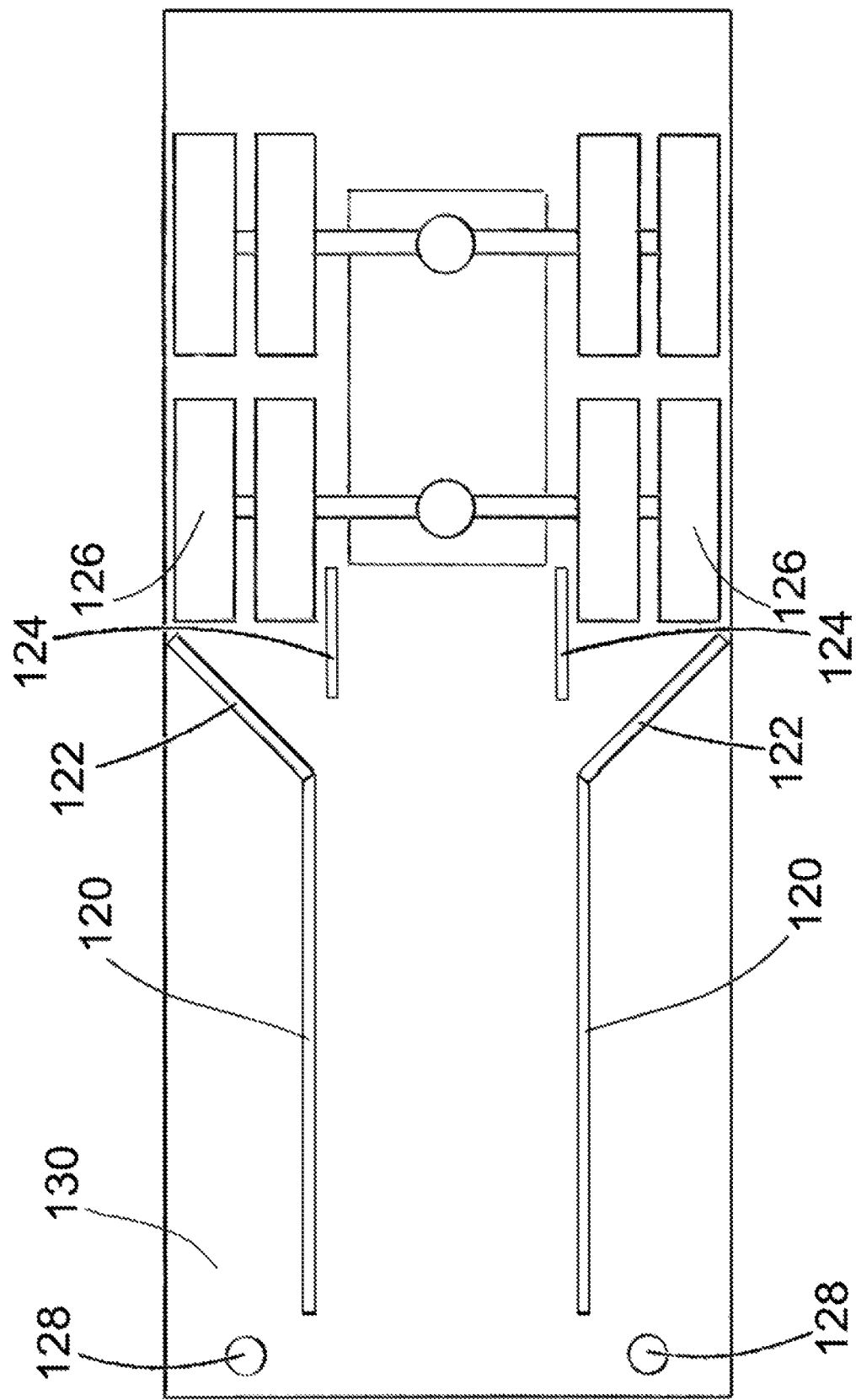
In FIG. 40, the trailer skirt panel assembly 120 as suspended underneath the rearward body component 130 of a truck or semitrailer in combination with the slanted deflector panel in FIG. 39 is shown in further combination with inner skirt panel 124 disposed adjacent to the rearward wheel assembly.
Figure 41:
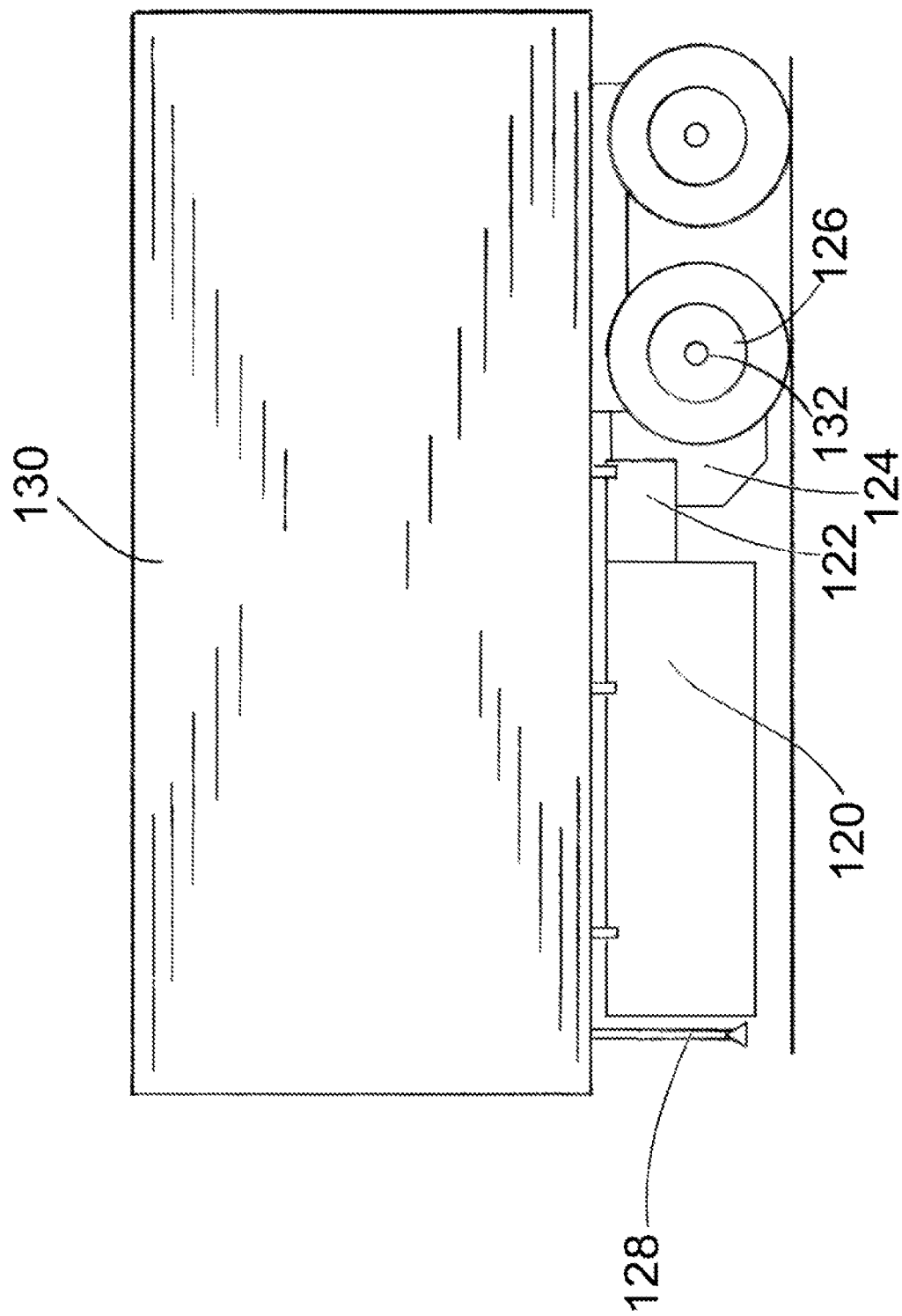
In FIG. 41, the trailer skirt panel assembly 120 as suspended underneath the rearward body component 130 of a truck or semitrailer in FIG. 40 is shown as viewed from the lateral side of the vehicle.
Figure 42:
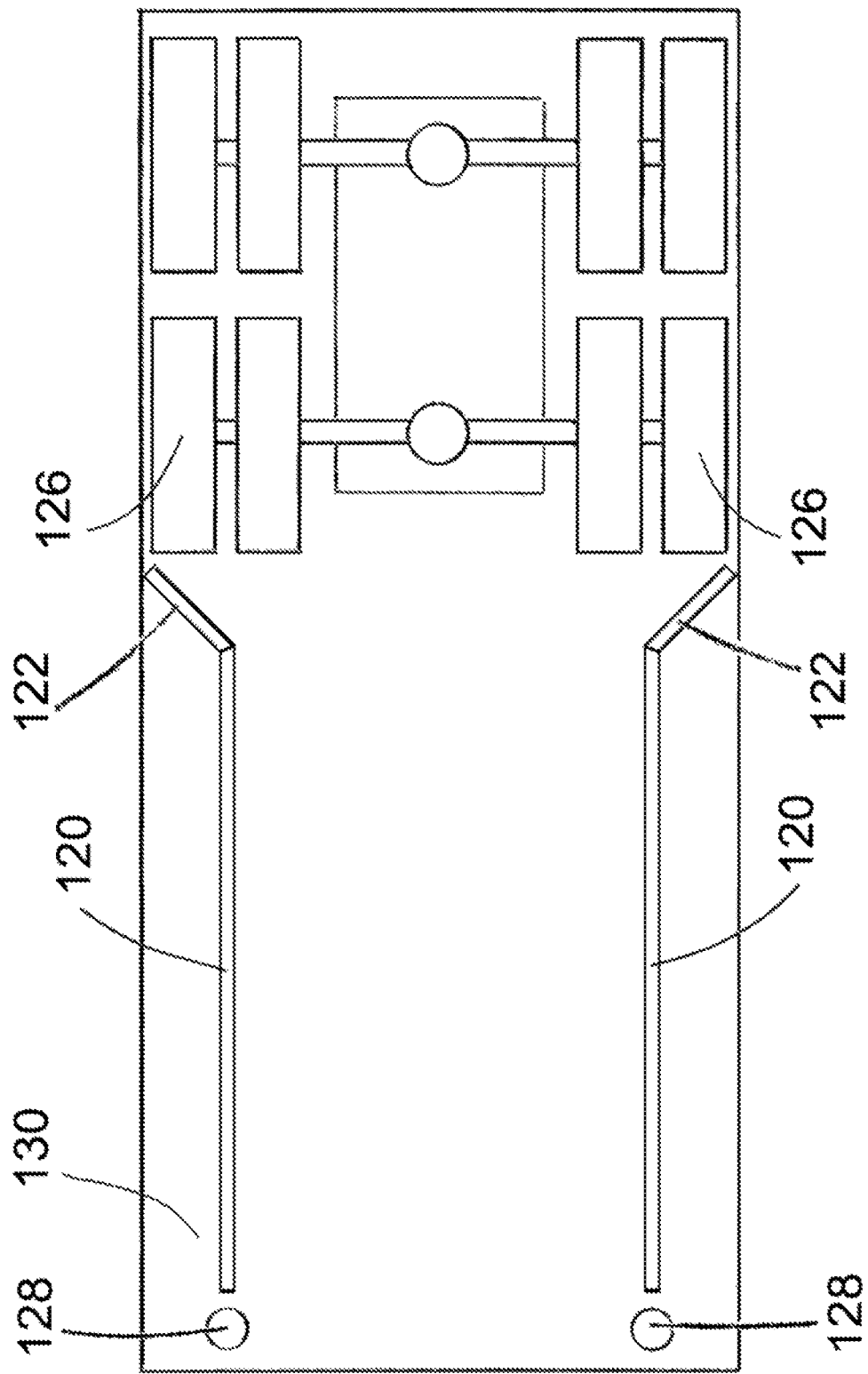
In FIG. 42, a trailer skirt panel assembly 120 is shown suspended underneath the rearward body component 130 of a truck or semitrailer having an otherwise substantially headwind-exposed rearward wheel assembly. The trailer skirt panel assembly is disposed substantially parallel to the lateral sidewall of the vehicle body component and laterally inset midway toward the location of an innermost sidewall of the wheel assembly. The trailer skirt panel assembly ideally extends downward substantially below the midmost level of the axle. The trailer skirt panel assembly is shown in combination with a slanted deflector panel 122 shielding an otherwise exposed uppermost portion of the trailing wheel assembly.
Figure 43:
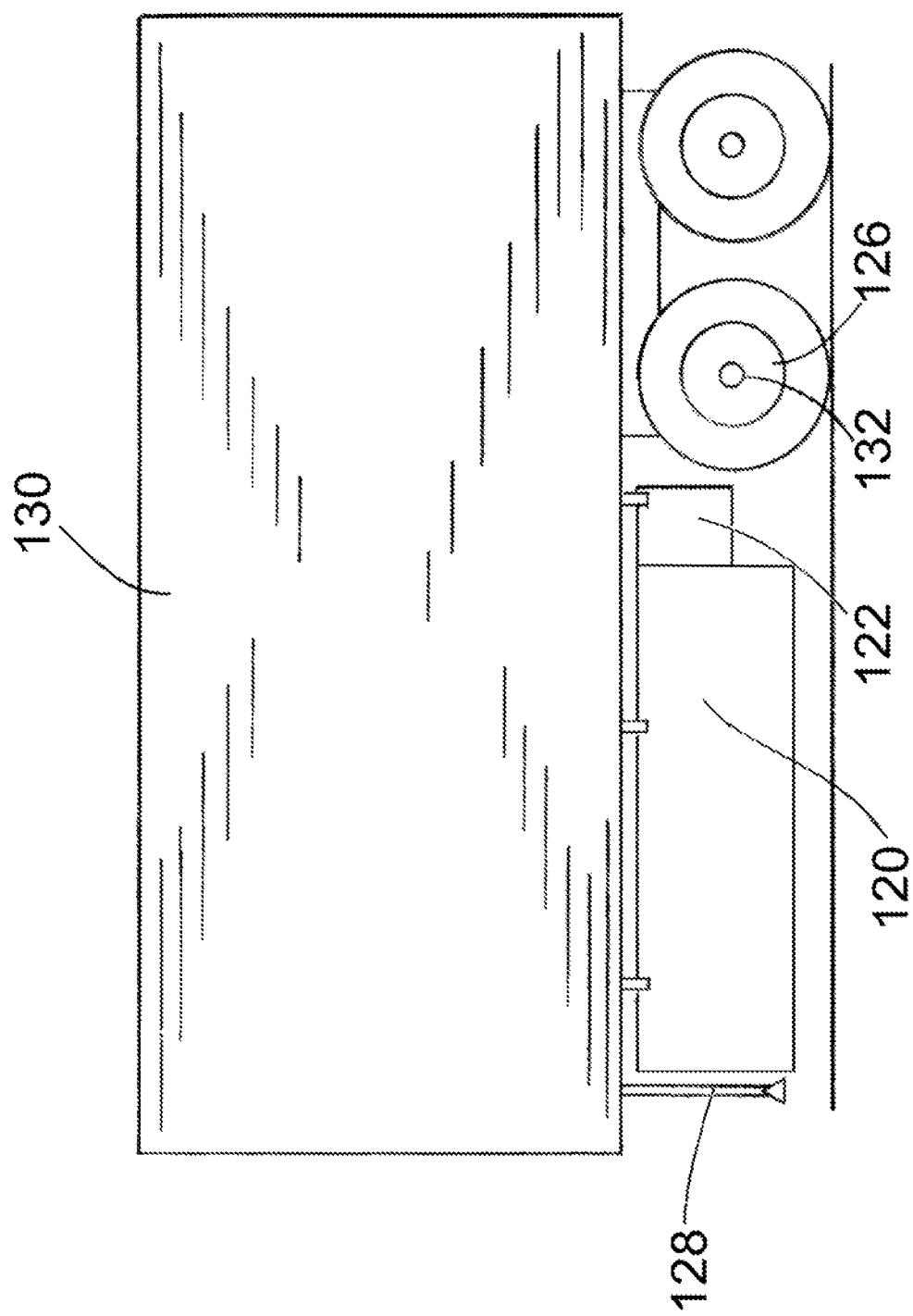
In FIG. 43, the trailer skirt panel assembly 120 as suspended underneath the rearward body component 130 of a truck or semitrailer in FIG. 42 is shown as viewed from the lateral side of the vehicle.
Figure 44:
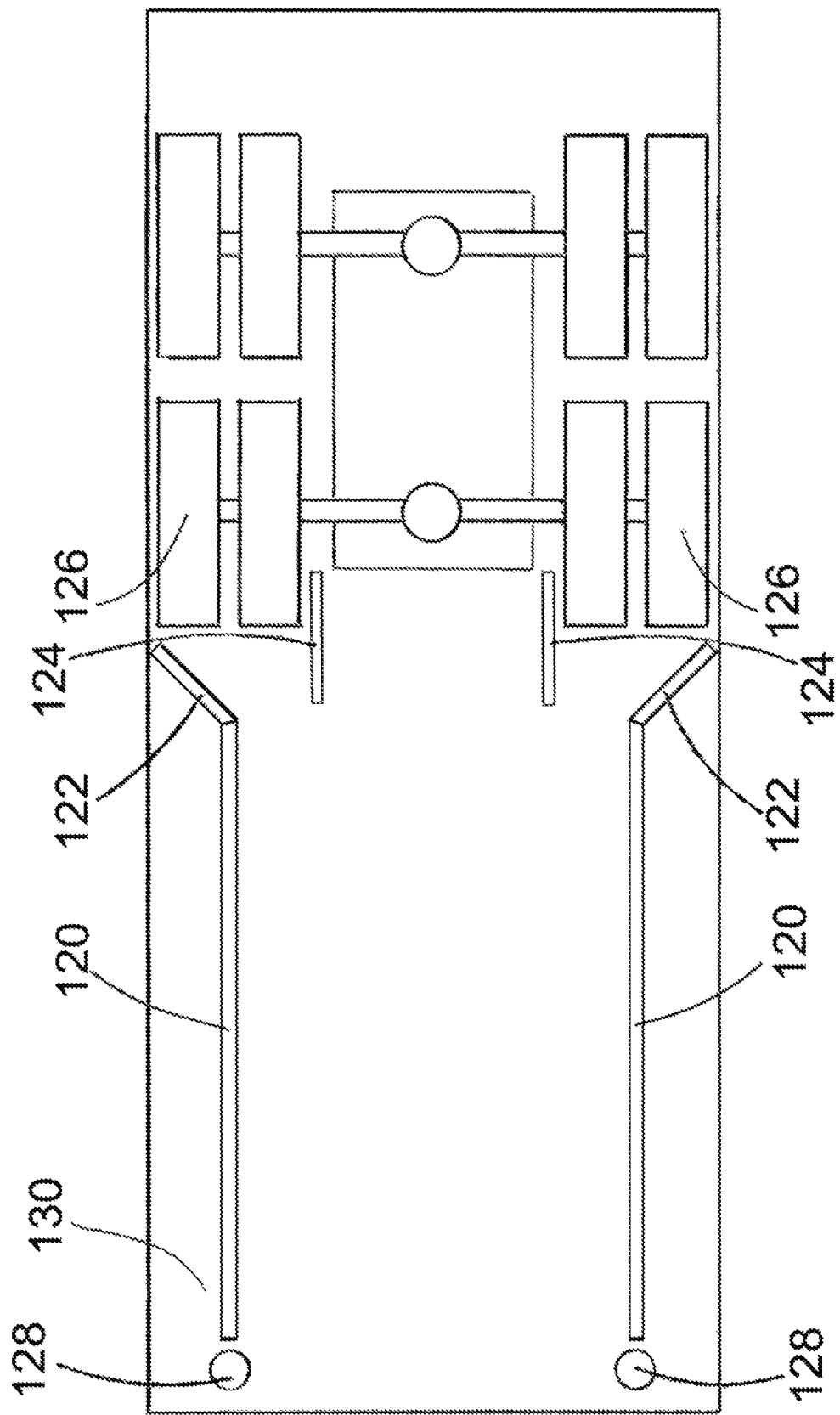
In FIG. 44, the trailer skirt panel assembly 120 as suspended underneath the rearward body component 130 of a truck or semitrailer in combination with the slanted deflector panel 122 in FIG. 42 is shown in further combination with inner skirt panel 124 disposed adjacent to the rearward wheel assembly.
Figure 45:
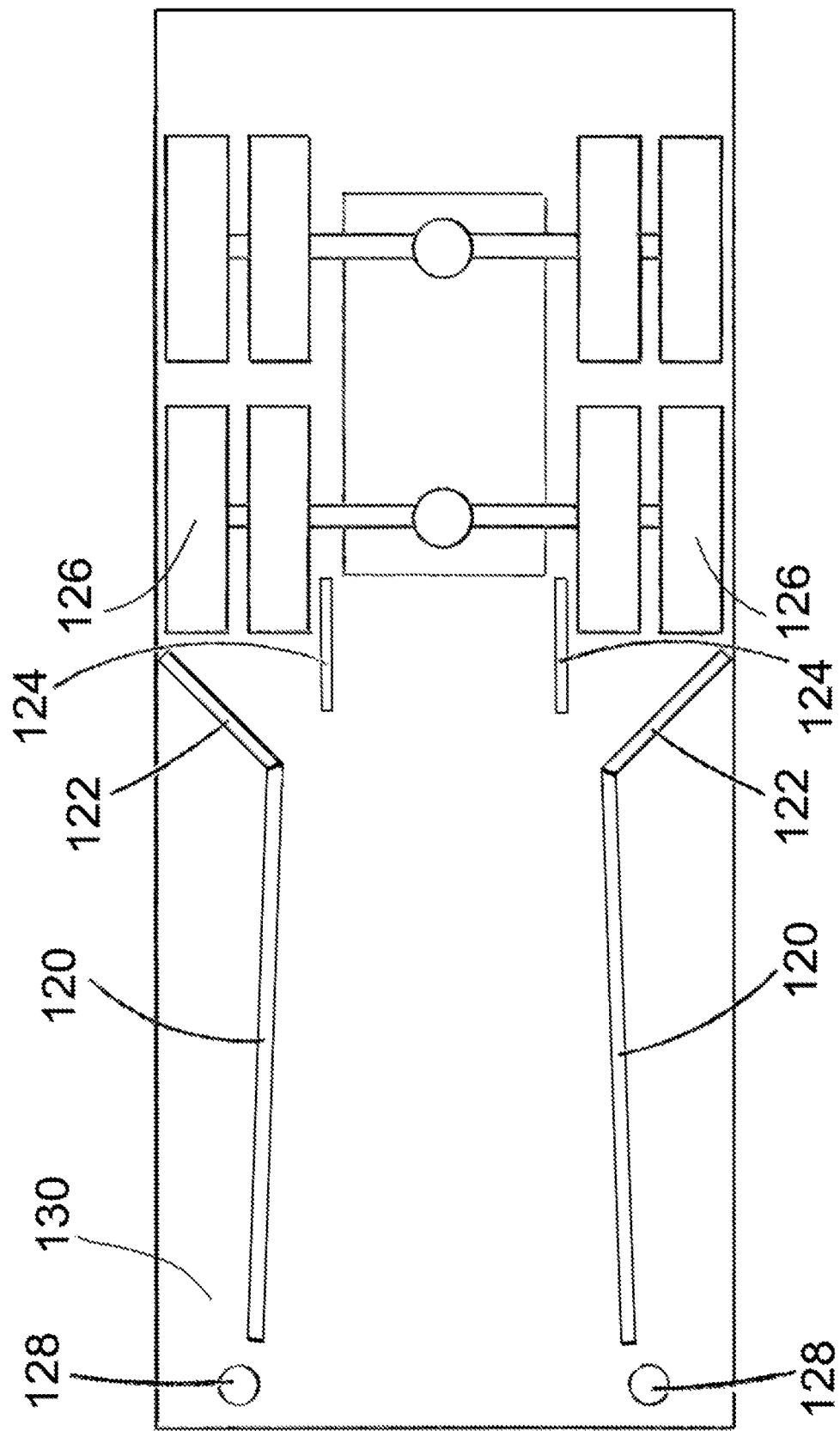
In FIG. 45, a trailer skirt panel assembly 120 is shown suspended underneath the rearward body component of a truck or semitrailer having an otherwise substantially headwind-exposed rearward wheel assembly. The trailer skirt panel assembly is disposed substantially non-parallel to a lateral side of the vehicle body component 130 and extends from near the vehicle landing gear 128 rearward and inward toward an intermediate longitudinal position that is laterally inset substantially further toward the lateral location of an innermost sidewall of the wheel assembly. The trailer skirt panel assembly is shown in combination with a slanted deflector panel 122 shielding an otherwise exposed uppermost portion of the trailing wheel assembly and in further combination with inner skirt panel 124 disposed adjacent to the rearward wheel assembly. The trailer skirt panel assembly ideally extends downward substantially below the midmost level of the axle.

Furthermore, inner skirt panels can even be employed on the front wheels of the vehicle, including on cargo delivery trucks, on semitruck tractors (as shown in FIG. 25), and even on automobiles, where the inner skirt panels 118 and 119 are furthermore disposed to allow for steering movement of the wheels. Typically, as shown in FIG. 25, the non-horizontal edge of the inner skirt panel immediately adjacent to the wheel (disposed either in front or behind the front wheel) is preferably configured either slanted or curved in shape having a curved radius similar to that of the front wheel, in order to allow the wheel to clear the panel edge during vehicle turning maneuvers.

Present Embodiment

As shown in various FIGS. 26-50, a present embodiment comprises an aerodynamic trailer skirt assembly 120 comprising one or more panels disposed laterally inset underneath the rearward body component 130 of a truck or semitrailer. The trailer skirt assembly 120 is shown disposed from a forwardmost end thereof located toward any vehicle landing gear 128 that may be present on the vehicle and extending downward under the vehicle body component 130, to a rearward end thereof located near the rearward wheel assembly 126. The trailer skirt assembly 120 is generally arranged to be substantially inset laterally from the outer lateral side of the semitrailer or truck body, and preferably arranged substantially parallel to the outer lateral side of the semitrailer or truck body—although in some embodiments the rear end could be located somewhat either further inward or outward laterally from the longitudinal centerline of the vehicle, while being disposed in sufficiently shallow convergent or divergent angle with respect to the lateral side of the vehicle that still yields a reduction on overall vehicle drag.

Arranged generally parallel to the truck lateral side, but substantially inset laterally, the trailer skirt assembly 120 further stabilizes the central air column passing under the vehicle body from near the front of the truck to the rear wheel assembly, while also limiting the total skirt assembly surface area being directly exposed to lateral-side vehicle headwinds. By inhibiting the lateral displacement of air under the truck body, the trailer skirt assembly 120 functions similarly to that of the inner skirt panels 110 (see 110 of FIGS. 21-24), to maintain the central air column passing under the vehicle in a more undisturbed static condition. And by arranging the trailer skirt assembly 120 to be laterally inset substantially toward the longitudinal centerline of the vehicle, thereby limits the drag induced from headwinds impinging on the extended surfaces of the trailer skirt assembly 120 itself.

And as taught above under the description of the inner skirt panels 110 (FIGS. 21-24), stabilized static air contains more pressure than disturbed, de-stabilized dynamic air. Thus, the further stabilized is the central air column, the more effectively the higher static pressure developed in the front of the vehicle is communicated directly to the rear of the vehicle at up to the speed of sound, thereby actually increasing the static pressure developed behind the vehicle. And increased air pressure developed behind the vehicle then reduces the differential pressure developed between the front and rear of the forward-moving vehicle, thereby decreasing overall vehicle drag.

And—as mentioned above—by arranging the trailer skirt assembly 120 to be disposed somewhat inset laterally toward the longitudinal centerline of the vehicle, as shown in various FIGS. 26-50, the trailer skirt assembly is less directly exposed to vehicle lateral-side headwinds, thereby decreasing drag induced thereon. However, arranging the trailer skirt assembly 120 to be inset laterally too far inward toward the longitudinal centerline of the vehicle can also reduce the width of any central stabilized air column passing under the moving vehicle, thereby reducing the effectiveness of the trailer skirt assembly 120 in communicating forward air pressure rearward under the vehicle to reduce overall vehicle drag. Typically, the central open space containing the central air column should be substantially maintained generally as wide as the intervening space between the trailing wheel assembly 120.

Moreover, arranging the trailer skirt assembly 120 to be either inwardly converging or outwardly diverging from the front to the rear ends thereof, must also be arranged to be sufficiently limited in shallow angle to maintain a sufficiently wide stabilized air column passing under the central portion of the vehicle that actually reduces overall vehicle drag.

And arranging the trailer skirt assembly 120 in too severe an inwardly converging or outwardly diverging angle can cause the moving trailer skirt assembly 120 to more directly impinge the otherwise generally static central air column, further de-stabilizing the amount of relatively undisturbed static air actually passing centrally under the vehicle, thereby minimizing any effectiveness of the trailer skirt assembly 120 in reducing overall vehicle drag.

And a further design consideration would likely include the vehicle operating conditions; whether the vehicle is more often operated in windy conditions or under more null wind conditions.

In windy conditions, the vehicle is more often exposed to more laterally directed headwinds, thereby exposing the laterally inset trailer skirt assembly 120 itself more directly to vehicle headwinds. Thus, under windy vehicle operating conditions, it can be beneficial to locate the trailer skirt assembly 120 substantially more laterally inward as in FIGS. 26, 28 and 29, thereby more effectively shielding the larger skirt assembly surfaces from lateral vehicle headwinds impinging directly thereon. This may be further enhanced by angling the trailer skirt assembly 120 to be arranged slightly more inwardly convergent from the front to the rear end thereof as in FIGS. 45, 47 and 49, but only enough to be consistent with maintaining a sufficiently wide undisturbed stabilized central air column that actually reduces overall vehicle drag.

Figure 46:
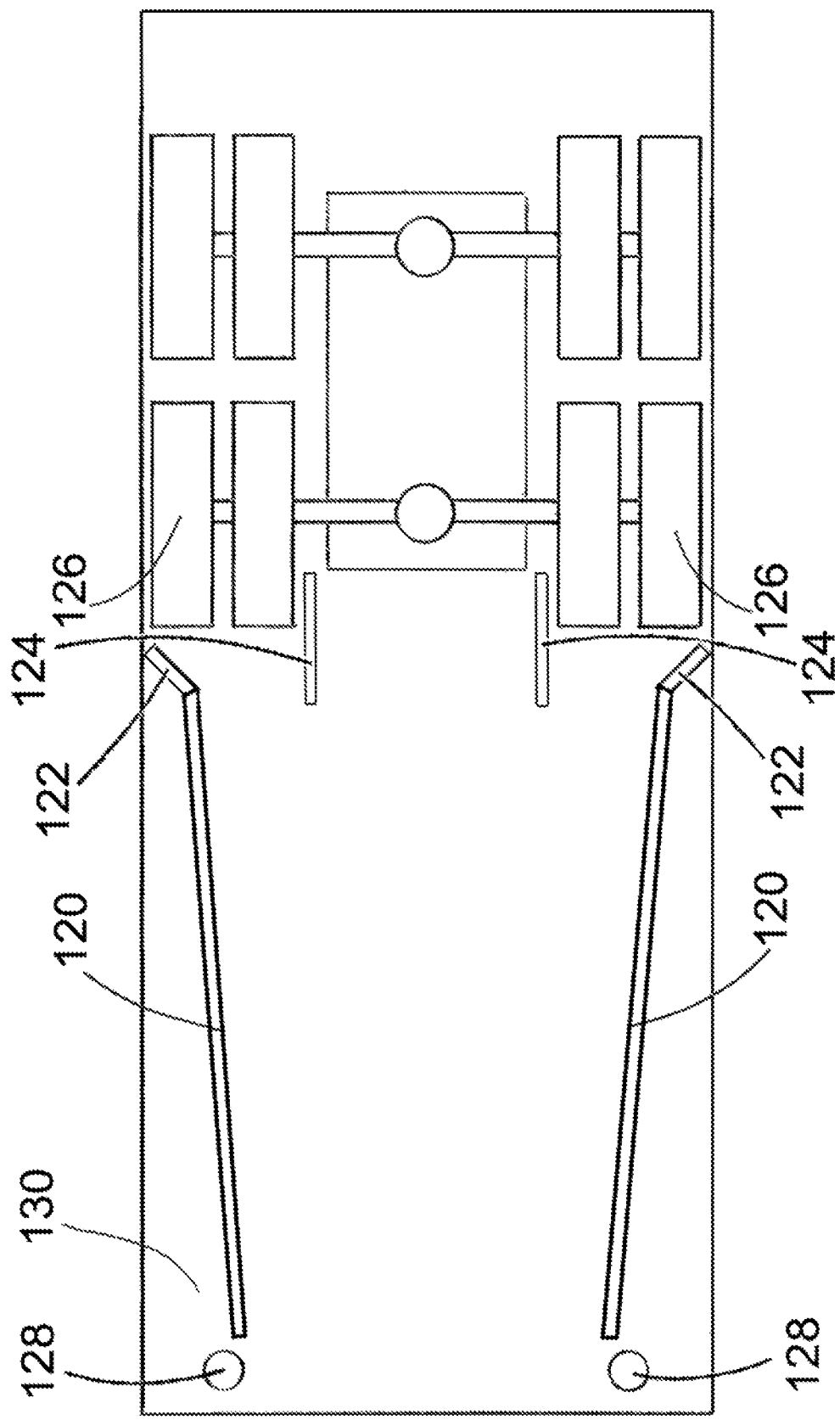
In FIG. 46, a trailer skirt panel assembly 120 is shown suspended underneath the rearward body component 130 of a truck or semitrailer having an otherwise substantially headwind-exposed rearward wheel assembly. The trailer skirt panel assembly is disposed non-parallel to the lateral sidewall of the vehicle body component and extends from near the vehicle landing gear 128 rearward and outward toward an intermediate longitudinal position that is laterally inset from the location of an outermost sidewall of the wheel assembly a substantial distance that is equal to less than half the lateral width of the wheel assembly. The trailer skirt panel assembly is shown in combination with a slanted deflector panel 122 shielding the otherwise exposed uppermost portion of the trailing wheel assembly and with inner skirt panel 124. The trailer skirt panel assembly ideally extends downward substantially below the midmost level of the axle.
Figure 47:
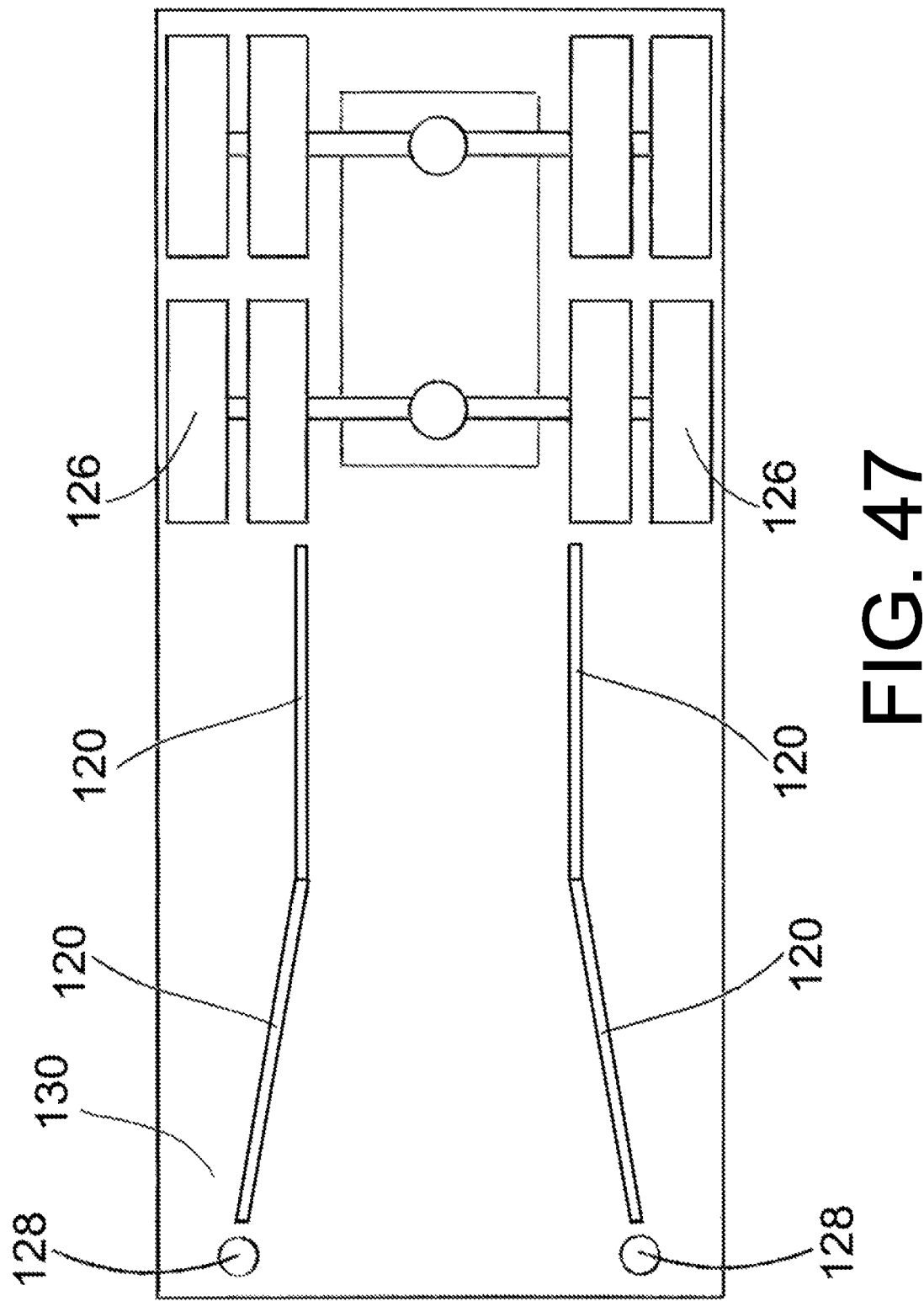
In FIG. 47, a trailer skirt panel assembly 120 is shown suspended underneath the rearward body component 130 of a truck or semitrailer having a substantially headwind-exposed rearward wheel assembly. The trailer skirt panel assembly is disposed non-parallel to the lateral sidewall of the vehicle body component while extending from near the vehicle landing gear 128 rearward and inward to an intermediate location that is laterally inset beyond the lateral middle of the wheel assembly substantially toward the lateral position of an innermost sidewall of the wheel assembly. From near this intermediate location the trailer skirt panel assembly further extends rearward substantially parallel to the innermost sidewall of the wheel assembly. The trailer skirt panel assembly also ideally extends downward substantially below the midmost level of the axle.
Figure 48:
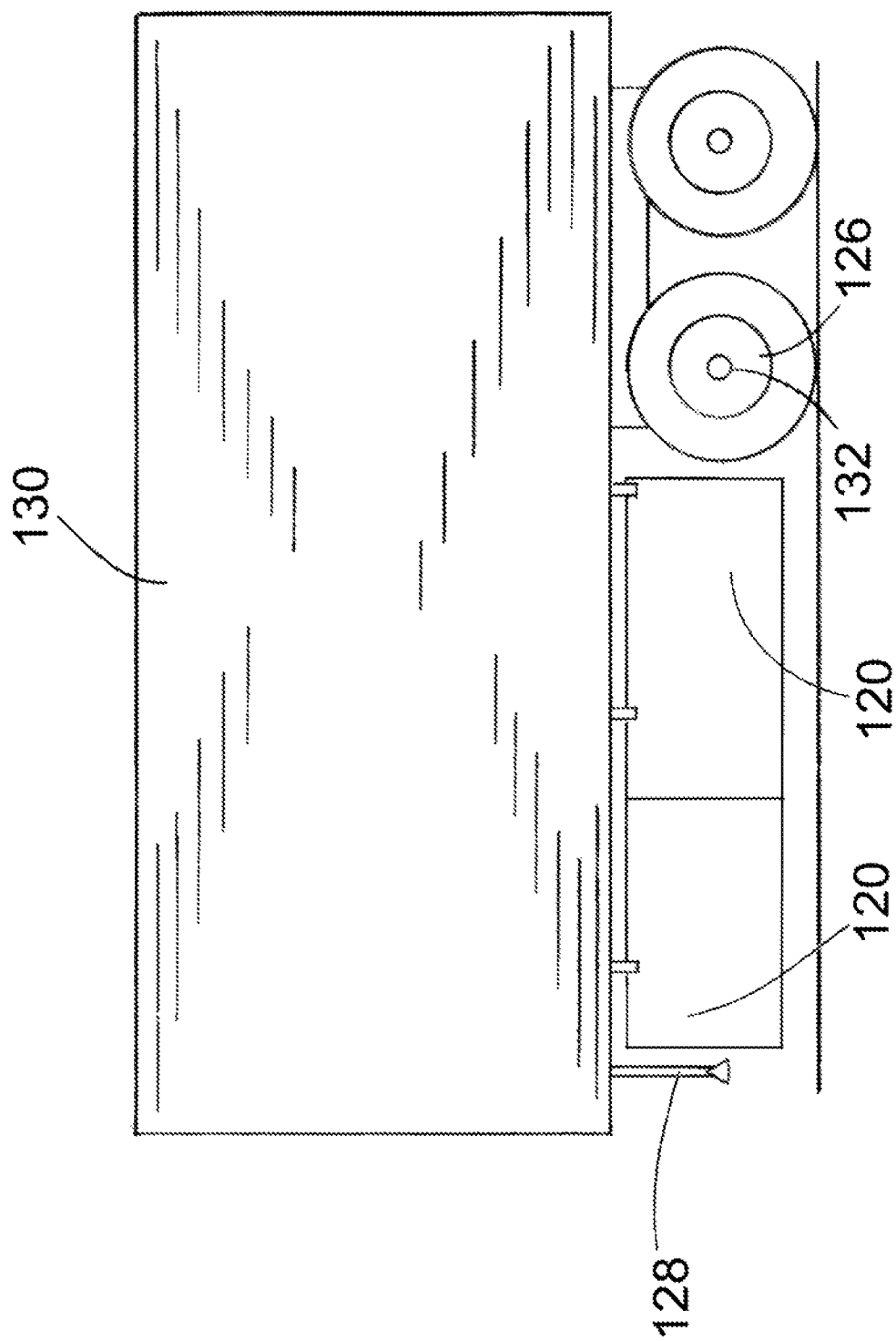
In FIG. 48, the trailer skirt panel assembly 120 as suspended underneath the rearward body component 130 of a truck or semitrailer in FIG. 47 is shown as viewed from the lateral side of the vehicle.
Figure 49:
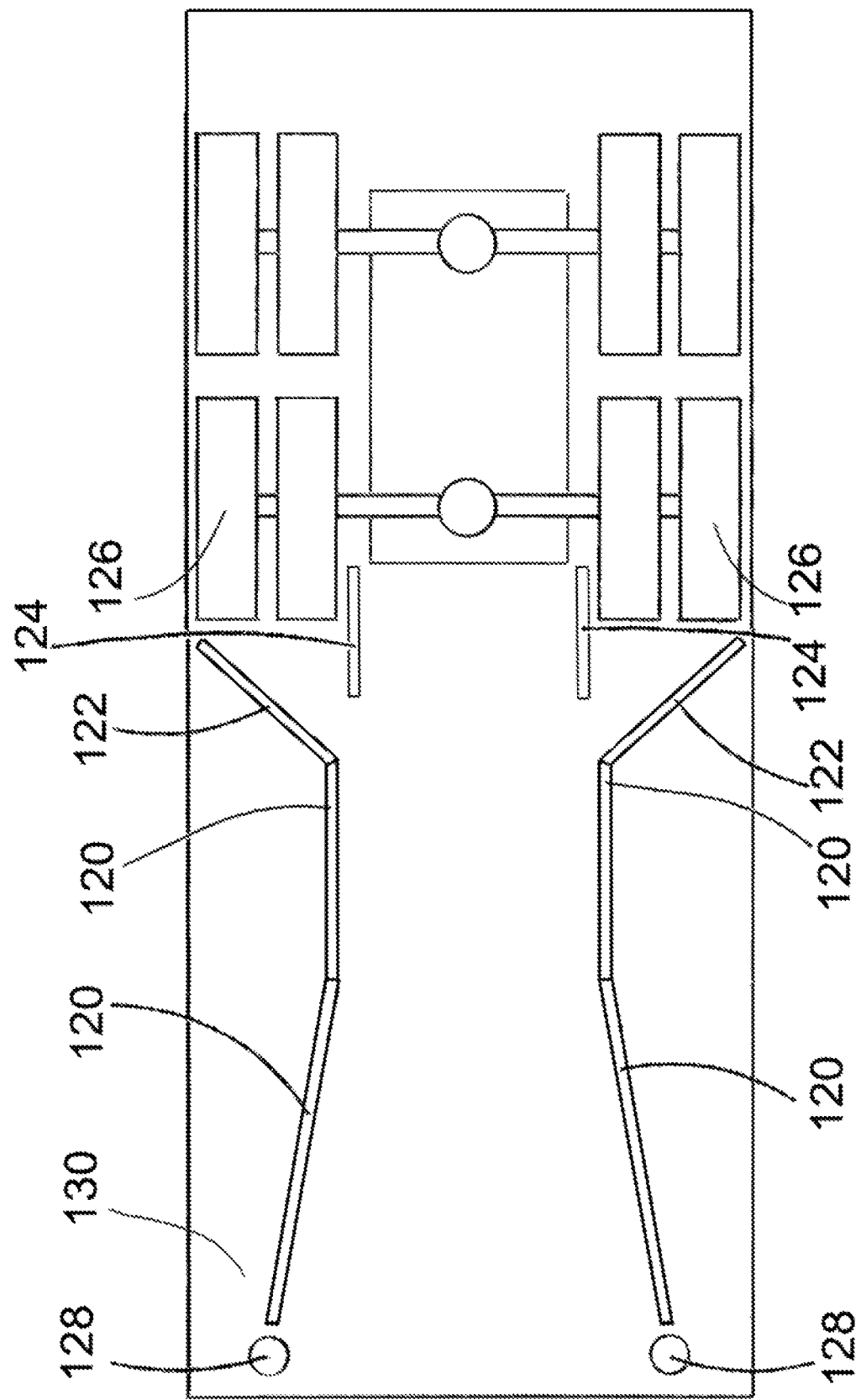
In FIG. 49, a trailer skirt panel assembly 120 is shown suspended underneath the rearward body component 130 of a truck or semitrailer having an otherwise substantially headwind-exposed rearward wheel assembly. The trailer skirt panel assembly is disposed non-parallel to the lateral sidewall of the vehicle body component while extending from near the vehicle landing gear 128 rearward and inward to an intermediate location that is laterally inset beyond the lateral middle of the wheel assembly substantially toward the lateral position of an innermost sidewall of the wheel assembly. From near this intermediate location the trailer skirt panel assembly further extends rearward substantially parallel to the innermost sidewall of the wheel assembly. The trailer skirt panel assembly is also shown in combination with slanted deflector panel 122 shielding an otherwise exposed uppermost portion of the trailing wheel assembly. The trailer skirt panel assembly is also shown in further combination with inner skirt panel 124 disposed adjacent to the rearward wheel assembly. The trailer skirt panel assembly ideally extends downward substantially below the midmost level of the axle.
Figure 50:
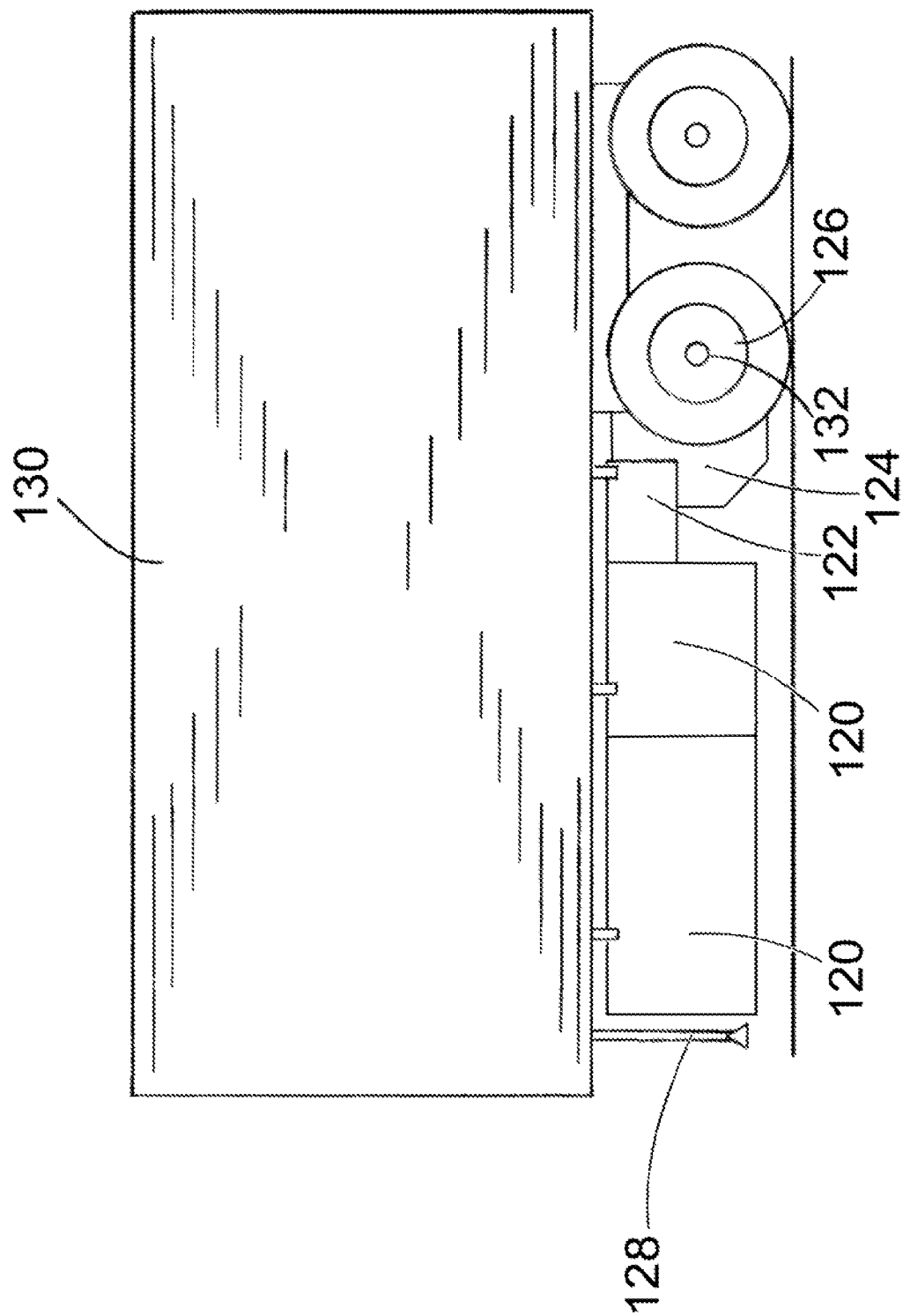
In FIG. 50, the trailer skirt panel assembly 120 as suspended underneath the rearward body component 130 of a truck or semitrailer in FIG. 49 is shown as viewed from the lateral side of the vehicle.

However, under more null wind vehicle operating conditions where vehicle lateral headwinds are more generally diverted laterally outwards to better shield trailer skirt assembly surfaces disposed laterally inset under the vehicle, it can be beneficial to arrange the trailer skirt assembly 120 to progress more laterally outward divergent from the front to rear as in FIG. 46, thereby more effectively widening and thereby stabilizing the central air column toward the rear of the vehicle, while still being consistent with the need to minimize direct exposure of the trailer skirt assembly surfaces to headwinds that actually reduces overall vehicle drag. An outwardly diverging angle of the trailer skirt assembly 120 also provides less exposure of the laterally inward-facing surfaces thereof to the central air column passing under the vehicle, thereby inducing less drag thereon and providing less disturbance to the central air column for enhanced stability thereof and consequent improved vehicle drag reduction.

However, as discussed above, the inwardly converging or outwardly diverging angle of the trailer skirt assembly 120 should be kept relatively shallow in angle in either case, in order to maintain the effectiveness of the trailer skirt assembly 120 in reducing overall vehicle drag. Too severe an angled arrangement of the trailer skirt assembly 120 would instead either destabilize the central air column by generating too much turbulence in the central air column passing under the vehicle, or would induce too much drag on headwind-exposed surfaces of the trailer skirt assembly 120 itself, negating the potential benefit of any reduced vehicle drag by shielding the central air column from lateral air displacement under the vehicle.

From these various design constraints, a method becomes evident for optimally arranging the trailer skirt assembly 120 to include these opposing factors: arrange the trailer skirt assembly 120 to be disposed sufficiently laterally outwards while extending sufficiently downwards to inhibit substantial lateral air from flowing laterally under the vehicle that then stabilizes a sufficiently wide central air column to actually reduce overall vehicle drag, while simultaneously minimizing the surface area of the trailer skirt assembly 120 that is substantially exposed to lateral vehicle headwinds, that would instead increase vehicle drag.

Thus, the trailer skirt assembly 120 would ideally extend downward as far as practical given obstacle clearance design constraints, and as far laterally outward as possible in order to increase the width of the stabilized central air column passing under the vehicle, while also being disposed as far inwardly as possible in order to reduce the drag induced on the exposed trailer skirt assembly surfaces from vehicle headwinds impinging thereon. Furthermore, arranging any inwardly converging or outwardly diverging angle of the trailer skirt assembly 120 should be kept relatively shallow in angle with respect to the lateral side of the vehicle in order to reframe from further destabilizing the central air column, or inducing too much drag on trailer skirt assembly surfaces, and thereby maintain the effectiveness of the trailer skirt assembly 120 in reducing overall vehicle drag.

Given these opposing design considerations, it is likely that one embodiment would include the trailer skirt assembly 120 disposed substantially parallel to the vehicle side and located laterally inset substantially inward toward the longitudinal centerline, with the forward end thereof located near any vehicle landing gear 128 that may be present on the vehicle and the rear end thereof located near the rear wheel assembly. The forward end is likely located sufficiently close to any vehicle landing gear 128 in order to minimize vehicle drag.

However, this inwardly set trailer skirt assembly configuration typically exposes the outermost wheel 126 of the rearward wheel assembly to vehicle lateral-side headwinds, thereby substantially increasing vehicle drag, as taught by the numerous reference embodiments presented above. Thus, this trailer skirt assembly configuration is often best employed together with a rearmost wheel deflector panel 122 that is ideally arranged to shield primarily the uppermost portion of the wheel substantially above the middle of the axle 132 from lateral vehicle headwinds flowing along the side of the vehicle. Moreover, inner wheel skirt panels 124 would likely also be employed in combination with either of these embodiments to further enhance vehicle drag reduction, as further illustrated in FIG. 51.

And as mentioned above, while the trailer skirt assembly 120 is shown disposed under the rearward body component 130 of a truck or semitrailer, the trailer skirt assembly 120 could also be similarly employed on smaller cargo trucks or on other vehicles having sufficient ground clearance located thereunder, as discussed above for the inner wheel skirt panels 110.

Advantages

From the description above, a number of advantages of some aforementioned embodiments become evident:

(a) An improved aerodynamic wheel set deflector panel located in front of trailing wheels and ideally extending downward to no lower than the axle to thereby deflect headwinds onto mechanically disadvantaged lower wheel surfaces and to shield trailing mechanically-advantaged upper wheel surfaces from headwinds, thereby reduces overall vehicle drag improving propulsive efficiency.

(b) An improved aerodynamic wheel assembly deflector panel which may deflect headwinds below the central axle assembly, and where in front of trailing wheels ideally extending downward to no lower than the axle to thereby deflect headwinds onto mechanically disadvantaged lower wheel surfaces and to shield trailing mechanically-advantaged upper wheel surfaces from headwinds, thereby reduces overall vehicle drag improving propulsive efficiency.
(c) An improved aerodynamic deflector and skirt assembly where in front of trailing wheels ideally extending downward to no lower than the axle to thereby deflect headwinds onto mechanically disadvantaged lower wheel surfaces and to shield trailing mechanically-advantaged upper wheel surfaces from headwinds, thereby reduces overall vehicle drag improving propulsive efficiency.
(d) An improved aerodynamic vehicle skirt panel assembly ideally extending downward to no lower than the axle to thereby deflect headwinds onto mechanically disadvantaged lower wheel surfaces and to shield trailing mechanically-advantaged upper wheel surfaces from headwinds, reduces total weight of the skirt assembly, improves the skirt ground clearance of road obstacles, and reduces overall vehicle drag improving propulsive efficiency.
(e) An improved aerodynamic wheel skirt panel assembly ideally extending downward to no lower than the axle to thereby deflect headwinds onto mechanically disadvantaged lower wheel surfaces and to shield trailing mechanically-advantaged upper wheel surfaces from headwinds reduces overall vehicle drag thereby improving propulsive efficiency.
(f) An improved aerodynamic vehicle skirt panel assembly ideally extending downward to no lower than the axle to thereby deflect headwinds onto mechanically disadvantaged lower wheel surfaces and to shield trailing mechanically-advantaged upper wheel surfaces from headwinds, reduces total weight of the skirt assembly, improves the skirt ground clearance of road obstacles, and reduces overall vehicle drag improving propulsive efficiency.
(g) An inner skirt panel aligned near the lateral position of the innermost sidewall of the innermost wheel of the tandem wheel assembly inhibits lateral displacement of air molecules from in-between the intervening wheel open-space and the central tandem open-space along the axle between the wheels, thereby stabilizing the central air column passing through the tandem wheel assembly to reduce drag on the moving vehicle. The inner skirt panel thereby helps stabilize the generally static air passing through the central tandem open-space underneath the tandem wheel assembly, further increasing the effective air pressure developed immediately behind the trailer to reduce overall drag on the vehicle. The inner skirt panel thereby improves vehicle propulsive efficiency by reducing the effective overall drag on the trailer of a semitruck. Furthermore, the inner skirt panel disposed similarly aligned adjacent to a front wheel of a vehicle similarly reduces overall drag on the vehicle.
(h) An inwardly disposed trailer skirt panel assembly located substantially inset laterally toward the longitudinal centerline of the vehicle and disposed to extend substantially forward of the wheels of a rear wheel assembly on a semitrailer or truck. The trailer skirt panel assembly further stabilizes the generally static air passing under the central portion of the vehicle and under the central axle through the central tandem open-space underneath the tandem wheel assembly of the semitrailer or rear axle of a truck, further increasing the effective air pressure being developed immediately behind the trailer or truck to reduce drag thereon.

CONCLUSIONS, RAMIFICATIONS, AND SCOPE

Exposed wheels can generate considerable drag forces on a moving vehicle. These forces are directed principally near the top of the wheel, rather than being more evenly distributed across the entire profile of the wheel. Furthermore, these upper-wheel drag forces are levered against the axle, thereby magnifying the counterforce required to propel the vehicle. As a result, a reduction in drag upon the upper wheel generally enhances propulsive efficiency significantly more than a corresponding drag reduction on other parts of the vehicle.

With the net drag forces being offset and directed near the top of the wheel, nearly equivalent countervailing reaction forces—also opposing vehicle motion—are necessarily transmitted to the wheel at the ground. These reaction forces necessitate augmented down-forces to be applied in higher speed vehicles, in order to maintain static frictional ground contact and, thereby, vehicle traction and directional stability. As wings and other means typically used to augment these down-forces in such vehicles can add significant drag, it becomes evident that substantial effort should be made to reduce the upper wheel drag forces on most high-speed vehicles.

Moreover, since the lower wheel drag forces suffer a mechanical disadvantage over propulsive counterforces, using shielding devices to deflect headwinds from impinging on lower wheel surfaces can increase overall vehicle drag. Given these considerations, it becomes evident that drag-reducing vehicle deflectors and skirts should be ideally limited to lengths that inhibit vehicle headwinds from directly impinging on only the upper wheel surfaces, leaving the lower wheel surfaces exposed.

While the embodiments shown illustrate application generally to the trailers of industrial trucks, the embodiments could be similarly applied other trucks and vehicle types having wheel assemblies exposed to headwinds. And while the embodiments shown include skirt assemblies formed from relatively inexpensive flat panels, somewhat curved panels could also be used. Further examples of alternative embodiments include having deflector panels mounted at various angles, all ideally limited in height to extend downward to no lower than the level of the axle.

Although not shown, in the case where additional space exists in front of the wheel assembly, the wheel deflector panel of the ninth embodiment could instead be mounted in nonparallel to the axle in order to deflect winds not only downward, but also to either side of the trailing wheel assembly.

And although not shown, the wheel skirt panel assembly of the thirteenth embodiment could further include a fender covering the front upper tire surfaces and could also extend over the top of wheel assemblies as well. Furthermore, this embodiment could also be disposed on the rearward wheel assemblies of the trailer as well.

In addition, the embodiments generally can include various methods of resilient mounting to the vehicle body permitting the panels to deflect when impacted by road obstructions and return undamaged to their normal aerodynamic position.

And as shown, the inner skirt panel disposed toward the inside of a tandem wheel assembly on a semitrailer further streamlines the vehicle, reducing drag thereon. The inner skirt panel thereby improves vehicle propulsive efficiency by reducing drag on the trailer of a semitruck. And while shown for general use on a semitrailer, the inner skirt panel could also be used on the rearward wheels of the tractor of a semitruck. Moreover, the inner skirt panel could also be used on smaller vehicles, such as medium-sized trucks having a single rear wheel assembly. And the inner skirt panel could even be utilized on automobiles, extending either in front or rearward of the wheel, ensuring that air displaced by the wheel is directed to the outside of the wheel, rather than laterally inward underneath the vehicle to disturb the central air column. Thus, the inner skirt panel could prove particularly beneficial when used on high speed racecars, requiring enhanced aerodynamic performance.

And as shown, the inwardly disposed trailer skirt panel assembly located substantially inset laterally toward the longitudinal centerline of the vehicle and disposed to extend substantially forward of the wheels of a rear wheel assembly on a semitrailer or truck further streamlines the vehicle, reducing drag thereon. The trailer skirt panel assembly thereby improves vehicle propulsive efficiency by reducing drag on a truck or the trailer of a semitruck. And while shown for general use on a larger truck or semitrailer, the trailer skirt panel assembly could also be used in front of the rearward wheels of a smaller, single-rear-axle truck, or on smaller vehicles having sufficient ground clearance. Thus, the trailer skirt panel assembly could prove beneficial for use on a variety of different vehicle types.

Accordingly, the embodiments should not be limited to the specific examples illustrated and described above, but rather to the appended claims and their legal equivalents.

I claim:

1. An apparatus for reducing drag on a terrestrial vehicle in forward motion on a horizontal plane, said apparatus comprising a laterally inset vehicle side skirt wherein:
   the apparatus is disposed wholly on a first lateral half-side of the vehicle;
   the vehicle is configured for operation on public highways;
   the vehicle has a rearward wheel assembly comprising a laterally outermost wheel, said wheel assembly being disposed on the first vehicle half-side positioned wholly apart from a longitudinal centerline of the vehicle; and
   the vehicle side skirt comprises:
     one or more contiguous non-horizontal vehicle skirt panels suspended under the vehicle forward of the wheel assembly;
     at least one said skirt panel aligned directly ahead of a forward-facing uppermost portion of the wheel assembly, said forward-facing uppermost portion spanning between a top of the wheel assembly and a midmost level of an axle of the wheel assembly;
     a forwardmost skirt panel assembly extending forward of an intermediate longitudinal position, said forwardmost skirt panel assembly comprising any paneled portion of the vehicle side skirt that is disposed forward of the intermediate longitudinal position wherein said intermediate longitudinal position is located midway between the wheel assembly and the closer thereto of a forwardmost surface of the vehicle or any vehicle wheel located immediately ahead of the wheel assembly;
     the forwardmost skirt panel assembly disposed no further from the longitudinal centerline than a laterally outermost position, said laterally outermost position of the forwardmost skirt panel assembly being located laterally inside a laterally outermost sidewall of the outermost wheel no less than a lateral distance equal to the lesser of half the lateral width of the outermost wheel or one-quarter the lateral width of the wheel assembly;
     wherein said vehicle side skirt is disposed no closer to the longitudinal centerline than a laterally innermost sidewall of any laterally innermost wheel of the wheel assembly;
     the forwardmost skirt panel assembly limited in overall lateral extension to a distance equal to not more than half the lateral width of the wheel assembly;
     the forwardmost skirt panel assembly furthermore extending downwards to at least a lower skirt panel assembly level along a substantial length thereof, said lower skirt panel assembly level being positioned no higher than an elevation above a bottom of the wheel assembly equal to one-third the diameter of the wheel assembly, and said substantial length being not less than one-quarter the length of the forwardmost skirt panel assembly;
     a forwardmost end of said vehicle side skirt, said forwardmost end being disposed no further rearward on the vehicle than the intermediate longitudinal position;
     the forwardmost end of said vehicle side skirt furthermore disposed no further from the longitudinal centerline than a laterally intermediate position, said laterally intermediate position being located laterally inside a laterally outermost sidewall of the outermost wheel no less than a lateral distance equal to the lesser of two-thirds the lateral width of the outermost wheel or one-third the lateral width of the wheel assembly;
     a rearmost end of the forwardmost skirt panel assembly, said rearmost end being disposed no further forward of the wheel assembly than the intermediate longitudinal position;
     a flat section extending longitudinally along the vehicle wholly within the forwardmost skirt panel assembly more than a distance equal to 125 percent of the diameter of the wheel assembly;
     the flat section furthermore extending forward of the intermediate longitudinal position;
     wherein any paneled portion of said vehicle side skirt that is disposed coplanar with the flat section being furthermore disposed within the forwardmost skirt panel assembly;
     a laterally extending rearmost wheel deflector panel aligned directly in front of the wheel assembly that is contiguous with the forwardmost skirt panel assembly and that extends laterally outside the rearmost end of the forwardmost skirt panel assembly;
     the rearmost wheel deflector panel disposed non-parallel to the flat section;
     the rearmost wheel deflector panel extending rearward of the rearmost end of the forwardmost skirt panel assembly;
     a forwardmost end of the rearmost wheel deflector panel, said forwardmost deflector panel end being disposed no further forward of the wheel assembly than the intermediate longitudinal position; and
     a laterally outermost elevated portion of the rearmost wheel deflector panel disposed wholly above the lower skirt panel assembly level, said laterally outermost elevated portion consisting of surfaces of the rearmost wheel deflector panel that are located laterally outside the laterally outermost position.

2. The apparatus of claim 1, wherein, further:
the vehicle has a rearward component of a vehicle body;
the rearward body component is supported thereunder by the wheel assembly;
the rearward body component comprises a first substantially rectangular vertical wall arranged along a first outermost lateral vehicle side on the first lateral vehicle half-side of the vehicle;
the height of the first wall is not less than 70 percent of the lateral width of the rearward body component;
the length of the first wall is not less than the height of the first wall;
the rearward body component comprises a second vertical wall that is substantially equal in size to the first wall, said second wall being disposed parallel thereto along a second outermost lateral vehicle side on an opposite lateral vehicle half-side of the vehicle from the first wall;
the rearward body component comprises a horizontal top panel spanning between upper edges of said first and second vertical walls along the respective lengths thereof;
the rearward body component comprises a continuously flat rectangular floor spanning between the first and second vertical walls along the respective lengths thereof;
the flat rectangular floor is disposed wholly above the top of the wheel assembly; and
said substantial length of the forwardmost skirt panel assembly is not less than half the length of the forwardmost skirt panel assembly.

3. The apparatus of claim 2, wherein, further:
the vehicle is a truck;
the truck has no more than two vehicle axles;
the wheel assembly is attached to a vehicle frame member;
a forwardmost vehicle wheel of the truck is attached to the vehicle frame member;
the forwardmost vehicle wheel is a front wheel of the vehicle;
the rearward body component is attached to the vehicle frame member;
the first and second vertical walls are each continuously flat along a major longitudinal length thereof;
the skirt panel assembly is disposed immediately forward of the wheel assembly;
the skirt panel assembly extends longitudinally along the vehicle at least a minimum distance equal to twice the diameter of the wheel assembly;
the skirt panel assembly is furthermore disposed no closer to the longitudinal centerline than a laterally innermost sidewall of any laterally innermost wheel of the wheel assembly;
the forwardmost end of the forwardmost skirt panel assembly is disposed no further from the longitudinal centerline than a medial lateral position located midway between the innermost sidewall and the outermost sidewall of the wheel assembly;
said major length of the forwardmost skirt panel assembly is not less than three-quarters the length of the forwardmost skirt panel assembly;
the forwardmost skirt panel assembly also extends laterally outside the intermediate lateral position;
the rearmost end of the forwardmost skirt panel assembly is disposed no further forward of the wheel assembly than a distance equal to twice the diameter of the wheel assembly;
the lower skirt panel assembly level is positioned no higher than an elevation above the bottom of the wheel assembly equal to one-quarter the diameter of the wheel assembly;
the forwardmost skirt panel assembly comprises a rearward said contiguous non-horizontal panel;
the rearward contiguous non-horizontal panel of the forwardmost skirt panel assembly comprises the rearmost end of the forwardmost skirt panel assembly; and
the rearward contiguous non-horizontal panel of the forwardmost skirt panel assembly is flat.

4. The apparatus of claim 3, wherein, further:
at least one said non-horizontal panel of the forwardmost skirt panel assembly is arranged substantially parallel to the first outermost lateral vehicle side;
the forwardmost end of the forwardmost skirt panel assembly is disposed laterally inside the medial lateral position;
the forwardmost skirt panel assembly extends laterally outside the laterally outermost position of the forwardmost skirt panel assembly;
the rearmost end of the forwardmost skirt panel assembly is disposed no further forward of the wheel assembly than a distance equal to 150 percent of the diameter of the wheel assembly;
the lower skirt panel assembly level is positioned no higher than an elevation above the bottom of the wheel assembly equal to one-fifth the diameter of the wheel assembly;
the laterally outermost position of the forwardmost skirt panel assembly is located no closer to the first outermost lateral vehicle side than a distance equal to half the lateral width of the wheel assembly; and
the rearmost wheel deflector panel is disposed no lower than the midmost level of the axle across a substantial laterally outermost portion thereof, said substantial laterally outermost portion of the rearmost wheel deflector panel extending more than halfway across the lateral width of the rearmost wheel deflector panel.

5. The apparatus of claim 4, wherein, further:
the intermediate longitudinal position is located midway between the wheel assembly and the closer thereto of any vehicle wheel located immediately ahead of the wheel assembly or a distance forward of the wheel assembly equal to twice the diameter of the wheel assembly;
a laterally innermost end of the rearmost wheel deflector panel disposed no further rearward on the vehicle than a laterally outermost end of the rearmost wheel deflector panel;
the rearmost wheel deflector panel disposed above the lower skirt panel assembly level along a major lateral width thereof; and
the rearmost wheel deflector panel is flat.

6. The apparatus of claim 2, wherein, further:
the vehicle comprises a semitrailer;
the semitrailer comprises the rearward body component and the wheel assembly;
the forwardmost skirt panel assembly extends forward of a central location positioned midway between the wheel assembly and any vehicle wheel connected to the vehicle that is most closely disposed directly ahead of the wheel assembly;

the forwardmost skirt panel assembly comprises a rearward said contiguous non-horizontal panel;

the rearward contiguous non-horizontal panel of the forwardmost skirt panel assembly comprises the rearmost end of the forwardmost skirt panel assembly;

the rearward contiguous non-horizontal panel of the forwardmost skirt panel assembly is flat; and the rearward contiguous non-horizontal panel of the forwardmost skirt panel assembly is suspended in a substantially vertical orientation.

7. The apparatus of claim 6, wherein, further:

the skirt panel assembly is disposed immediately forward of the wheel assembly;

the skirt panel assembly extends longitudinally along the vehicle at least a minimum distance equal to twice the diameter of the wheel assembly;

the skirt panel assembly is furthermore disposed no closer to the longitudinal centerline than a laterally innermost sidewall of any laterally innermost wheel of the wheel assembly;

said major length of the forwardmost skirt panel assembly is not less than three-quarters the length of the forwardmost skirt panel assembly;

the forwardmost skirt panel assembly extends laterally outside the laterally intermediate position;

the lower skirt panel assembly level is positioned no higher than an elevation above the bottom of the wheel assembly equal to one-quarter the diameter of the wheel assembly; and the laterally outermost position of the forwardmost skirt panel assembly is located no closer to the laterally outermost sidewall of the outermost wheel than a distance equal to the lesser of two-thirds the lateral width of the outermost wheel or one-third the lateral width of the wheel assembly.

8. The apparatus of claim 7, wherein, further:

at least one said non-horizontal panel of the forwardmost skirt panel assembly is arranged substantially parallel to the first outermost lateral vehicle side;

the forwardmost end of the forwardmost skirt panel assembly is disposed laterally inside the medial lateral position;

the forwardmost skirt panel assembly extends laterally outside the laterally outermost position of the forwardmost skirt panel assembly;

the laterally outermost position of the forwardmost skirt panel assembly is located no closer to the first outermost lateral vehicle side than a distance equal to half the lateral width of the wheel assembly;

the rearmost end of the forwardmost skirt panel assembly is disposed no further forward of the wheel assembly than a distance equal to 150 percent of the diameter of the wheel assembly;

the lower skirt panel assembly level is positioned no higher than an elevation above the bottom of the wheel assembly equal to one-fifth the diameter of the wheel assembly; and the rearmost wheel deflector panel is disposed no lower than the midmost level of the axle across a substantial laterally outermost portion thereof, said substantial laterally outermost portion of the rearmost wheel deflector panel extending more than halfway across the lateral width of the rearmost wheel deflector panel.

9. The apparatus of claim 8, wherein, further:

the intermediate longitudinal position is located midway between the wheel assembly and the closer thereto of any vehicle wheel located immediately ahead of the wheel assembly or a distance forward of the wheel assembly equal to twice the diameter of the wheel assembly;

a laterally innermost end of the rearmost wheel deflector panel disposed no further rearward on the vehicle than a laterally outermost end of the rearmost wheel deflector panel;

the rearmost wheel deflector panel disposed above the lower skirt panel assembly level along a major lateral width thereof; and the rearmost wheel deflector panel is flat.

10. The apparatus of claim 7, wherein, further:

the wheel assembly is attached to a vehicle frame member;

the rearward body component is attached to the vehicle frame member;

the first and second vertical walls are each continuously flat along a major longitudinal length thereof; and the forwardmost skirt panel assembly extends forward of a medial longitudinal position located midway between the wheel assembly and a vehicle landing gear leg extending downwards under the vehicle on the first vehicle half-side.

11. The apparatus of claim 10, wherein, further:

at least one said non-horizontal panel of the forwardmost skirt panel assembly is arranged substantially parallel to the first outermost lateral vehicle side;

the laterally outermost position of the forwardmost skirt panel assembly is located no closer to the first outermost lateral vehicle side than a distance equal to half the lateral width of the wheel assembly; and the forwardmost end of the forwardmost skirt panel assembly is located no further laterally apart from the longitudinal centerline than is the lateral middle position of the landing gear leg.

12. The apparatus of claim 11, wherein, further:

the forwardmost skirt panel assembly extends laterally outside the laterally outermost position of the forwardmost skirt panel assembly;

the forwardmost end of the forwardmost skirt panel assembly is disposed laterally inside the medial lateral position;

the lower skirt panel assembly level is positioned no higher than an elevation above the bottom of the wheel assembly equal to one-fifth the diameter of the wheel assembly; and the rearmost wheel deflector panel is disposed no lower than the midmost level of the axle across a substantial laterally outermost portion thereof, said substantial laterally outermost portion of the rearmost wheel deflector panel extending more than halfway across the lateral width of the rearmost wheel deflector panel.

13. The apparatus of claim 12, wherein, further:

the intermediate longitudinal position is located midway between the wheel assembly and the closer thereto of any vehicle wheel located immediately ahead of the wheel assembly or a distance forward of the wheel assembly equal to twice the diameter of the wheel assembly;

a laterally innermost end of the rearmost wheel deflector panel disposed no further rearward on the vehicle than a laterally outermost end of the rearmost wheel deflector panel;

the rearmost wheel deflector panel disposed above the lower skirt panel assembly level along a major lateral width thereof; and the rearmost wheel deflector panel is flat.

14. The apparatus of claim 11, wherein, further:
the forwardmost skirt panel assembly extends laterally outside the laterally outermost position of the forwardmost skirt panel assembly;
the forwardmost end of the forwardmost skirt panel assembly is disposed laterally inside the medial lateral position;
the rearmost end of the forwardmost skirt panel assembly is disposed no further forward of the wheel assembly than a distance equal to twice the diameter of the wheel assembly; and
the rearmost wheel deflector panel is disposed no lower than the midmost level of the axle across a substantial laterally outermost portion thereof, said substantial laterally outermost portion of the rearmost wheel deflector panel extending more than halfway across the lateral width of the rearmost wheel deflector panel.

15. The apparatus of claim 14, wherein, further:
the intermediate longitudinal position is located midway between the wheel assembly and the closer thereto of any vehicle wheel located immediately ahead of the wheel assembly or a distance forward of the wheel assembly equal to twice the diameter of the wheel assembly;
a laterally innermost end of the rearmost wheel deflector panel disposed no further rearward on the vehicle than a laterally outermost end of the rearmost wheel deflector panel;
the rearmost wheel deflector panel disposed above the lower skirt panel assembly level along a major lateral width thereof; and
the rearmost wheel deflector panel is flat.

16. A method for reducing drag on a terrestrial vehicle in forward motion on a horizontal plane, said method comprising:
forming a laterally inset vehicle side skirt disposed wholly on a first lateral half-side of the vehicle wherein:
the vehicle is configured for operation on public highways;
the vehicle has a rearward wheel assembly comprising a laterally outermost wheel, said wheel assembly being disposed on the first vehicle half-side positioned wholly apart from a longitudinal centerline of the vehicle; and
the vehicle side skirt comprises:
one or more contiguous non-horizontal vehicle skirt panels suspended under the vehicle forward of the wheel assembly;
at least one said skirt panel aligned directly ahead of a forward-facing uppermost portion of the wheel assembly, said forward-facing uppermost portion spanning between a top of the wheel assembly and a midmost level of an axle of the wheel assembly;
a forwardmost skirt panel assembly extending forward of an intermediate longitudinal position, said forwardmost skirt panel assembly comprising any paneled portion of the vehicle side skirt that is disposed forward of the intermediate longitudinal position wherein said intermediate longitudinal position is located midway between the wheel assembly and the closer thereto of a forwardmost surface of the vehicle or any vehicle wheel located immediately ahead of the wheel assembly;
the forwardmost skirt panel assembly disposed no further from the longitudinal centerline than a laterally outermost position, said laterally outermost position of the forwardmost skirt panel assembly being located laterally inside a laterally outermost sidewall of the outermost wheel no less than a lateral distance equal to the lesser of half the lateral width of the outermost wheel or one-quarter the lateral width of the wheel assembly;
wherein said vehicle side skirt is disposed no closer to the longitudinal centerline than a laterally innermost sidewall of any laterally innermost wheel of the wheel assembly;
the forwardmost skirt panel assembly limited in overall lateral extension to a distance equal to not more than half the lateral width of the wheel assembly;
the forwardmost skirt panel assembly furthermore extending downwards to at least a lower skirt panel assembly level along a substantial length thereof, said lower skirt panel assembly level being positioned no higher than an elevation above a bottom of the wheel assembly equal to one-third the diameter of the wheel assembly, and said substantial length being not less than one-quarter the length of the forwardmost skirt panel assembly;
a forwardmost end of said vehicle side skirt, said forwardmost end being disposed no further rearward on the vehicle than the intermediate longitudinal position;
the forwardmost end of said vehicle side skirt furthermore disposed no further from the longitudinal centerline than a laterally intermediate position, said laterally intermediate position being located laterally inside a laterally outermost sidewall of the outermost wheel no less than a lateral distance equal to the lesser of two-thirds the lateral width of the outermost wheel or one-third the lateral width of the wheel assembly;
a rearmost end of the forwardmost skirt panel assembly, said rearmost end being disposed no further forward of the wheel assembly than the intermediate longitudinal position;
a flat section extending longitudinally along the vehicle wholly within the forwardmost skirt panel assembly more than a distance equal to 125 percent of the diameter of the wheel assembly;
the flat section furthermore extending forward of the intermediate longitudinal position;
wherein any paneled portion of said vehicle side skirt that is disposed coplanar with the flat section being furthermore disposed within the forwardmost skirt panel assembly;
a laterally extending rearmost wheel deflector panel aligned directly in front of the wheel assembly that is contiguous with the forwardmost skirt panel assembly and that extends laterally outside the rearmost end of the forwardmost skirt panel assembly;
the rearmost wheel deflector panel disposed non-parallel to the flat section;
the rearmost wheel deflector panel extending rearward of the rearmost end of the forwardmost skirt panel assembly;
a forwardmost end of the rearmost wheel deflector panel, said forwardmost deflector panel end being disposed no further forward of the wheel assembly than the intermediate longitudinal position; and
a laterally outermost elevated portion of the rearmost wheel deflector panel disposed wholly above the lower skirt panel assembly level, said laterally outermost elevated portion consisting of surfaces of the rearmost wheel deflector panel that are located laterally outside the laterally outermost position; and configuring the vehicle side skirt to be properly inset laterally apart from the first lateral side of the vehicle with sufficiently overall extended disposition thereof to sufficiently limit lateral flow of air under the vehicle that then stabilizes a sufficiently wide central air column passing under a central portion of the vehicle so that while the vehicle is operated at 65 mph under null wind conditions, any further destabilization of the otherwise substantially static central air column passing underneath the vehicle by otherwise arrangement of the side skirt in combination of being either too large or small in overall wind-exposed surface area inhibiting lateral air flow under the vehicle, too widely exposed to drag-inducing lateral vehicle headwinds impinging on outer surfaces thereof, too widely exposed to drag-inducing winds of the central air column impinging on inward-facing surfaces thereof, or being too widely arranged in either convergent or divergent angle extending rearward in non-parallel disposition with respect to the first outer lateral vehicle side, to thereby further destabilize the central air column to a degree that would otherwise increase overall vehicle drag above a standard amount otherwise induced when the side skirt is otherwise absent from the vehicle.

17. The method of claim 16, wherein, further:
the vehicle has a rearward component of a vehicle body;
the rearward body component is supported thereunder by the wheel assembly;
the rearward body component comprises a first substantially rectangular vertical wall arranged along a first outermost lateral vehicle side on the first lateral vehicle half-side of the vehicle;
the height of the first wall is not less than 70 percent of the lateral width of the rearward body component;
the length of the first wall is not less than the height of the first wall;
the rearward body component comprises a second vertical wall that is substantially equal in size to the first wall, said second wall being disposed parallel thereto along a second outermost lateral vehicle side on an opposite lateral vehicle half-side of the vehicle from the first wall;
the rearward body component comprises a horizontal top panel spanning between upper edges of said first and second vertical walls along the respective lengths thereof;
the rearward body component comprises a continuously flat rectangular floor spanning between the first and second vertical walls along the respective lengths thereof;
the flat rectangular floor is disposed wholly above the top of the wheel assembly; and
said substantial length of the forwardmost skirt panel assembly is not less than half the length of the forwardmost skirt panel assembly.

18. The method of claim 17, wherein, further:
the vehicle is a truck;
the truck has no more than two vehicle axles;
the wheel assembly is attached to a vehicle frame member;
a forwardmost vehicle wheel of the truck is attached to the vehicle frame member;
the forwardmost vehicle wheel is a front wheel of the vehicle;
the intermediate longitudinal position is located midway between the wheel assembly and the closer thereto of any vehicle wheel located immediately ahead of the wheel assembly or a distance forward of the wheel assembly equal to twice the diameter of the wheel assembly;
the rearmost wheel deflector panel disposed above the lower skirt panel assembly level along a major lateral width thereof;
the rearmost wheel deflector panel is flat;
the rearward body component is attached to the vehicle frame member;
the first and second vertical walls are each continuously flat along a major longitudinal length thereof;
the skirt panel assembly is disposed immediately forward of the wheel assembly;
the skirt panel assembly extends longitudinally along the vehicle at least a minimum distance equal to twice the diameter of the wheel assembly;
the skirt panel assembly is furthermore disposed no closer to the longitudinal centerline than a laterally innermost sidewall of any laterally innermost wheel of the wheel assembly;
the forwardmost end of the forwardmost skirt panel assembly is disposed no further from the longitudinal centerline than a medial lateral position located midway between the innermost sidewall and the outermost sidewall of the wheel assembly;
said major length of the forwardmost skirt panel assembly is not less than three-quarters the length of the forwardmost skirt panel assembly;
the forwardmost skirt panel assembly also extends laterally outside the intermediate lateral position;
the rearmost end of the forwardmost skirt panel assembly is disposed no further forward of the wheel assembly than a distance equal to twice the diameter of the wheel assembly;
the lower skirt panel assembly level is positioned no higher than an elevation above the bottom of the wheel assembly equal to one-quarter the diameter of the wheel assembly;
the forwardmost skirt panel assembly comprises a rearward said contiguous non-horizontal panel;
the rearward contiguous non-horizontal panel of the forwardmost skirt panel assembly comprises the rearmost end of the forwardmost skirt panel assembly; and
the rearward contiguous non-horizontal panel of the forwardmost skirt panel assembly is flat.

19. The method of claim 18, wherein, further:
at least one said non-horizontal panel of the forwardmost skirt panel assembly is arranged substantially parallel to the first outermost lateral vehicle side;
the forwardmost end of the forwardmost skirt panel assembly is disposed laterally inside the medial lateral position;
the forwardmost skirt panel assembly extends laterally outside the laterally outermost position of the forwardmost skirt panel assembly;
the rearmost end of the forwardmost skirt panel assembly is disposed no further forward of the wheel assembly than a distance equal to 150 percent of the diameter of the wheel assembly;

the lower skirt panel assembly level is positioned no higher than an elevation above the bottom of the wheel assembly equal to one-fifth the diameter of the wheel assembly;

the laterally outermost position of the forwardmost skirt panel assembly is located no closer to the first outermost lateral vehicle side than a distance equal to half the lateral width of the wheel assembly; and the rearmost wheel deflector panel is disposed no lower than the midmost level of the axle across a substantial laterally outermost portion thereof, said substantial laterally outermost portion of the rearmost wheel deflector panel extending more than halfway across the lateral width of the rearmost wheel deflector panel.

20. The method of claim 17, wherein, further:

the vehicle comprises a semitrailer;

the semitrailer comprises the rearward body component and the wheel assembly;

the intermediate longitudinal position is located midway between the wheel assembly and the closer thereto of any vehicle wheel located immediately ahead of the wheel assembly or a distance forward of the wheel assembly equal to twice the diameter of the wheel assembly;

the rearmost wheel deflector panel disposed wholly above the lower skirt panel assembly level along a major lateral width thereof;

the rearmost wheel deflector panel is flat;

the forwardmost skirt panel assembly extends forward of a central location positioned midway between the wheel assembly and any vehicle wheel connected to the vehicle that is most closely disposed directly ahead of the wheel assembly;

the forwardmost skirt panel assembly comprises a rearward said contiguous non-horizontal panel;

the rearward contiguous non-horizontal panel of the forwardmost skirt panel assembly comprises the rearmost end of the forwardmost skirt panel assembly;

the rearward contiguous non-horizontal panel of the forwardmost skirt panel assembly is flat; and the rearward contiguous non-horizontal panel of the forwardmost skirt panel assembly is suspended in a substantially vertical orientation.

21. The method of claim 20, wherein, further:

the skirt panel assembly is disposed immediately forward of the wheel assembly;

the skirt panel assembly extends longitudinally along the vehicle at least a minimum distance equal to twice the diameter of the wheel assembly;

the skirt panel assembly is furthermore disposed no closer to the longitudinal centerline than a laterally innermost sidewall of any laterally innermost wheel of the wheel assembly;

said major length of the forwardmost skirt panel assembly is not less than three-quarters the length of the forwardmost skirt panel assembly;

the forwardmost skirt panel assembly extends laterally outside the laterally intermediate position;

the lower skirt panel assembly level is positioned no higher than an elevation above the bottom of the wheel assembly equal to one-quarter the diameter of the wheel assembly; and the laterally outermost position of the forwardmost skirt panel assembly is located no closer to the laterally outermost sidewall of the outermost wheel than a distance equal to the lesser of two-thirds the lateral width of the outermost wheel or one-third the lateral width of the wheel assembly.

22. The method of claim 21, wherein, further:

the wheel assembly is attached to a vehicle frame member;

the rearward body component is attached to the vehicle frame member;

the first and second vertical walls are each continuously flat along a major longitudinal length thereof; and the forwardmost skirt panel assembly extends forward of a medial longitudinal position located midway between the wheel assembly and a vehicle landing gear leg extending downwards under the vehicle on the first vehicle half-side.

23. The method of claim 22, wherein, further:

at least one said non-horizontal panel of the forwardmost skirt panel assembly is arranged substantially parallel to the first outermost lateral vehicle side;

the laterally outermost position of the forwardmost skirt panel assembly is located no closer to the first outermost lateral vehicle side than a distance equal to half the lateral width of the wheel assembly; and the forwardmost end of the forwardmost skirt panel assembly is located no further laterally apart from the longitudinal centerline than is the lateral middle position of the landing gear leg.

24. The method of claim 23, wherein, further:

the forwardmost skirt panel assembly extends laterally outside the laterally outermost position of the forwardmost skirt panel assembly;

the forwardmost end of the forwardmost skirt panel assembly is disposed laterally inside the medial lateral position;

the rearmost end of the forwardmost skirt panel assembly is disposed no further forward of the wheel assembly than a distance equal to twice the diameter of the wheel assembly; and the rearmost wheel deflector panel is disposed no lower than the midmost level of the axle across a substantial laterally outermost portion thereof, said substantial laterally outermost portion of the rearmost wheel deflector panel extending more than halfway across the lateral width of the rearmost wheel deflector panel.

\* \* \* \* \*